US005666648A

United States Patent [19]
Stuart

[11] Patent Number: 5,666,648
[45] Date of Patent: Sep. 9, 1997

[54] POLAR RELAY SYSTEM FOR SATELLITE COMMUNICATION

[75] Inventor: James R. Stuart, Louisville, Colo.

[73] Assignee: Leo One IP, L.L.C., St. Louis, Mo.

[21] Appl. No.: 423,673

[22] Filed: Apr. 18, 1995

Related U.S. Application Data

[63] Continuation-in-part of Ser. No. 149,574, Nov. 9, 1993, abandoned, Ser. No. 216,820, Mar. 28, 1994, abandoned, and Ser. No. 319,819, Oct. 12, 1994.

[51] Int. Cl.$^6$ .................................................. H04B 7/19
[52] U.S. Cl. .................. 370/321; 342/352; 370/319; 455/13.1
[58] Field of Search ................... 455/12.1, 13.1, 455/33.1, 33.2, 54.1, 53.1, 56.1, 34.1, 11.1, 13.3; 342/352

[56] References Cited

U.S. PATENT DOCUMENTS

| | | | |
|---|---|---|---|
| 3,340,531 | 9/1967 | Kefalas et al. | 455/13.1 |
| 5,121,409 | 6/1992 | Goss | 375/1 |
| 5,220,333 | 6/1993 | Penrod | 342/389 |
| 5,239,670 | 8/1993 | Schwendeman et al. | 455/13.4 |

FOREIGN PATENT DOCUMENTS

| | | | |
|---|---|---|---|
| 0094253 | 11/1983 | European Pat. Off. | H04B 7/185 |
| 0317975 | 5/1989 | European Pat. Off. | H04B 7/185 |
| 0575678 | 9/1992 | European Pat. Off. | H04B 7/195 |
| 0562374 | 9/1993 | European Pat. Off. | H04B 7/195 |
| 4304916 | 8/1994 | Germany . | |
| 2265795 | 6/1993 | United Kingdom . | |
| 8804866 | 12/1987 | WIPO | H04B 7/19 |
| 9200632 | 1/1992 | WIPO | H04B 7/19 |

OTHER PUBLICATIONS

J. W. Ward and H. E. Price, "The UoSAT-2-Digital Communications Experiment", The Journal of the Insitution of Electronic & Radio Engineers, pp. 163-173 Oct. 1987.

"A Scenario for the Deployment of Interactive Multimedia Cable Television System in the United States in the 1990's", by Matthew D. Miller, Proceedings of the IEEE, vol. 82, No. 4, 1994, pp. 585-589.

*Primary Examiner*—Reinhard J. Eisenzopf
*Assistant Examiner*—Darnell R. Armstrong
*Attorney, Agent, or Firm*—Anglin & Giaccherini

[57] ABSTRACT

One of the preferred embodiments of the present invention is a telecommunications system that includes twelve satellites (S) which are equally deployed in four polar low Earth orbits (OR). A preferred embodiment provides a system for transmitting a message between two terminals (G) on the ground through a store-and-forward network. A first satellite (S1/OR1) traveling in a first polar orbit (OR1) receives and stores a message from a sending terminal (GA) on the surface of the Earth (E). As the first satellite (S1/OR1) passes over the North Pole (NP), it transmits the stored message from the sending terminal (GA) down to a relay station (GB) located near the North Pole (NP). The message is stored at this polar relay station (GB) until a second satellite (S1/OR2) moving in a second orbit (OR2) flies within range. At that time, the polar relay station (GB) sends the stored message up to the second satellite (S1/OR2), which stores the message and finally transmits it to a receiving terminal (GC) somewhere on the ground. This store-and-forward relay method takes advantage of the geometry of a system that employs more than one satellite which each operate in different polar orbits. The different polar orbits allow the satellites to fly over different parts of the globe frequently. The rotation of the Earth beneath the satellites allows every satellite in the system to fly over vast regions of the Earth's surface and, therefore, to communicate with a very large number of terminals located virtually anywhere in the world. The present invention provides a wide variety of communication systems without requiring costly and complex intersatellite links.

32 Claims, 31 Drawing Sheets

Gateway Terminal Antenna Pattern

| Transceiver-Satellite Link Budget | 15 DEGREE ELEVATION | | 90 DEGREE ELEVATION | |
|---|---|---|---|---|
| | UP-LINK | DOWN-LINK | UP-LINK | DOWN-LINK |
| Transmit Power (Watts) | 7 | 100 | 7 | 100 |
| Transmit Antenna Gain (dB) | 0 | 5.4 | 0 | -2 |
| Pointing Loss (dB) | 0 | 0 | 0 | 0 |
| EIRP (dBW) | 8.5 | 25.4 | 8.5 | 18.0 |
| Frequency (MHz) | 149 | 137.5 | 149 | 137.5 |
| Slant Range (KM) | 0 | 0 | 0 | 0 |
| Polarization Loss (dB) | 3.0 | 3.0 | 3.0 | 3.0 |
| Gaseous Loss (dB) | 0.5 | 0.5 | 0.13 | 0.13 |
| Total Transmission Loss (dB) | 147.7 | 147.0 | 139.9 | 139.2 |
| Receive Antenna Gain (dB) | 5.4 | 0 | -2 | 0 |
| Pointing Loss (dB) | 0 | 0 | 0 | 0 |
| Antenna Loss (dB) | 2 | 2 | 2 | 2 |
| Receiver Noise Figure (dB) | 4 | 4 | 4 | 4 |
| G/T (dB) | -23.2 | -30.8 | -30.6 | -30.7 |
| Uncoded Burst Data Rate (Kbits/sec) | 9.6 | 96 | 9.6 | 96 |
| Required Eb/No (dB) | 7 | 7 | 7 | 7 |
| Implementation Loss (dB) | 2 | 2 | 2 | 2 |
| Required C/No (dB-Hz) | 48.8 | 58.8 | 48.8 | 58.8 |
| Link Margin (dB) | 17.3 | 17.4 | 17.7 | 17.9 |
| Peak Flux Density in 4 KHz (dBW/m2) | -132.2 | -125.2 | -124.8 | -125.2 |

Fig. 24

| Gateway-Satellite Link Budget | 15 DEGREE ELEVATION | | 90 DEGREE ELEVATION | |
|---|---|---|---|---|
| | UP-LINK | DOWN-LINK | UP-LINK | DOWN-LINK |
| Peak Transmit Power (Watts) | 1.8 | 2.5 | 1.8 | 2.5 |
| Transmit Antenna Peak Gain (dB) | 16 | 5.4 | 16 | -2 |
| Pointing Loss (dB) | -3 | 0 | -3 | 0 |
| EIRP (dBW) | 15.6 | 9.4 | 15.6 | 2.0 |
| Frequency (MHz) | 149 | 137.5 | 149 | 137.5 |
| Slant Range (KM) | 0 | 0 | 0 | 0 |
| Polarization Loss (dB) | 1.0 | 1.0 | 1.0 | 1.0 |
| Gaseous Loss (dB) | 0.5 | 0.5 | 0.13 | 0.13 |
| Total Transmission Loss (dB) | 145.7 | 145.0 | 137.9 | 137.2 |
| Receive Antenna Peak Gain (dB) | 5.4 | 16 | -2 | 16 |
| Pointing Loss (dB) | 0 | -3 | 0 | -3 |
| Antenna Loss (dB) | 2 | 2 | 2 | 2 |
| Receiver Noise Figure (dB) | 4 | 4 | 4 | 4 |
| G/T (dB) | -23.2 | -17.8 | -30.6 | -17.7 |
| Uncoded Burst Data Rate (Kbits/sec) | 50 | 50 | 50 | 50 |
| Required Eb/No (dB) | 9 | 9 | 9 | 9 |
| Implementation Loss (dB) | 2 | 2 | 2 | 2 |
| Required C/No (dB-Hz) | 58.0 | 58.0 | 58.0 | 58.0 |
| Link Margin (dB) | 17.3 | 17.2 | 17.7 | 17.7 |
| Peak Flux Density in 4 KHz (dBW/m2) | -129.2 | -138.4 | -121.8 | -138.4 |

Fig. 25

TracSat
Status and location messaging for trucking, rail, maritime and container shipping SecurSat
Telemetry messaging and status monitoring for remote assets, SCADA, pipelines, plant facilities, meters, agriculture and environmental monitoring.

MailSat
Electronic-mail and mobile computing for travelers using computers and personal digital assistants.

PageSat
Paging and short messaging for travelers.

EmerSat
Alarm notification and location messaging for lost and stolen assets, security breaches, accident notification, search and rescue, etc.

Transceiver-Satellite Link Budget

| User Terminal VHF Bands | 15 DEGREE ELEVATION | | 90 DEGREE ELEVATION | |
|---|---|---|---|---|
| | UP-LINK | DOWN-LINK | UP-LINK | DOWN-LINK |
| Transmit Power (Watts) | 7 | 100 | 7 | 100 |
| Transmit Antenna Gain (dB) | 0 | 5.4 | 0 | -2 |
| Pointing Loss (dB) | 0 | 0 | 0 | 0 |
| EIRP (dBW) | 8.5 | 25.4 | 8.5 | 18.0 |
| | | | | |
| Frequency (MHz) | 149 | 137.5 | 149 | 137.5 |
| Slant Range (KM) | 2588 | 2588 | 1100 | 1100 |
| Polarization Loss (dB) | 3.0 | 3.0 | 3.0 | 3.0 |
| Gaseous Loss (dB) | 0.5 | 0.5 | 0.13 | 0.13 |
| Total Transmission Loss (dB) | 147.7 | 147.0 | 139.9 | 139.2 |
| | | | | |
| Receive Antenna Gain (dB) | 5.4 | 0 | -2 | 0 |
| Pointing Loss (dB) | 0 | 0 | 0 | 0 |
| Antenna Loss (dB) | 2 | 2 | 2 | 2 |
| Receiver Noise Figure (dB) | 4 | 4 | 4 | 4 |
| G/T (dB) | -23.2 | -30.8 | -30.6 | -30.7 |
| | | | | |
| Uncoded Burst Data Rate (Kbits/sec) | 9.6 | 96 | 9.6 | 96 |
| Required Eb/No (dB) | 7 | 7 | 7 | 7 |
| Implementation Loss (dB) | 2 | 2 | 2 | 2 |
| Required C/No (dB-Hz) | 48.8 | 58.8 | 48.8 | 58.8 |
| | | | | |
| Link Margin (dB) | 17.3 | 17.4 | 17.7 | 17.9 |
| | | | | |
| Peak Flux Density in 4 KHz (dBW/m2) | -132.2 | -125.2 | -124.8 | -125.2 |
| | | | | |
| Doppler (KHz) | 2.2 | 2.0 | 0.0 | 0.0 |
| XTM ANT HPBW (deg) | 142.0 | 76.3 | 142.0 | 178.8 |
| REC ANT HPBW (deg) | 76.3 | 142.0 | 178.8 | 142.0 |
| Sky Temp (K) | 295 | 1032 | 295 | 1009 |
| Tsys | 732 | 1197 | 732 | 1182 |
| Earth Cov Angle (deg) | 111 | | 0 | |
| Earth Cov Area (KM^2) | 1.47E+07 | | 0.00E+00 | |
| Doppler (KM/S) | 4.3 | | 0.0 | |
| Mean Absor Temp (K) | 294.96 | | 294.96 | |
| Earth Radius (KM) | 6378 | | 6378 | |
| | | | | |
| Orbital Height (KM) | 1100 | | 1100 | |
| Elev Angle Mask (deg) | 15 | | 90 | |
| Surface Temp (deg-C) | 35 | | 35 | |
| Bandwidth (KHz) | 5.5 | 55 | 5.5 | 55 |

Fig. 38

Gateway-Satellite Link Budget

| Gateway Terminal VHF Bands | 15 DEGREE ELEVATION | | 90 DEGREE ELEVATION | |
|---|---|---|---|---|
| | UP-LINK | DOWN-LINK | UP-LINK | DOWN-LINK |
| Peak Transmit Power (Watts) | 1.8 | 2.5 | 1.8 | 2.5 |
| Transmit Antenna Peak Gain (dB) | 16 | 5.4 | 16 | -2 |
| Pointing Loss (dB) | -3 | 0 | -3 | 0 |
| EIRP (dBW) | 15.6 | 9.4 | 15.6 | 2.0 |
| Frequency (MHz) | 149 | 137.5 | 149 | 137.5 |
| Slant Range (KM) | 2588 | 2588 | 1100 | 1100 |
| Polarization Loss (dB) | 1.0 | 1.0 | 1.0 | 1.0 |
| Gaseous Loss (dB) | 0.5 | 0.5 | 0.13 | 0.13 |
| Total Transmission Loss (dB) | 145.7 | 145.0 | 137.9 | 137.2 |
| Receive Antenna Peak Gain (dB) | 5.4 | 16 | -2 | 16 |
| Pointing Loss (dB) | 0 | -3 | 0 | -3 |
| Antenna Loss (dB) | 2 | 2 | 2 | 2 |
| Receiver Noise Figure (dB) | 4 | 4 | 4 | 4 |
| G/T (dB) | -23.2 | -17.8 | -30.6 | -17.7 |
| Uncoded Burst Data Rate (Kbits/sec) | 50 | 50 | 50 | 50 |
| Required Eb/No (dB) | 9 | 9 | 9 | 9 |
| Implementation Loss (dB) | 2 | 2 | 2 | 2 |
| Required C/No (dB-Hz) | 58.0 | 58.0 | 58.0 | 58.0 |
| Link Margin (dB) | 17.2 | 17.2 | 17.6 | 17.7 |
| Peak Flux Density in 4 KHz (dBW/m2) | -129.2 | -138.4 | -121.8 | -138.4 |
| Doppler (KHz) | 2.2 | 2.0 | 0.0 | 0.0 |
| XTM ANT HPBW (deg) | 22.5 | 76.3 | 22.5 | 178.8 |
| REC ANT HPBW (deg) | 76.3 | 22.5 | 178.8 | 22.5 |
| Sky Temp (K) | 295 | 1032 | 295 | 1009 |
| Tsys | 732 | 1197 | 732 | 1182 |
| Earth Cov Angle (deg) | 111 | | 0 | |
| Earth Cov Area (KM^2) | 1.47E+07 | | 0.00E+00 | |
| Doppler (KM/S) | 4.3 | | 0.0 | |
| Mean Absor Temp (K) | 294.96 | | 294.96 | |
| Earth Radius (KM) | 6378 | | 6378 | |
| Orbital Height (KM) | 1100 | | 1100 | |
| Elev Angle Mask (deg) | 15 | | 90 | |
| Surface Temp (deg-C) | 35 | | 35 | |
| Bandwidth (KHz) | 28.5 | 28.5 | 28.5 | 28.5 |

POLAR RELAY SYSTEM FOR SATELLITE COMMUNICATION

CROSS-REFERENCES TO RELATED PATENT APPLICATIONS

The present application is a continuation-in-part of each of the following commonly-owned and commonly-assigned patent applications:

*Satellite System using Equatorial and Polar Orbit Relays* by Mark A. Sturza et al., filed on 28 Mar. 1994, and assigned U.S. Ser. No. 08/216,820; abandoned and

*Optimal Coverage Satellite System* by Mark A. Sturza, filed on 12 Oct. 1994, and assigned U.S. Ser. No. 08/319,819; and

*Polar Relay Method for Satellite* by James R. Stuart, filed on 9 Nov. 1993, and assigned U.S. Ser. No. 08/149,574 abandoned.

CLAIMS FOR PRIORITY

The Applicant hereby claims the benefit of priority under Section 120 of Title 35 of the United States Code of Laws for any and all subject matter which is commonly disclosed in the present application and in patent application U.S. Ser. No. 08/149,574 entitled *Polar Relay Method for Satellite System* by James R. Stuart, filed on 9 Nov. 1993 now abandoned, and in patent application U.S. Ser. No. 08/216,820 entitled *Satellite System Using Equatorial & Polar Orbits* by Mark A. Sturza et al., filed on 28 Mar. 1994 now abandoned, and in pending patent application U.S. Ser. No. 08/319,819 entitled *Optimal Coverage Satellite System* by Mark A. Sturza, filed on 12 Oct. 1994. The Applicant claims the benefit of priority for any and all subject matter that is commonly disclosed in the present patent application and in the three applications identified above.

FIELD OF THE INVENTION

The present invention relates to the field of telecommunications. More particularly, this invention provides a non-geostationary, store-and-forward, non-real time satellite communication system.

BACKGROUND OF THE INVENTION

The Increasing Demand for Telecommunications Services

Over the past few decades, the demand for access to information has increased dramatically. Although conventional wire and fiber landlines, cellular networks and geostationary satellite systems have continued to expand in an attempt to meet this relentless growth in demand, the existing capacity is still not sufficient to meet the burgeoning global appetite for telecommunications services.

In European Patent Application EP 365-885-A, and U.S. Pat. No. 5,410,728 Bertiger et al. disclose a *Satellite Cellular Telephone and Data Communications System*. This system, known as Iridium™, comprises 48 low Earth orbit satellites. These satellites communicate with gateways and terminals on the ground and among each other via intersatellite links. Unlike a store-and-forward system, Iridium™ is designed to provide real-time service.

Several previous efforts to enhance worldwide communications capabilities are briefly described below. Robert R. Newton disclosed a *Multipurpose Satellite System* in his U.S. Pat. No. 3,497,807. Newton describes a system in which "any point on Earth is always within the line of sight of some satellite and any satellite is always within the line of sight of an adjacent satellite in the same orbital plane." See Newton, Column 2, Lines 4–7.

U.S. Pat. No. 4,135,156 by Sanders et al., entitled *Satellite Communications System Incorporating Ground Relay Station Through Which Messages Between Terminal Stations Are Routed*, contains a description of a "satellite relay communications system" that "includes a ground relay station arranged so that each message from one subscriber to another is relayed by the satellite relay to the ground relay, processed by the ground relay and then transmitted to the second subscriber by way of the satellite relay." See Sanders et al., Abstract, Lines 1–6.

Paul S. Visher disclosed a *Satellite Arrangement Providing Effective Use of the Geostationary Orbit* in his U.S. Pat. No. 4,375,697. His Patent recites a "satellite squadron or cluster formation" which "is disposed in a predetermined location in ... geostationary orbit ...." See Visher, Abstract, Lines 1–2.

In their U.S. Pat. No. 5,119,225, Michael Grant et al. explain their *Multiple Access Communication System*. The inventors disclose a system that incorporates "a node spacecraft" in geostationary orbit that works in combination with "several user spacecraft" in low Earth orbit. See Grant et al., Abstract, Lines 1–3.

The history of mobile communications can be seen as an effort to make service widely available on both a geographic and economic basis. Early mobile communications systems served the needs of individual companies on a private basis. Through technology advances and regulatory changes, mobile communication services were offered on a commercial basis and grew to meet city, regional, national and even international coverage needs through interconnection to public networks. As part of this evolution, wireless network standards have developed, on both a national and international basis, although there are still no truly international seamless wireless networks.

As mobile communications networks have expanded geographically, prices for equipment and services have fallen dramatically. The decline in price of mobile services is one of the most important forces helping mobile communications reach broad-based markets and demonstrate rapid subscriber growth. The forces driving development of terrestrial wireless communications include:

Advances in Technology:
  Advances in radio propagation management, computer micro-processing, the ability to interconnect networks and miniaturization have all combined to make more efficient use of spectrum and to lower equipment and service prices.
Declining Prices:
  As production increases for infrastructure and terminal equipment, manufacturers experience economies of scale which lead to lower prices for equipment.
Digital Technology:
  Digital technology is replacing analog technology in almost all wireless communication services. The switch to digital technology allows higher subscriber capacities to be served, enhances services and lowers the cost per subscriber for operators.

The resulting reductions in service and equipment cost attributable to the factors described above have allowed mobile communications to penetrate both business and consumer markets. The ultimate goal of wireless services is to provide two-way, ubiquitous, affordable communications services. It was only very recently, with the introduction of mobile satellite services, that this has been made possible. Indeed, mobile satellite services are the final step in the evolution of wireless communications service and are the only services which can provide this ultimate goal of ubiquitous wireless communication.

Terrestrial-Based Mobile Communications Services

Currently, there are five major types of public mobile communications services used throughout the world:
Cellular:

Cellular provides primarily two-way, interconnected voice service with mobile, transportable and portable telephones. Reusing frequencies within a relatively small geographic area with multiple, low power transmission sites is cellular's distinguishing technical characteristic. Cellular also provides a platform for data transmission, although the vast majority of traffic over cellular is voice at this time.
Paging:

Paging provides primarily one-way data transmission of numeric and alphanumeric messages. Relative to cellular, paging is less expensive but does not offer voice or two-way communications capabilities.
Private Radio/SMR:

Private radio has largely grown out of the need for dispatch and fleet companies to utilize internal radio systems. Private radio provides primarily two-way voice service to closed user groups, but may also provide interconnected and mobile data services. SMR (Specialized Mobile Radio) is a subset of private radio with the distinguishing characteristic that service is provided on a commercial basis to businesses by carriers instead of the businesses owning their own systems.
Mobile Data:

Several networks have been established, such as RAM's Mobitex™ and Motorola's ARDIS™, for the exclusive transmission of mobile data. Cellular, paging, and SMR operators are all considering ways in which to modify their networks to better handle two-way data transmission.
Personal Communications Services (PCS):

Using microcell technology, PCS includes a wide range of voice and data services. One-way outgoing PCS services, called "CT-2", are licensed in several countries such as the U.K., Taiwan and the Netherlands.

The growth and evolution of mobile services show that subscribers migrate from basic limited services to more advanced services over time. The growth of terrestrial-based mobile services will increase the awareness and demand for enhanced mobile satellite services. Moreover, mobile satellite services will be able to provide service in areas that cannot be economically served using terrestrial networks.

Wireless Communications

As a result of the advances in technology, privatization and decreasing prices on a worldwide basis, wireless communications have undergone a rapid increase in subscriber growth in the past several years. The result is that new enhanced wireless services tend to gain market acceptance more rapidly than did earlier wireless technologies. FIG. 40 shows that with each successive service introduction (paging, SMR and cellular), the time it took for that service to reach one million subscribers shrank considerably. This phenomenon is attributable to the increasing functionality, value relative to price, and awareness among the population of each successive technology. Paging was introduced with only one-way, non-voice communications at a relatively high price. SMR provided two-way communications, but only within a closed user-group. Finally, cellular offered two-way interconnected voice with increasingly wide area coverage. FIG. 41 demonstrates the accelerated growth of each service. The result of the rapid growth in wireless services worldwide builds an awareness and future demand for the benefits of advanced wireless communications.

Mobile Satellite Services

Mobile satellite services are uniquely positioned to complete the evolution of wireless services. These services offer:
Ubiquitous Coverage:

Satellites, by their very nature, provide the capability of global coverage. The economics of terrestrial-based networks is such that universal coverage is not a realistic goal.
Interconnection with Other Networks:

Mobile satellite services will be able to interconnect with a number of voice and data networks, both wired and wireless, and therefore provide a wide array of services and network access.
Variety of Services:

Mobile satellites will be able to support both voice and data terminals, depending upon the particular need of the user. In general, however, voice service will be expensive relative to data, due to the greater infrastructure required for voice communications and the generally greater efficiency of data communications.

None of the systems described above are capable of supplying a very low cost yet worldwide communications network that does not require expensive and complex terrestrial systems, geosynchronous satellites or very costly low Earth orbit satellites having intersatellite links. The development of such a system would constitute a major technological advance and would satisfy a long felt need in the electronics and telecommunications industries.

SUMMARY OF THE INVENTION

One of the preferred embodiments of the present invention is a satellite system that includes twelve satellites organized into four polar orbits which are each occupied by three satellites. The satellites are designed to operate in a circular low Earth orbit at an altitude of 1,100 kilometers (683 miles). The present invention system will provide store-and-forward data services on a non-real time basis to any point on the globe. The systems disclosed below are unique in their ability to provide affordable worldwide service, resulting in a competitive advantage over other terrestrial and previous satellite-based service providers.

One of the preferred embodiments provides a system for transmitting a message between two terminals on the ground through a store-and-forward network. A first satellite traveling in a first polar orbit receives and stores a message from a sending terminal on the surface of the Earth. As the first satellite passes over the North Pole, it transmits the stored message from the sending terminal down to a relay station located near the North Pole. The message is stored at this polar relay station until a second satellite moving in a second orbit flies within range. At that time, the polar relay station sends the stored message up to the second satellite, which stores the message and finally transmits it to a receiving terminal somewhere on the ground. This store-and-forward relay method takes advantage of the geometry of a system that employs more than one satellite which each operate in different polar orbits. All the satellites in the system travel within range of a single polar relay system on a frequent basis. The different polar orbits allow the satellites to fly over different parts of the globe frequently. A message can be conveyed across great distances through a pathway that includes one uplink from the sending terminal to the first satellite, a downlink to the polar relay, an uplink to the second satellite and then a downlink to the receiving terminal. The rotation of the Earth beneath the satellites allows every satellite in the system to fly over vast regions of the Earth's surface and, therefore, to communicate with a very large number of terminals located virtually anywhere in the world. The use of polar relays constitutes a novel and important improvement over real-time systems which require much more expensive and complicated intersatellite links and satellite switching capabilities.

The present invention is designed to supply affordable Non-Voice, Non-Geostationary Mobile Satellite Service (NVNG MSS) in several markets:

TracSat: tracking and monitoring for the transportation industry.

SecurSat: fixed site monitoring of industrial/utility locations, monitoring and tracking for misplaced or stolen assets.

MailSat: transmission of e-mail.

PageSat: two-way alphanumeric paging.

EmerSat: emergency services.

The services, demand and markets for each are described below and summarized are in Tables One and Two.

TracSat

TracSat is designed to provide monitoring and tracking services for mobile applications. The main target audience for this application is the transportation industry. TracSat allows a fleet of trucks, for example, to be tracked by a central dispatcher. This enables companies to make efficient routing schedules and optimize loads as well as improve customer service quality. TracSat is particularly useful for shipments involving hazardous cargo or perishable goods. Other applications include container tracking for railroads and shipping companies.

TracSat will also have capability to provide both short messaging and traditional e-mail services. The dual tracking and messaging capability will provide added value at a very low cost. TracSat may be used with many different types of transceivers, depending upon the particular application.

TracSat has a high demand potential due to the unavailability of low cost terrestrial based services for this market segment, the enhanced productivity and revenue potential associated with timely information, and the fact that there are millions of trucks, ships and railroad cars in the United States.

Demand for TracSat

Among all of its service offerings of the present invention, the highest initial demand may exist for TracSat. There is an immediate and identifiable need in the transportation sector for monitoring, short messaging and tracking services not being provided cost effectively by current service offerings.

Trucking:

There are over 44 million trucks in the U.S., including nearly 2 million long-haul trucks and 500,000 truck-load carriers. Most would experience operating efficiencies, the accompanying financial benefits, resulting from more frequent communication between truck and dispatch center. Unfortunately, many trucking entities cannot afford today's service offerings.

Maritime:

The maritime industry is currently the largest user of mobile satellite services. Almost all ocean going vessels employ some type of mobile satellite service. In addition, recreational owners of large sailboats or yachts usually have mobile communications services on board their vessels.

Worldwide, there are over 30,000 merchant shipping vessels that engage in international trade. In addition to international vessels, there are commercial vessels engaged in fishing or local or regional shipping. In the U.S. alone, there are 196,000 registered commercial vessels, of which 16,000 are over 100 gross tons and 32,000 over five tons, mostly fishing vessels.

In addition to commercial vessels, recreational boaters also are users of mobile communications. In the U.S. there are 50,000 yachts longer than 40 feet and an additional 370,000 recreational boats 28 to 40 feet long.

Containers and Hazardous Material:

Satellite services are particularly well suited to address the needs of the container market. Containers tend to be transferred one or more times between loading point and final destination, even moving from one type of transport to another: truck, rail and maritime vessel. The ability to locate the container at any point in time, not just its last known location, will result in tighter security, faster correction of errors, better customer service and ultimately improved financial performance. There are over five million boxcars and containers in the U.S.

The same principles also apply to hazardous material. The ability to locate transport vehicles will help to promote the safe and secure movement of hazardous materials.

SecurSat

SecurSat is designed to provide monitoring of remote utility plant equipment or remote assets or site locations such as vehicles, boats and vacation homes. SecurSat service relays temperature, humidity and other monitoring type information and relays notification of security breaches.

A potentially large market for SecurSat will be industrial, utility and agricultural monitoring for remote locations. Industrial and utility monitoring, for example, involves collecting plant output data at a remote location via a monitoring device and transmitting the data to a central computer via the satellite. This allows notification if there is a problem at the remote plant, without physically visiting the location. A related application for SecurSat is SCADA (Supervisory Control and Data Acquisition) applications, which focus primarily on oil well monitoring. There are additional applications within the agriculture sector where SecurSat could be used to monitor and/or control factors such as water flow, rainfall and irrigation levels, and soil moisture.

Demand for SecurSat

SecurSat will be used by utilities and remote oil and mineral exploration companies for monitoring of their plant, oil wells and pipelines. Although each site or monitoring location will generate small revenues, the market for SecurSat will be huge in numbers. In the U.S. the addressable market for SecurSat includes:

900,000 oil and gas wells requiring monitoring and/or control;

220,000 sites on oil and gas pipelines requiring monitoring; and 100,000 data gathering stations operated by the U.S. government.

In addition, there are over 150 million utility meters in the U.S. These, too, represent a significant market for SecurSat.

MailSat

MailSat service includes the transmission of electronic mail (e-mail) via satellite. MailSat is targeted to the business community's need for wireless electronic mail. E-mail is an efficient form of communications because it does not involve the encoding and decoding of optically scanned material, but rather, the transmission of data which is already encoded. E-mail is therefore becoming widely recognized as a cost effective means to transmit data. Under this service, the communication link between the present invention and the transceiver is designed to both receive and send messages, and will be equipped with an antenna to facilitate communication with the satellite.

Demand for MailSat

As more and more members of the business community take advantage of e-mail, they will also want the capability to access e-mail via wireless services, leading to a strong market for MailSat. The primary audience for MailSat includes frequent business travelers, of which there are over one million in the U.S. alone, and portable PC users.

PageSat

PageSat is designed to take advantage of the tremendous growth of the paging market by offering an enhanced paging service. PageSat will provide two-way alphanumeric paging service for both personal and business users that will work anywhere in the world. The transceiver itself will be somewhat larger than a traditional pager and will have an antenna to facilitate communications with the satellite.

Demand for PageSat

Paging service is widely available across the United States, yet there remains a need among business travelers to supplement terrestrial systems—to fill in location gaps not covered by existing systems and/or to utilize paging services at the high end of the paging functionality spectrum not generally available.

One indication of the strong demand for wide area paging service is the growth in nationwide paging in the U.S. There were over 240,000 nationwide paging users in the U.S. as of July 1993. While called nationwide paging, today's services operate on terrestrial-based paging networks that are linked together either by landline or satellite networks. PageSat will offer true ubiquitous service.

EmerSat

EmerSat users will be those requiring aid or assistance. An alarm message will be activated, as in the case of vehicle malfunction or by a search and rescue team, notifying a central dispatch bureau of the situation. Another feature of EmerSat is the ability of a user to determine his or her position if lost. EmerSat is designed as a low cost, high penetration service where the user pays no monthly usage fee except when the service is utilized.

Demand for EmerSat

Designed for those requiring help, there are numerous applications for EmerSat:

Vehicle malfunction assistance;

Calls for help from the elderly and handicapped; and

Search and rescue tool.

EmerSat could be built into vehicles at the factory or added as an option in the aftermarket, and small devices can be developed for other market segments.

TABLE One

Services and Demand Segments

| Segment | Service | Message Type | Description |
| --- | --- | --- | --- |
| Transportation | TracSat, SecurSat | Short, frequent status and location messages | Messaging and location for trucking, maritime and railroads |
| Remote monitoring | Secursat | Short telemetry messages and status monitoring | Pipeline, environmental and agricultural monitoring |
| Industrial/utility | SecurSat | Short telemetry messages and status monitoring | Monitor plant facilities, utilities and meters in remote locations |
| Personal/business communications | MailSat, PageSat | Alpha-numeric messages, short-medium length e-mail messages | Alpha-numeric paging, e-mail and mobile computing for frequent business travelers |
| Commercial/residential security | SecurSat, EmerSat | Short alarm notification messages | Stolen assets and security breaches; accident notification, etc. |

TABLE Two

U.S. Domestic Market for NVNG MSS Services:

| | |
| --- | --- |
| TracSat | |
| Trucking Maritime | 2.5 MM |
| Commercial | 50K |
| Yachts | 50K |
| Recreational | 370K |
| Boxcars and containers | 5 MM |
| SecurSat | |
| Oil and gas wells | 900K |
| Pipeline monitoring sites | 220K |
| Government data gathering stations | 100K |
| Utility meters | 150 MM |
| MailSat | |
| Frequent business travelers | 1 MM |
| PageSat | |
| Nationwide paging subscribers | 240K |
| EmerSat | |
| Emergency road service subscribers | 50 MM |

Competition

The present invention will face competition from both terrestrial and satellite-based service providers. The most significant competition will come from other mobile satellite services.

Types of Satellite Systems

There are three basic types of mobile satellites, each having unique characteristics:

Geostationary (GEO):

In this configuration, a single satellite is positioned roughly 22,300 miles above the Earth to provide regional coverage. These systems are characterized by high transmitting power which results in relatively expensive and bulky end-transceivers for both voice and data. Voice communications generally experience a delay, often described as an echo. GEO satellites are also relatively expensive to launch and construct, costing hundreds of millions of dollars.

Low-Earth Orbit/Above 1 GHz (LEO):

In this configuration, a number of satellites are deployed in a constellation, orbiting 500 to 1,000 miles above the Earth. The lower orbit permits lower power transmissions both from the satellite and the subscriber terminals, enabling the use of smaller and more lightweight portable terminals than with GEOs. These systems, however, are relatively expensive due to the number of satellites required for worldwide coverage and the complexities and costs associated with providing intersatellite communications links. This more complex and expensive architecture leads to higher customer prices. In addition, voice and data terminals are still relatively expensive since this system operates on a higher frequency, which requires more expensive components. The Iridium™ system disclosed by Bertiger et al. in EP Application No. 365-885-A is an example of an expensive real-time LEO system that must rely on intersatellite links to convey messages.

Non-Voice, Non-Geostationary Mobile Satellite Service (NVNG MSS):

In contrast to GEOs and big LEOs, NVNG MSS satellites are smaller, less expensive, and less complex to launch. NVNG MSS satellites are typically deployed in a constellation of up to 26 satellites and operate on UHF and VHF frequencies based on common terrestrial based transmission standards used in the private radio industry. Terminal cost is the lowest among the satellites types as economies of scale are already present for the equipment. The NVNG MSS provides data communications, location information and messaging and uses relatively small antennas.

Satellite System Cost

GEO and LEO satellite systems cost substantially more than NVNG MSS satellite systems, in general, due to the nature of the satellites being deployed. Motorola's Iridium™ has an estimated cost of $3.4 billion. GEO satellite systems cost from $500 million for AMSC's to $660 million for Celsat's proposed satellite system. The present invention, Leo One USA's™ NVNG MSS satellite system, is the lowest cost of any of these satellite systems.

One reason the present invention will cost less than other NVNG MSS systems is that its design is unique and minimizes the number of ground stations and satellites required to provide data services.

End-User Equipment Cost

The present invention will employ transceiver equipment costs that average $300–$500. This cost is competitive with terrestrial-based wireless systems and significantly less expensive than GEO and LEO.

An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

In FIG. 3, the satellite transmits the message which it had previously received and stored down to a ground based gateway located in Alaska.

Figure 14:
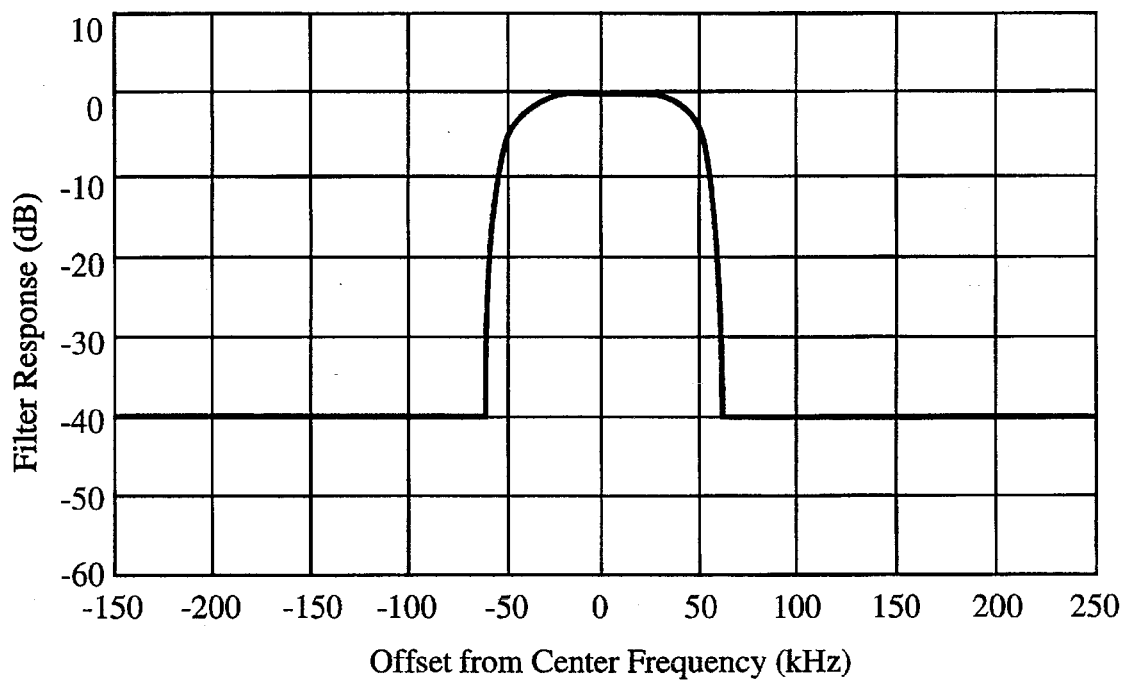

FIG. 14 portrays the TSD transmit filter response characteristic.

Figure 15:
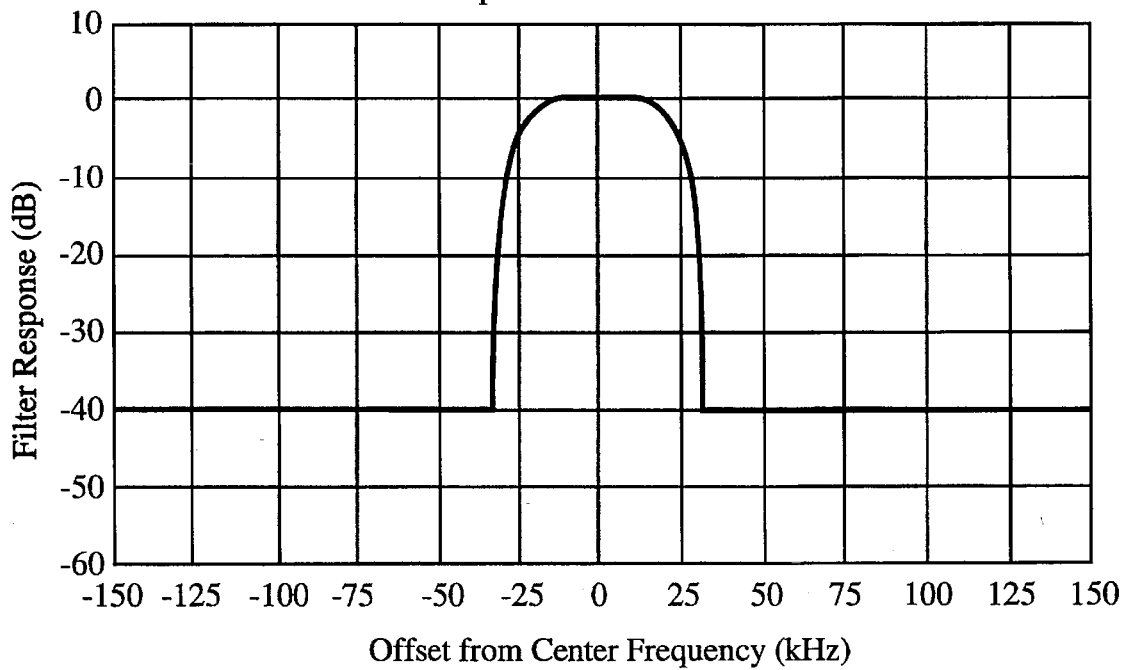

FIG. 15 illustrates the GSD transmit filter response characteristic.

Figure 16:
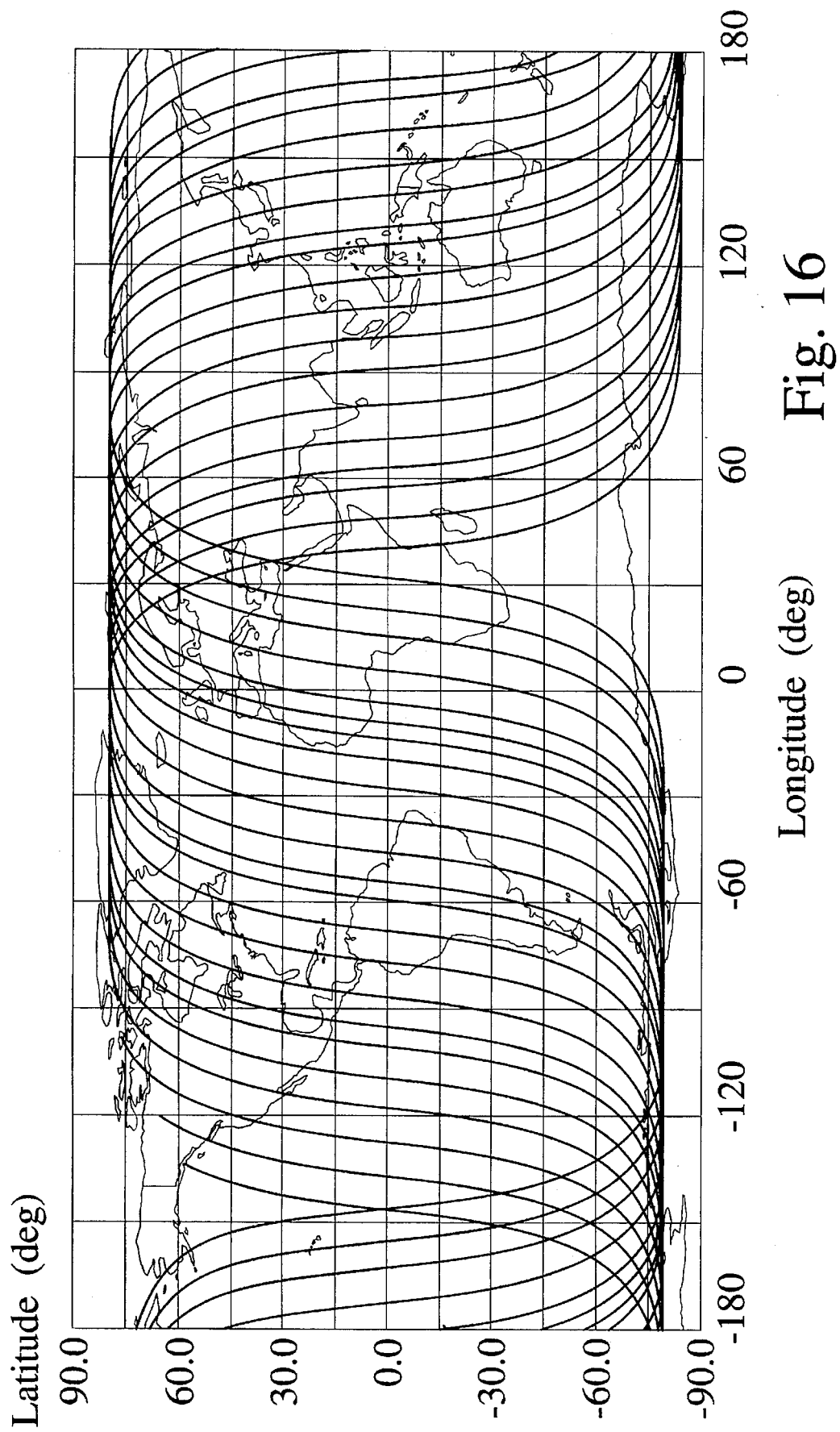

FIG. 16 shows the ground traces of the satellite constellation above the Earth over approximately two orbital periods.

Figure 17:
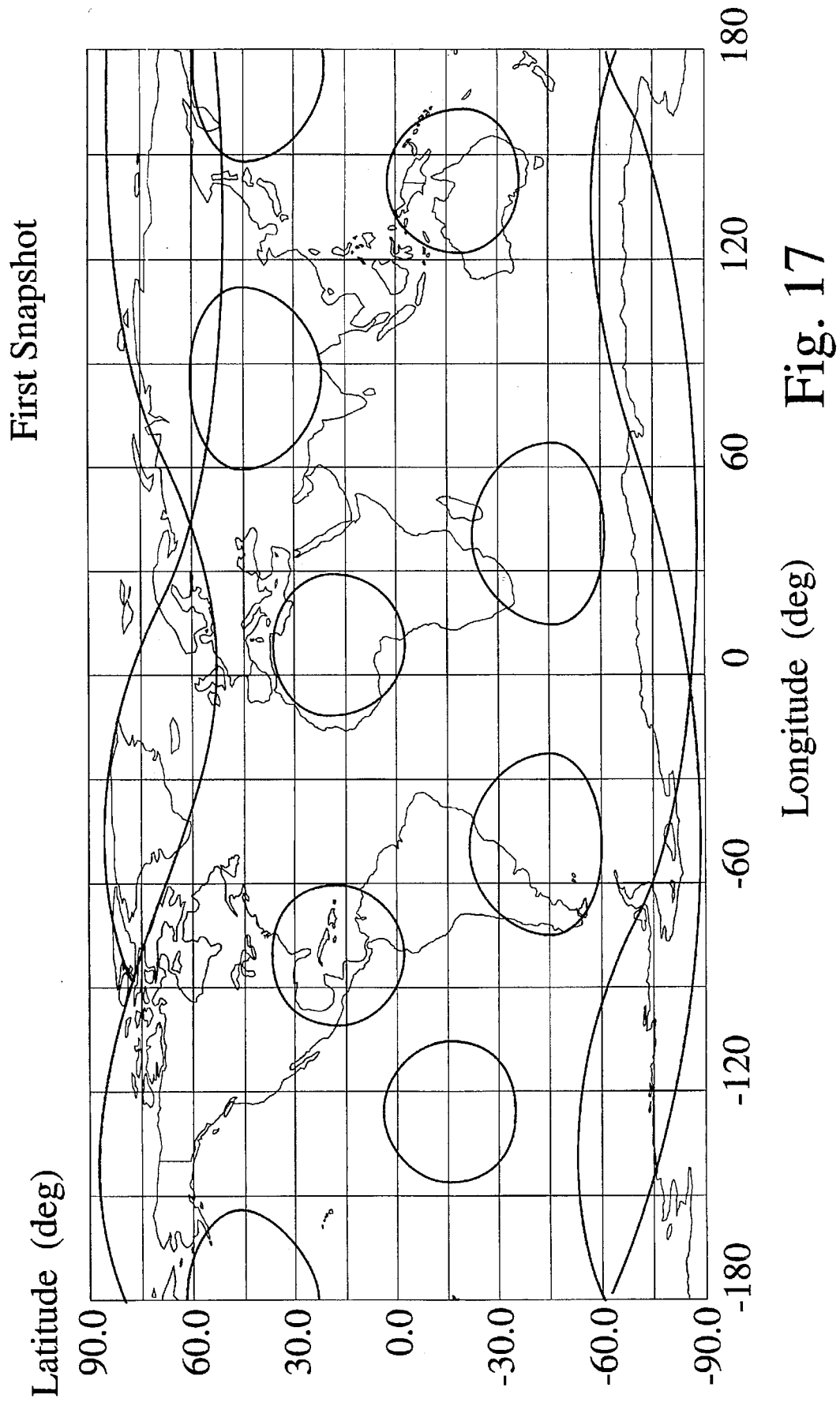
Figure 18:
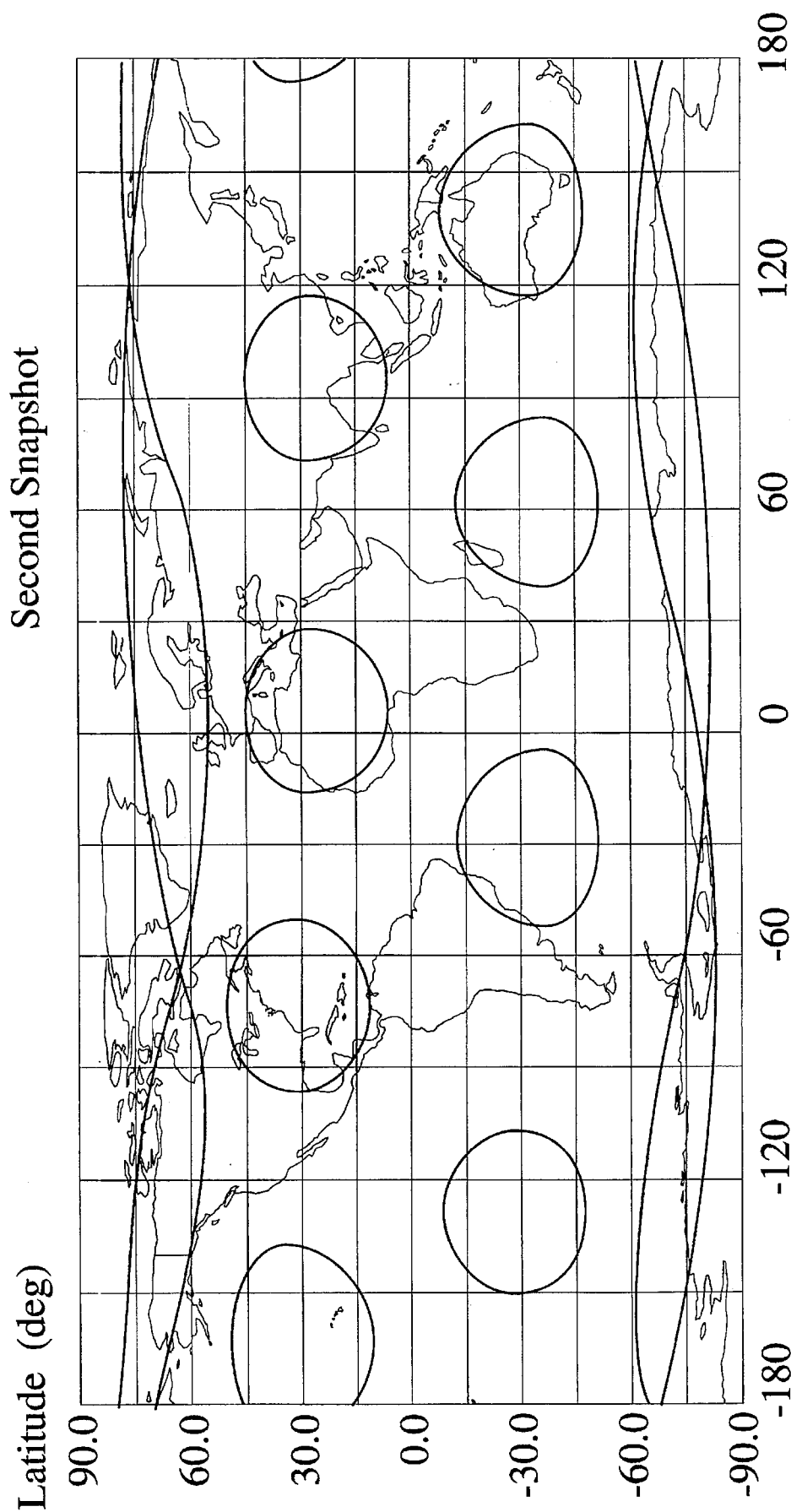

FIGS. 17 and 18 show the satellite constellation coverage over the Earth at two different times.

Figure 19:
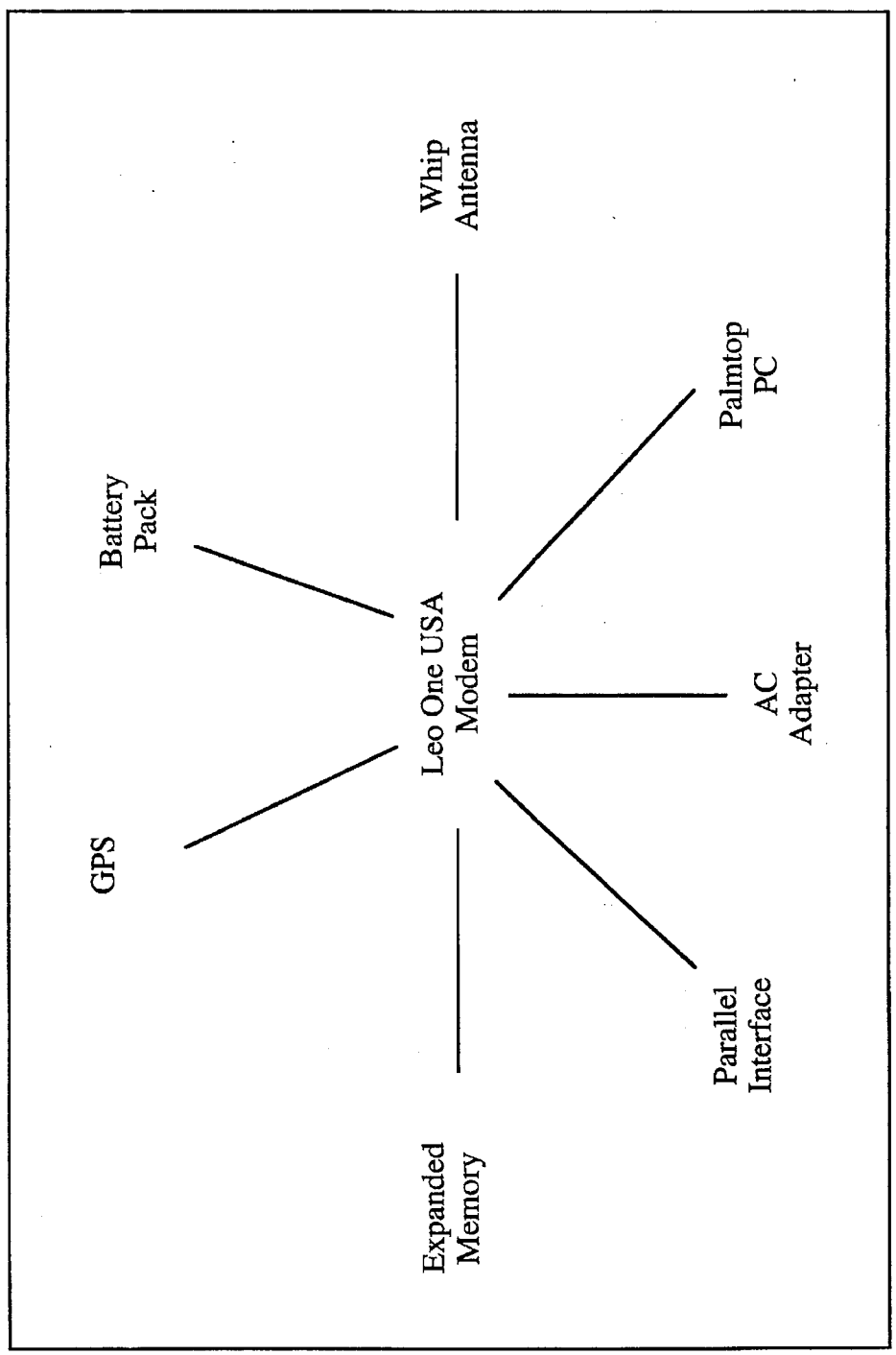

FIG. 19 is a functional illustration of the various modules that may be used with the present invention.

Figure 20:
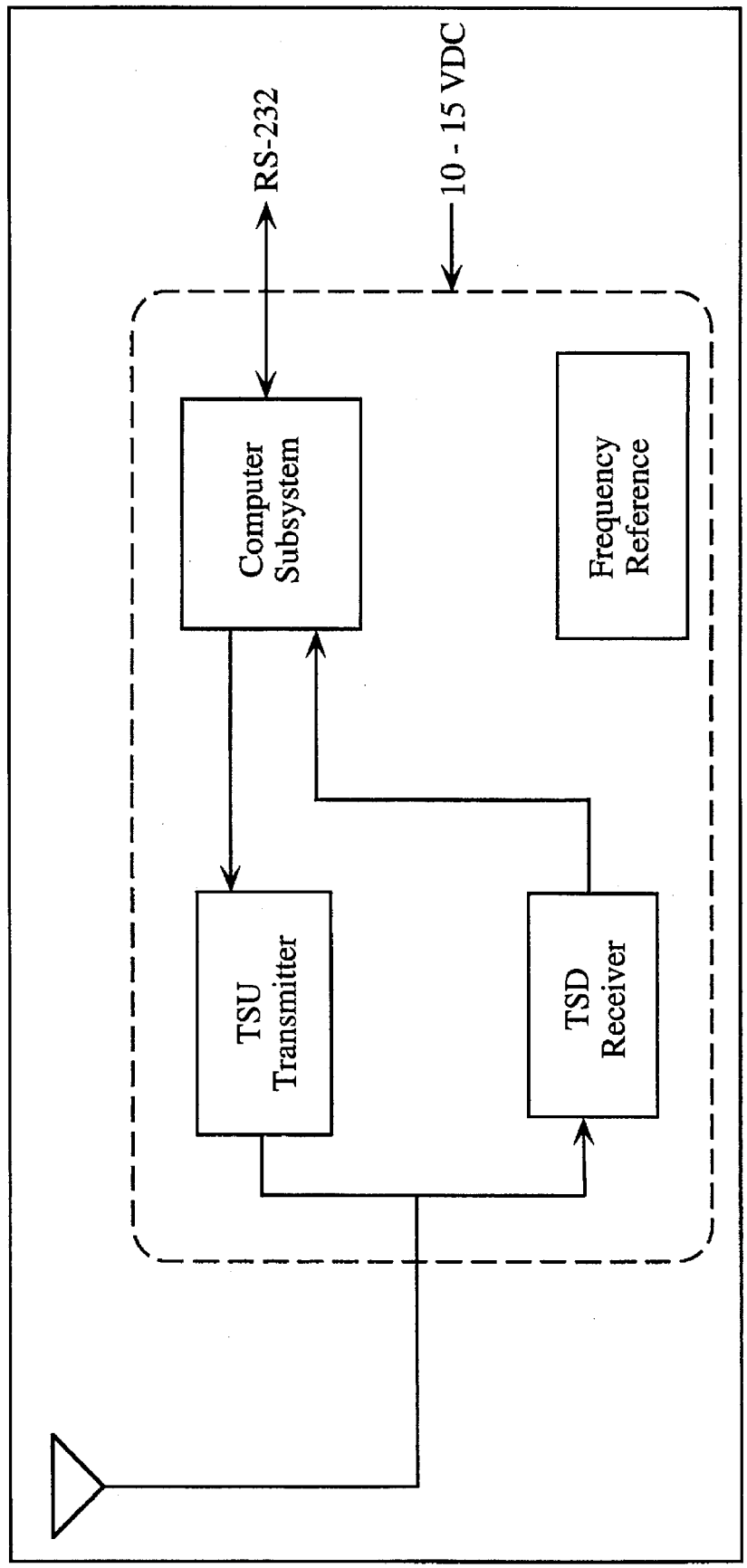

FIG. 20 is a functional block diagram of the modem.

Figure 21:
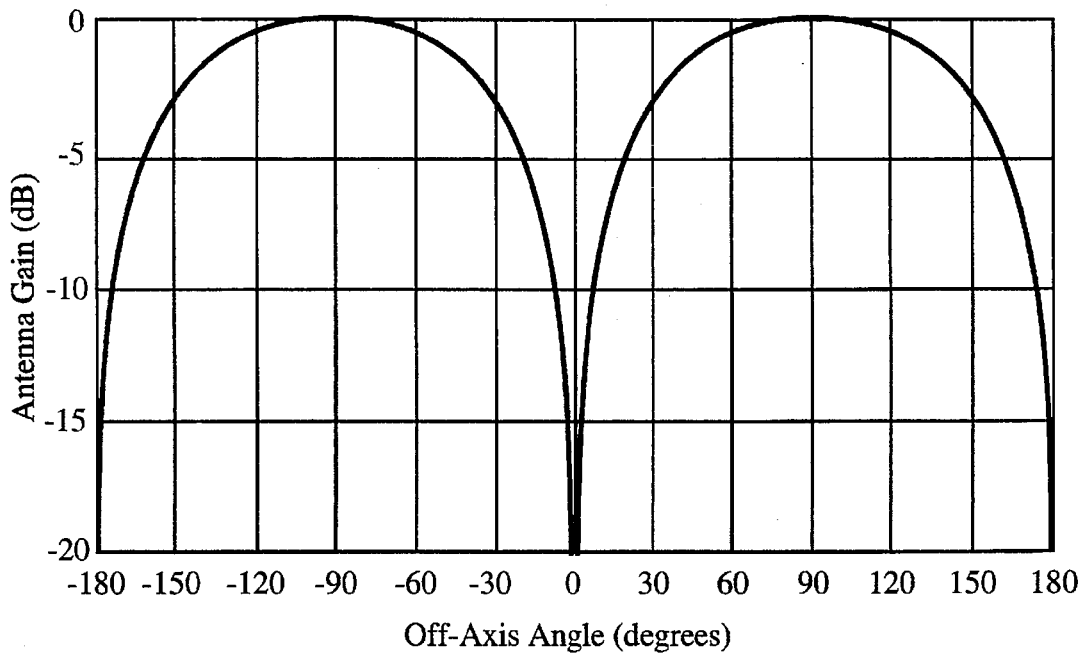

FIG. 21 shows an antenna gain pattern for a typical user terminal.

Figure 22:
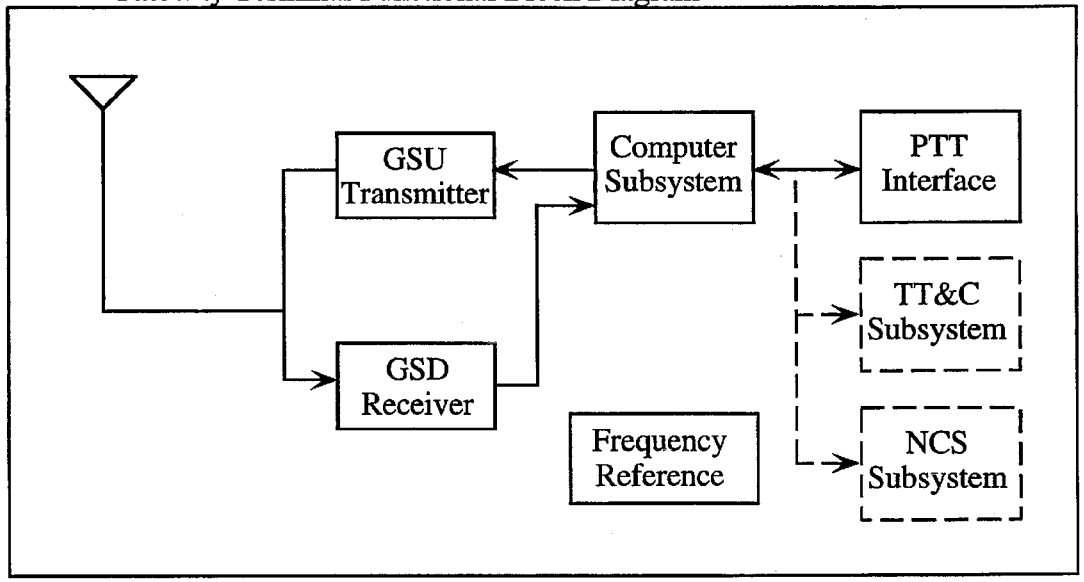

FIG. 22 is a function block diagram that reveals the gateway terminal.

Figure 23:
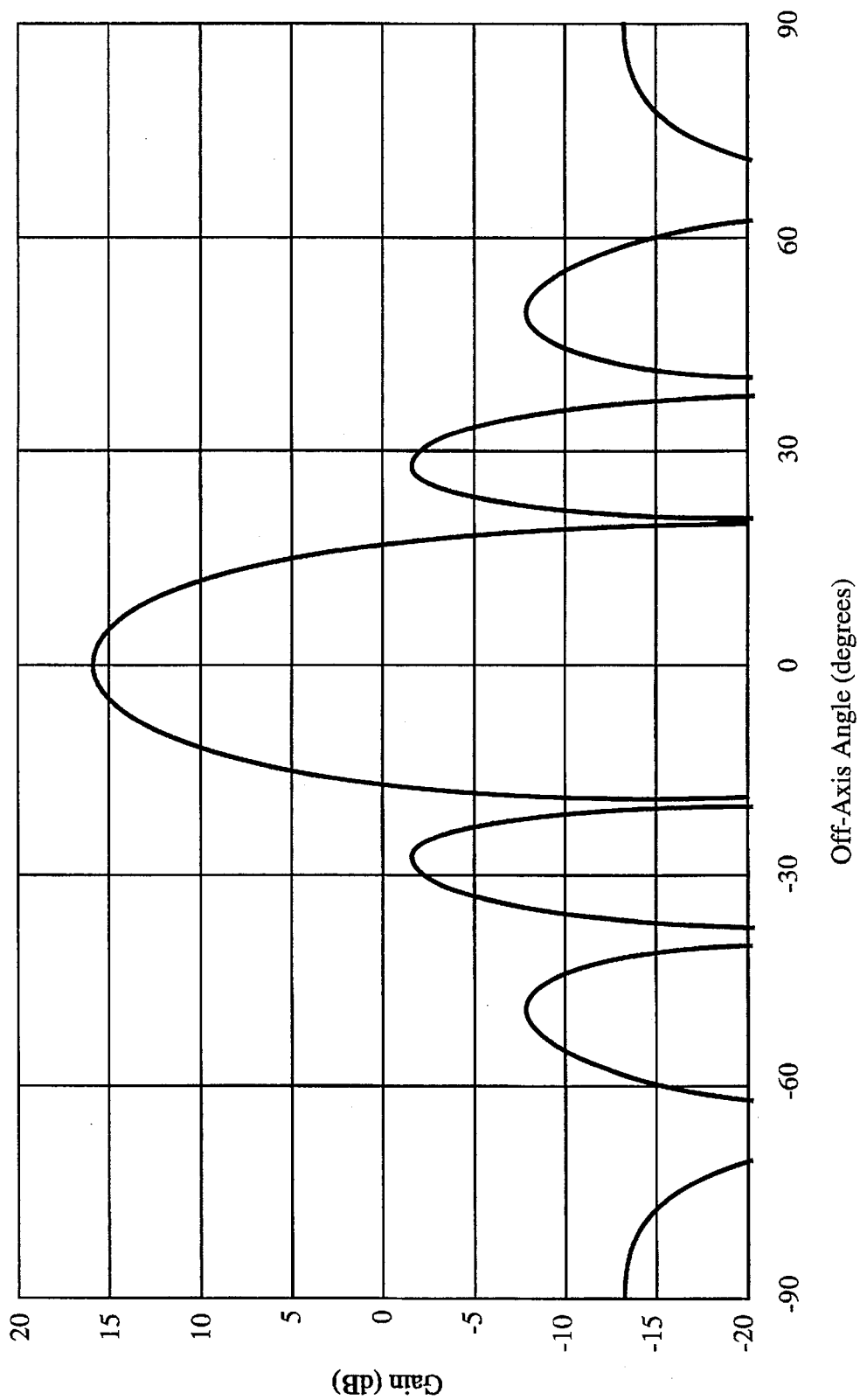

FIG. 23 is transmit and receive antenna pattern for the gateway terminal.

FIG. 24 shows the link budgets for the terminal-satellite links for 90 degree and 15 degree elevation angles.

FIG. 25 shows the link budgets for the gateway-satellite links for 90 degree and 15 degree elevation angles.

Figure 26:
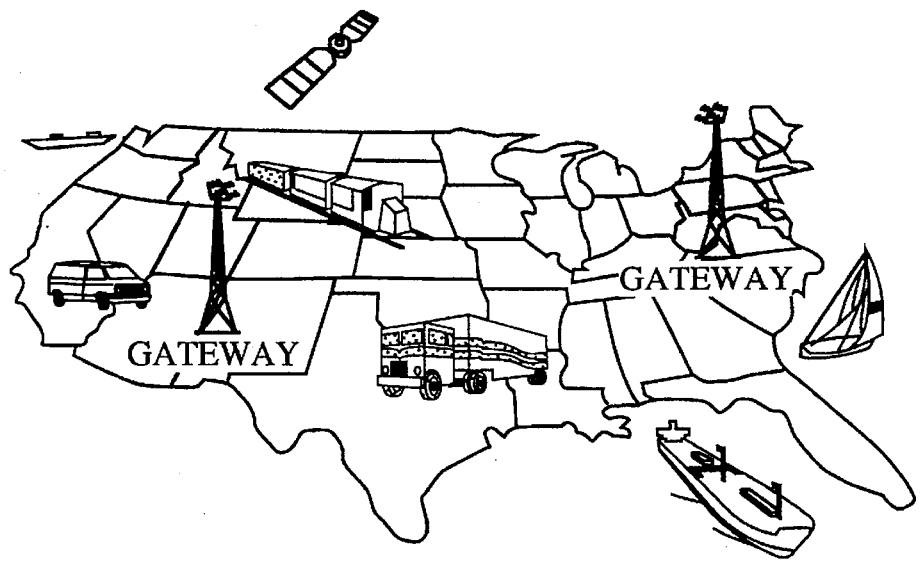

FIG. 26 illustrates one of the service offerings provided by the present invention, known as TracSat, which provides monitoring and tracking services for mobile applications.

Figure 27:
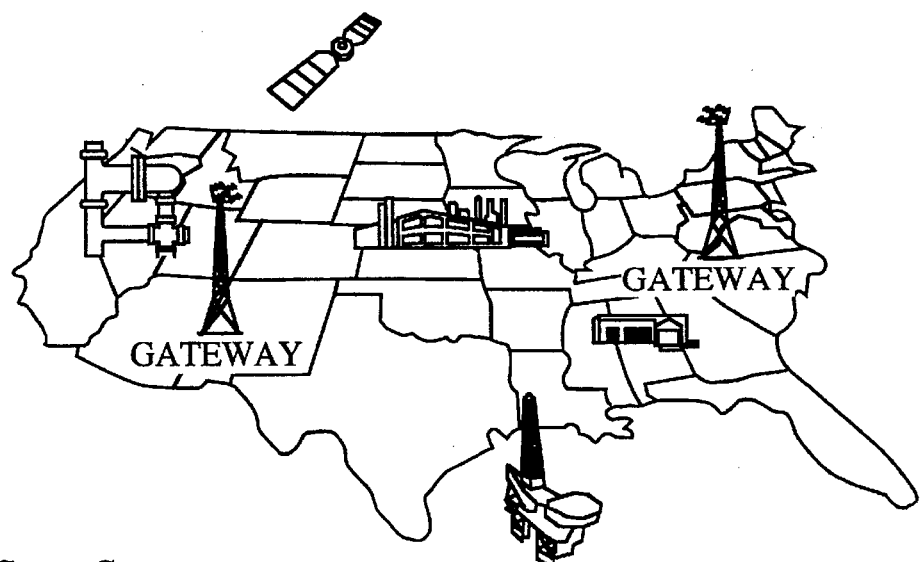

FIG. 27 illustrates another service offering provided by the present invention, known as SecurSat, which provides monitoring of remote utility plant equipment or assets or site locations such as vehicles, boats and vacation homes.

Figure 28:
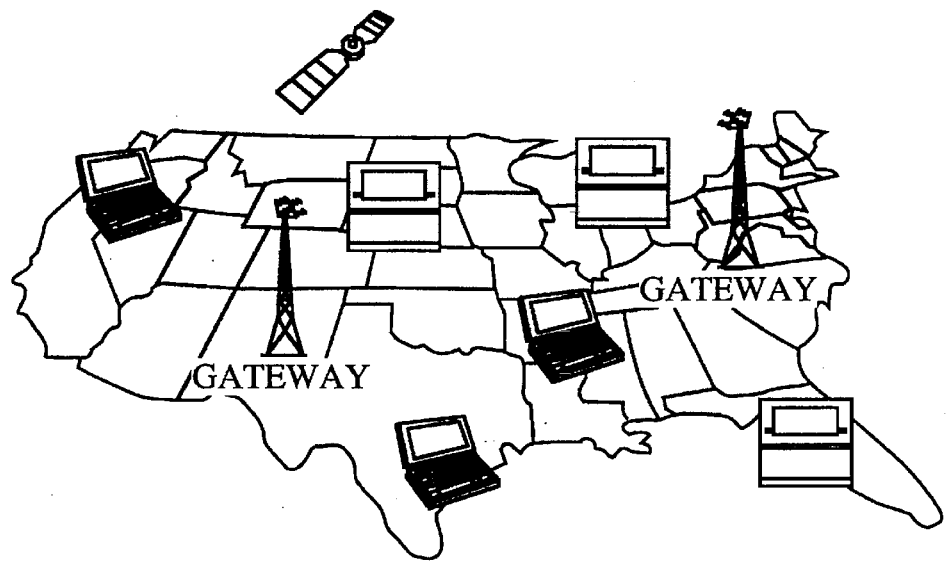

FIG. 28 illustrates another service offering provided by the present invention, known as MailSat, which includes the transmission of electronic mail (e-mail) via satellite.

Figure 29:
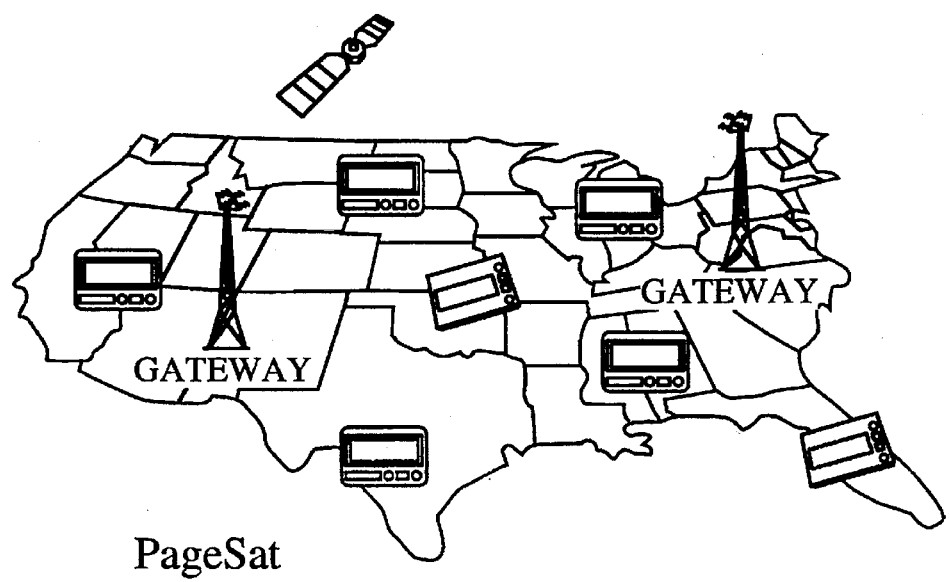

FIG. 29 illustrates another service offering provided by the present invention, known as PageSat, which provides two-way alphanumeric paging service for both personal and business users that will work anywhere in the world.

Figure 30:
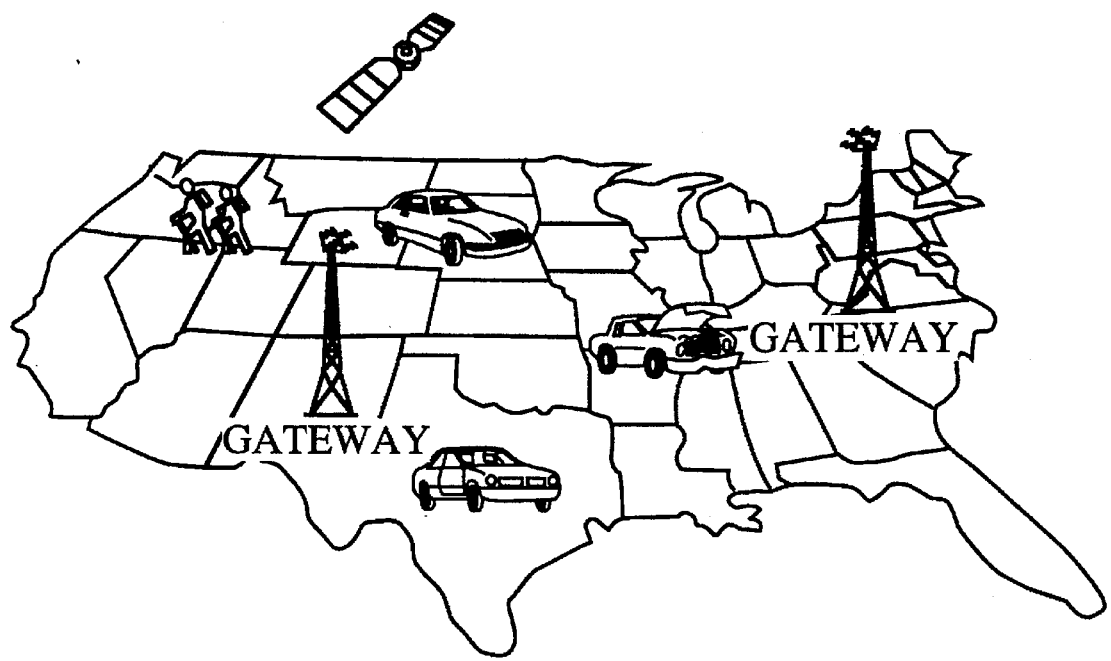

FIG. 30 illustrates another service offering provided by the present invention, known as EmerSat, which provides service to those requiring aid or assistance, such as alarm notification and location messaging for stolen assets, security breaches, accident notification or search and rescue operations.

Figure 31:
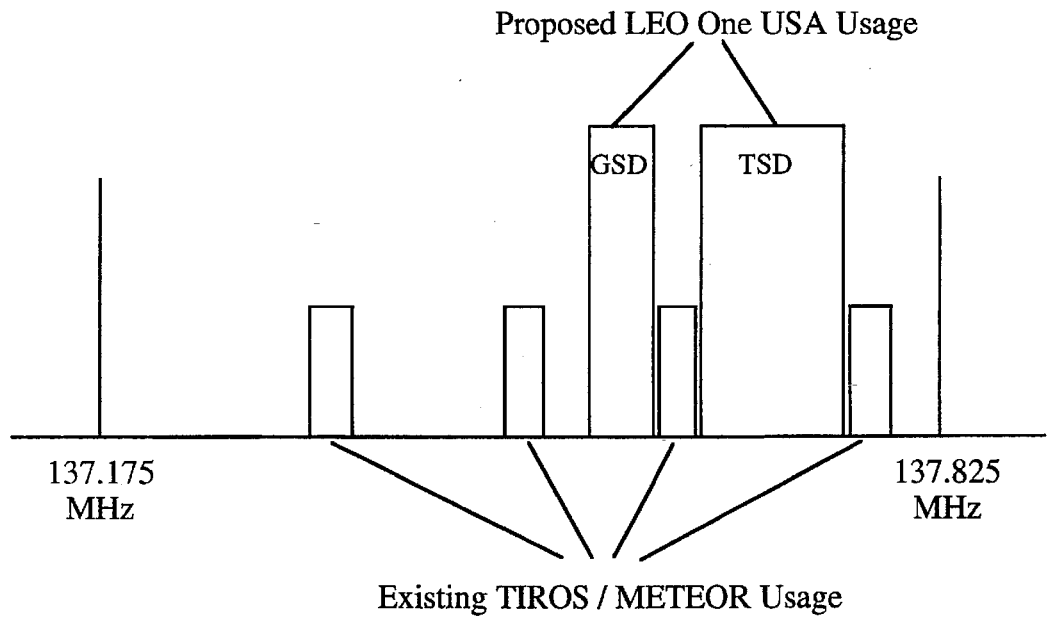

FIG. 31 shows the existing TIROS/METEOR utilization and the proposed utilization of the 137.175–137.825 MHz band with the present invention.

Figure 32:
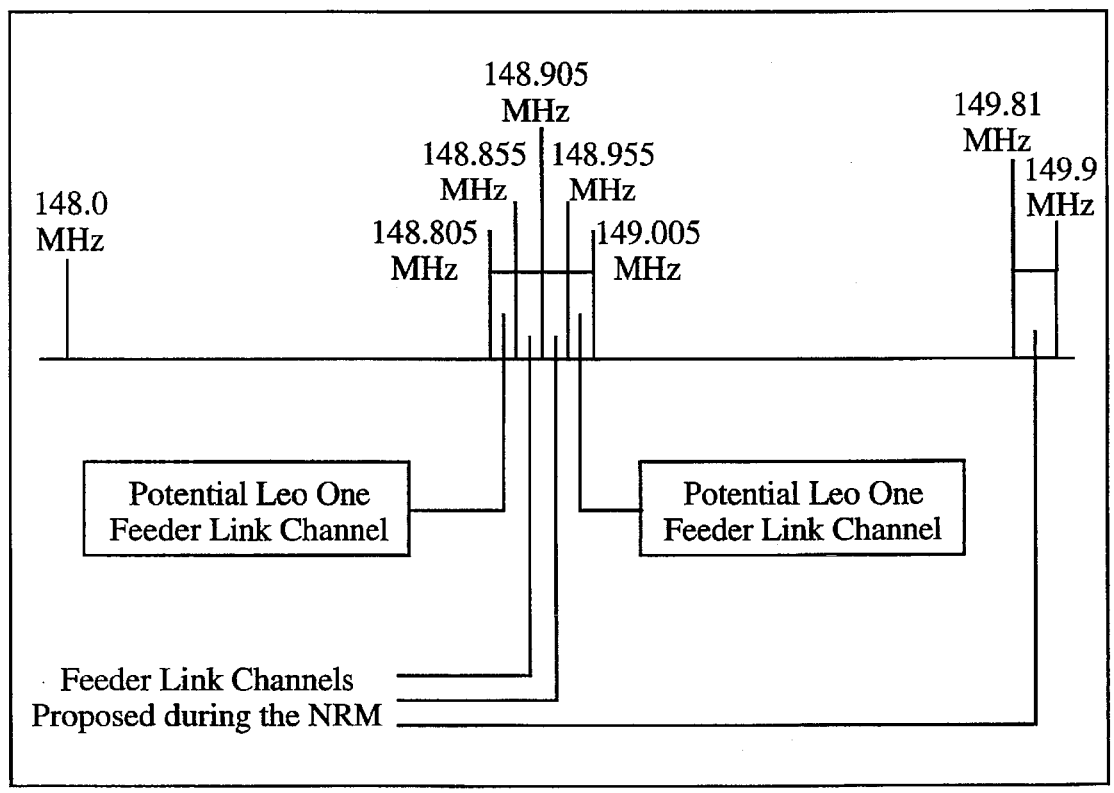

FIG. 32 shows the potential feeder link channels in the 148.0–149.9 MHz band.

Figure 33:
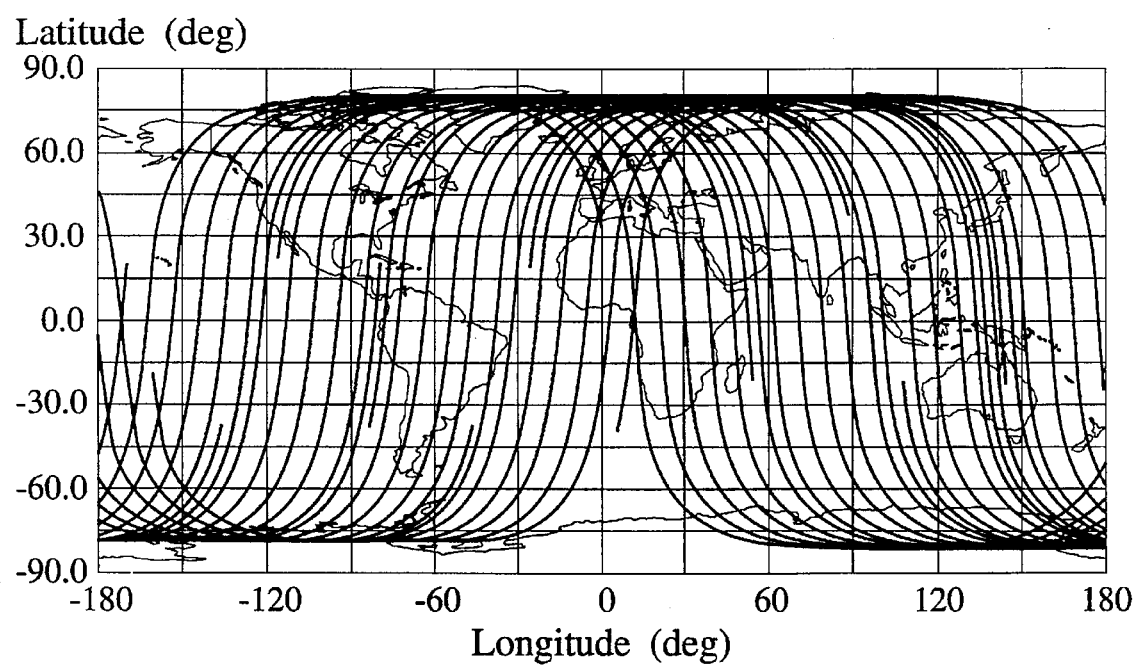

FIG. 33 is another illustration showing potential ground traces of the satellite constellation above the Earth.

Figure 34:
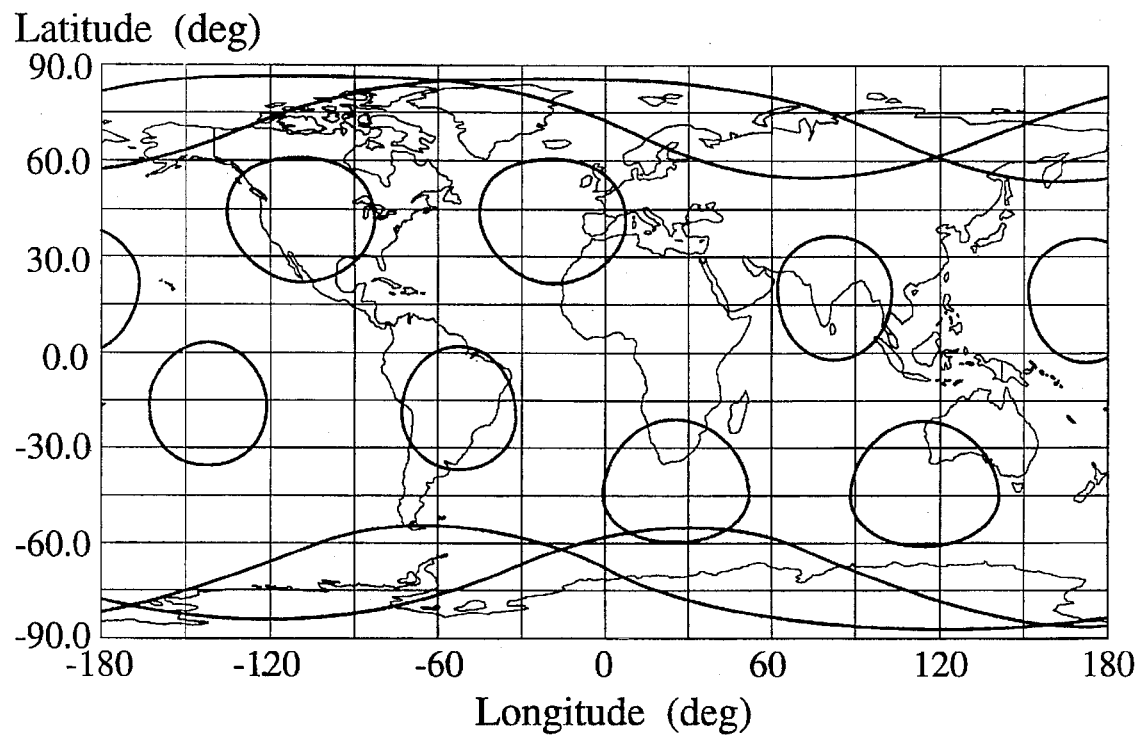
Figure 35:
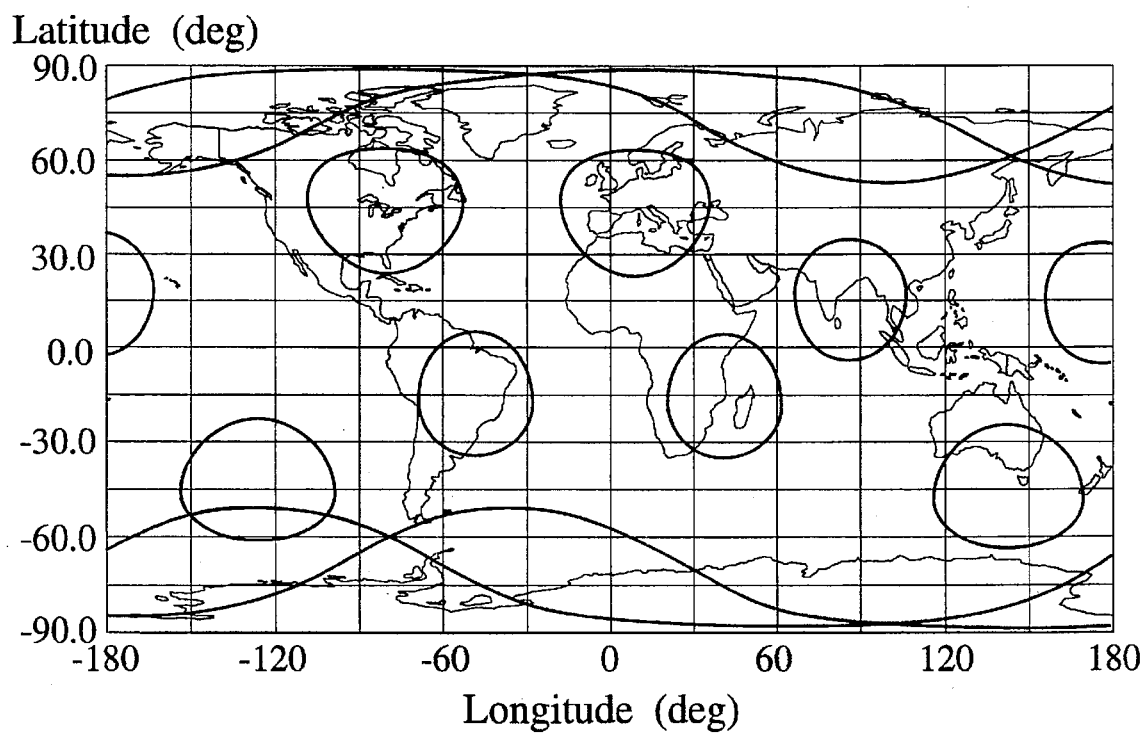

FIGS. 34 and 35 show further views of satellite constellation coverage over the Earth at two different times.

Figure 36:
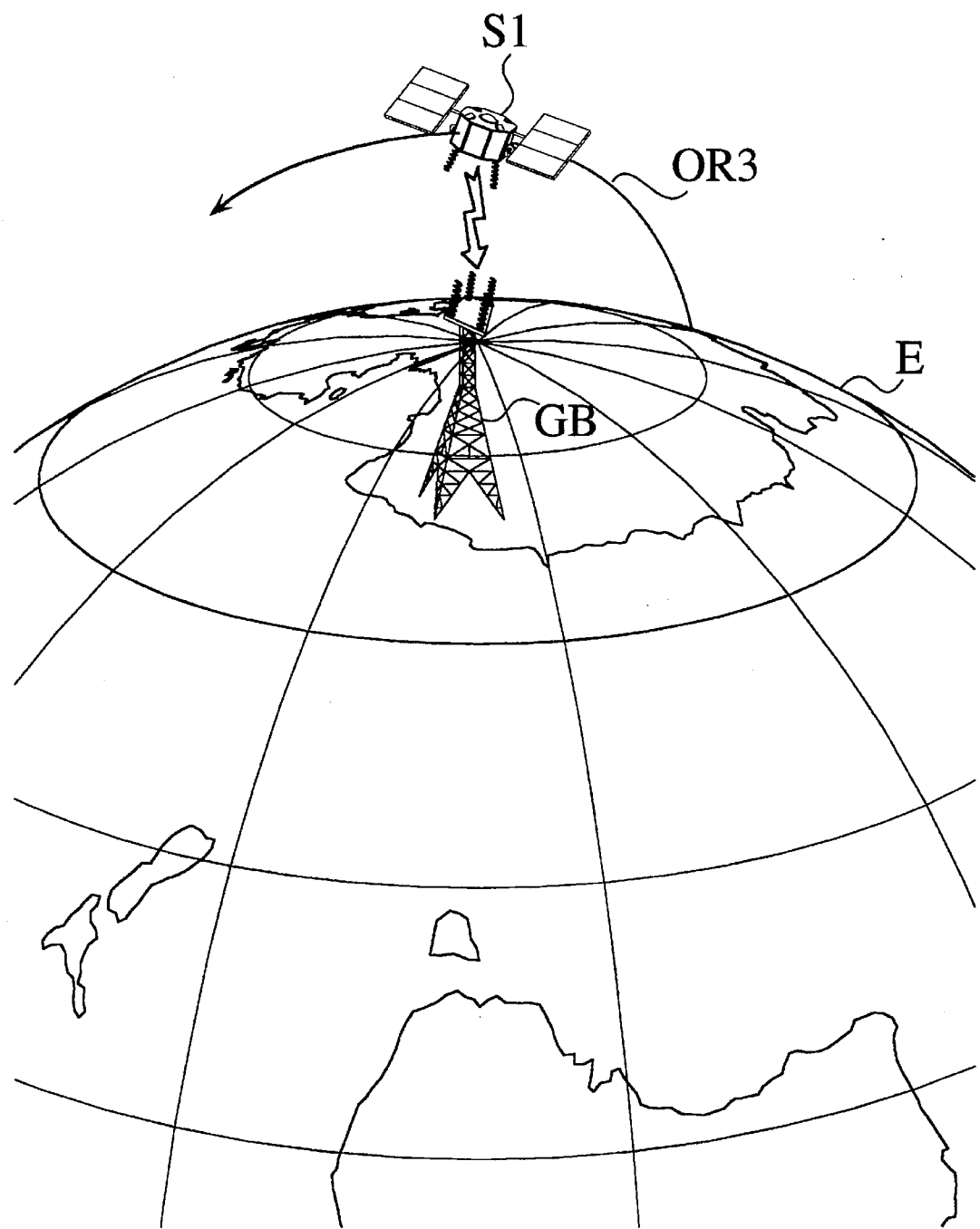

FIG. 36 is a detailed schematic view showing how a message is transmitted from an orbiting satellite to a ground based gateway located in Antarctica.

Figure 37:
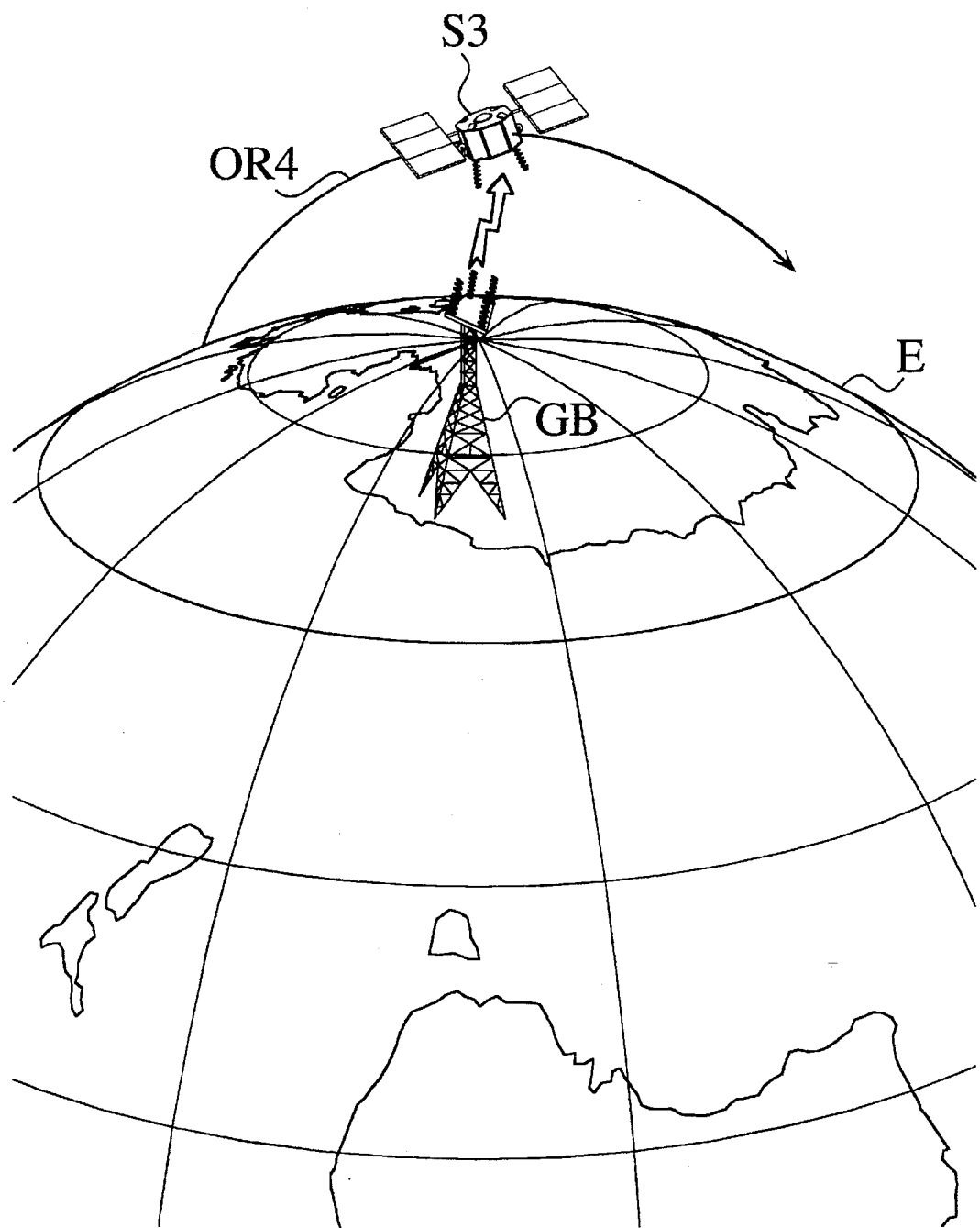

FIG. 37 is a detailed schematic view showing how a message which was received and stored by the gateway shown in FIG. 36 is transmitted to another passing satellite which is orbiting towards the intended destination of the payload.

FIGS. 38 and 39 present Transceiver-Satellite Link and Gateway-Satellite Link Budgets.

Figure 40:
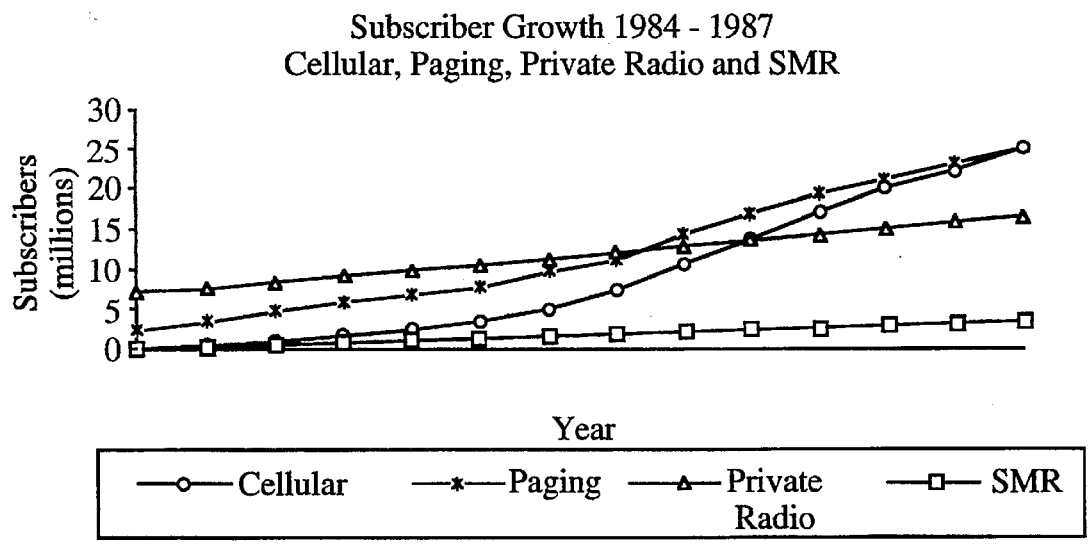

FIG. 40 is a graphic which shows subscriber growth for cellular, paging, private radio and SMR services from 1984–1997.

Figure 41:
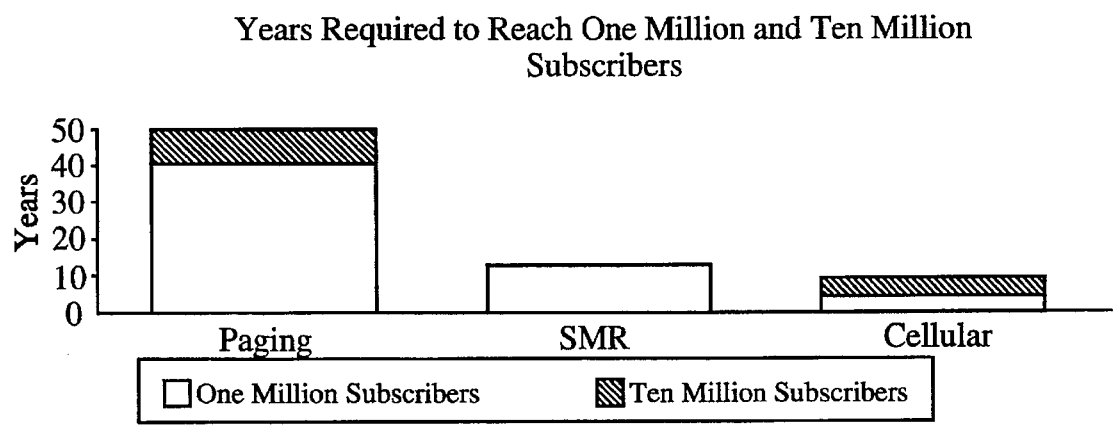

FIG. 41 is a bar chart showing the years required to reach one million and ten million subscribers for paging, SMR and cellular services.

A DETAILED DESCRIPTION OF PREFERRED EMBODIMENTS

I. The Polar Relay Method

Figure 1:
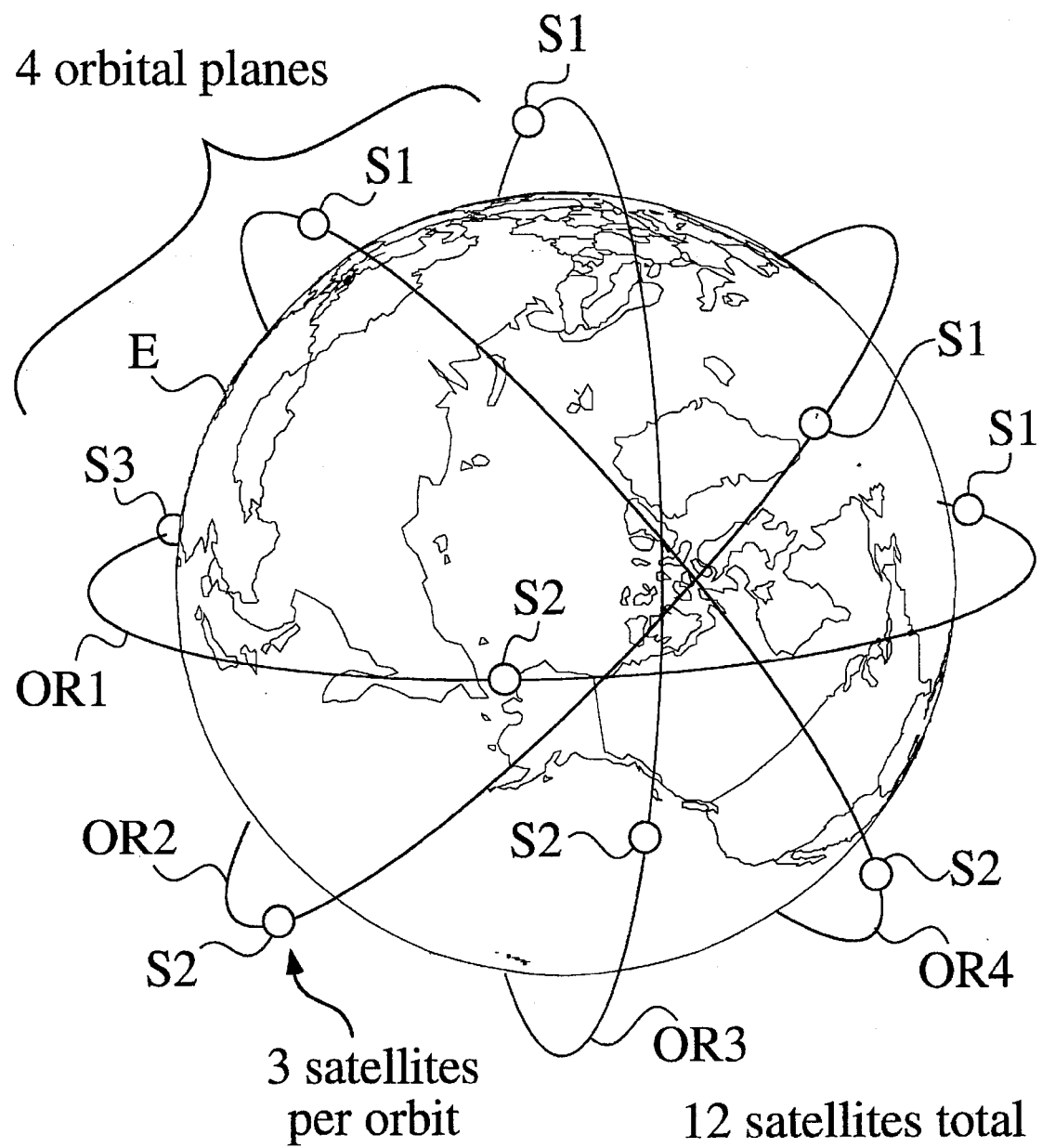
FIG. 1 is a schematic view of a constellation of twelve satellites utilized in one of the preferred embodiments of the present invention.

FIG. 1 is a schematic view of a constellation of twelve satellites utilized in one of the preferred embodiments of the present invention. In the text that follows, the term "constellation" refers to the entire group of satellites. A complete embodiment of the invention which incorporates the constellation as well as equipment on or near the Earth's surface is described by the terms "system" or "network".

FIG. 1 shows four orbital planes OR1, OR2, OR3 and OR4. In the most preferred embodiment, the satellites operate at an altitude of 1,100 km. In general, each of the four orbits cross near each other in a region located over a pole of the Earth (E). Although FIG. 1 illustrates this "crossing region" over the North Pole (NP), a configuration which employs orbits that cross over the South Pole would function equally as well. The maximum size of this "crossing region", i.e., the longest distance that separates any orbit and the pole, is determined by the communication range of the satellite and the relay station located near the pole. The transmission power of each satellite may be minimized by keeping this distance to a practical minimum.

Each polar orbit is populated by three satellites S1, S2 and S3. In the preferred embodiment, all four sets of satellites labeled S1, S2 and S3 are generally identical, but this is not necessarily true in alternative embodiments. In text that follows, a complete identification of a particular satellite requires the specification of both the orbit and the satellite in that orbit, e.g., S1/OR1 or S2/OR3. Another variable used in the figures that provides a more precise definition of satellite location is time, delineated by the abbreviations T1, T2, T3, etc. In general, a higher integer in a time abbreviation indicates a later time than a lower integer. For example, T2 occurs after T1, and T3 occurs after T2.

Figure 2:
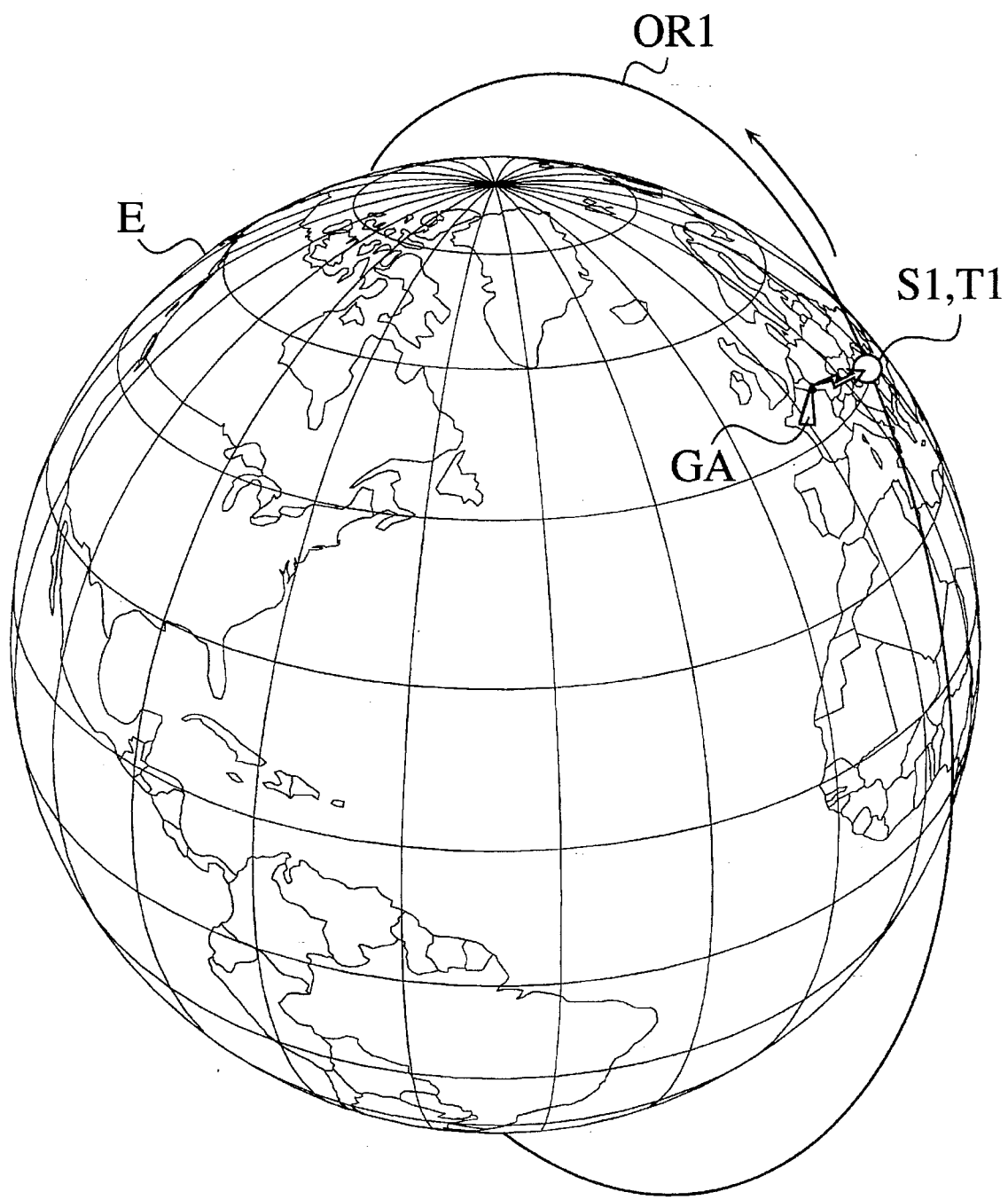
FIG. 2 is a schematic view of a satellite in orbit which receives and stores a message from a ground based terminal or gateway at time T1.

FIG. 2 reveals a first satellite traveling in a the first orbit S1/OR1. At time T1, this satellite S1/OR1 is positioned over a terminal situated in Paris. This particular terminal is a relatively large Earth station, or "gateway" GA. In the text that follows, terminals are referred to generically by reference character "G", and particular terminals are identified by more specific reference characters such as "GA", "GB" and "GC". Although the terminals exhibited in FIGS. 1 through 7 are all shown as gateways, the expression "terminals" encompasses any equipment including the transceiver described below, that is capable of communicating with a satellite in the constellation or a gateway. In FIG. 2, Gateway GA is a sending terminal, since it holds a message from a subscriber. Gateway GA holds this message until a satellite in the constellation comes within range. The message held at Gateway GA is addressed to a subscriber in California, who is located in the region that is served by a terrestrial terminal in San Francisco called Gateway GC. Satellite S1/OR1 is shown within range of Gateway GA at time T1. After the message is transmitted to S1/OR1, it is stored onboard, and the satellite continues to travel along its orbit OR1 toward the region over the North Pole.

Figure 3:
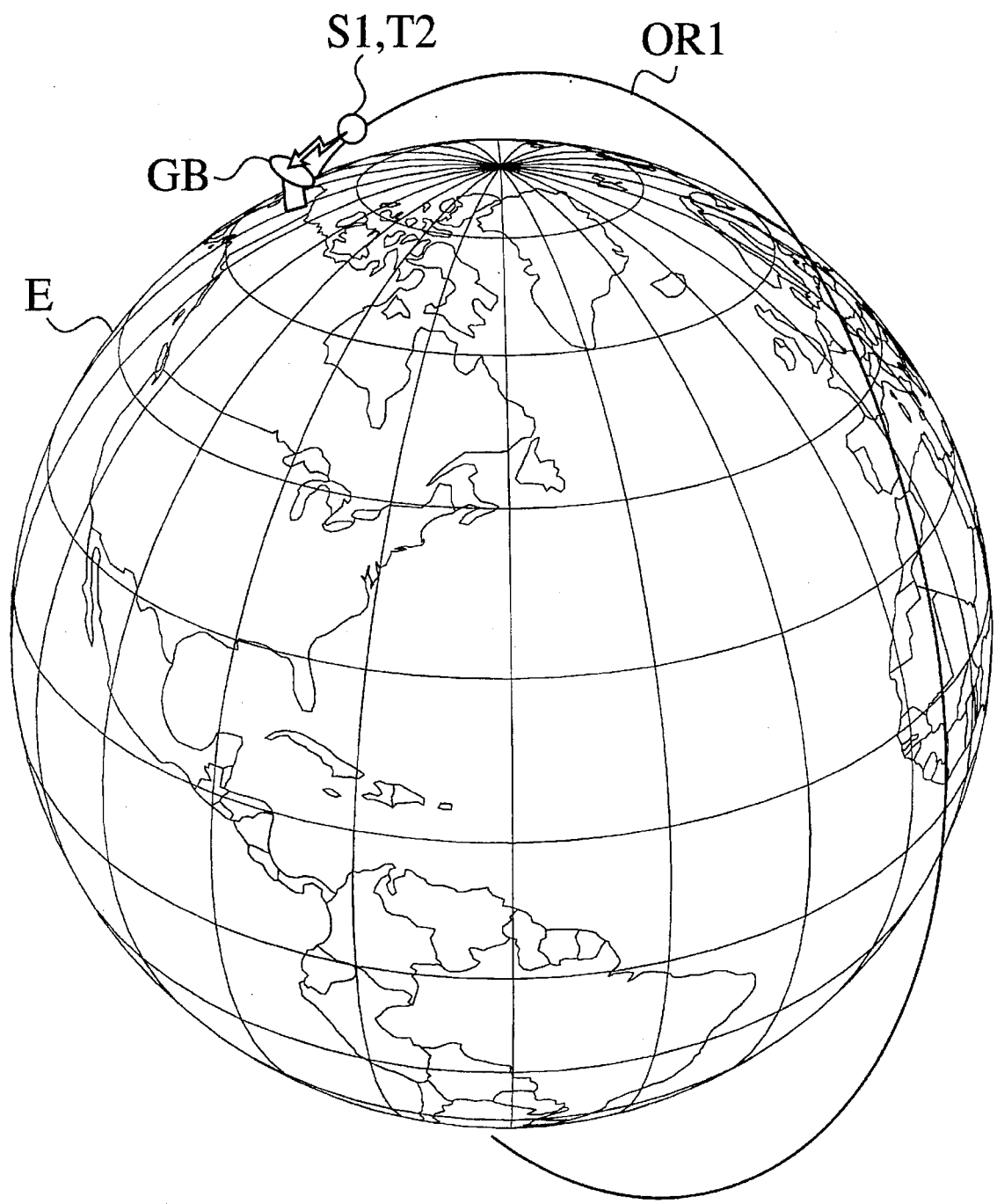
FIG. 3 is a schematic view of the satellite shown in FIG. 2 at a time T2 which is later than the time T1 represented in FIG. 2.
Figure 4:
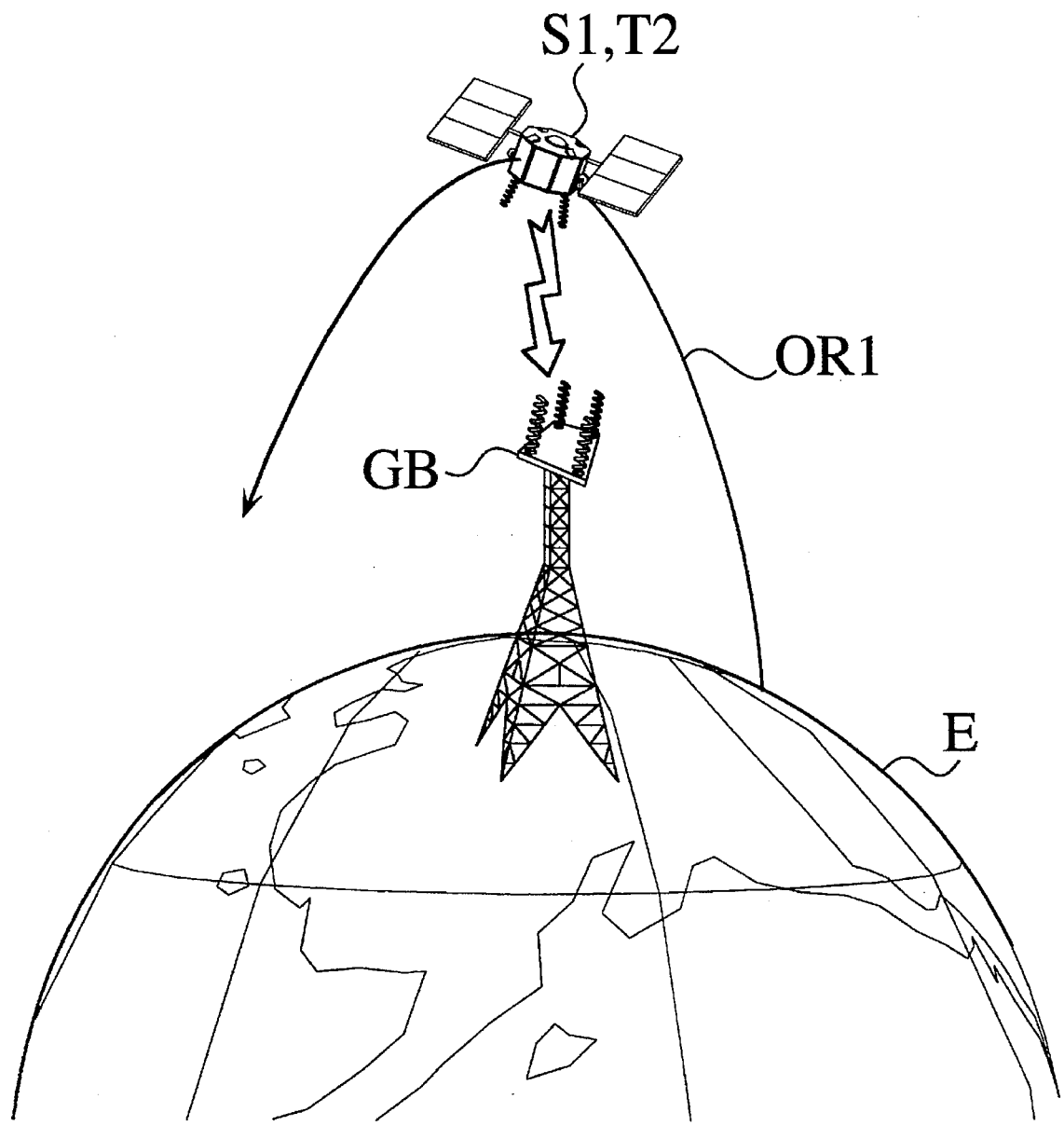
FIG. 4 is a more detailed schematic view of FIG. 3, in which the message is transmitted from the satellite to a ground based gateway located near the North Pole in Alaska.

FIG. 3 shows the same satellite S1 flying in the same orbit OR1 at time T2, which is later than time T1 depicted in FIG. 2. At about the time Satellite S1 flies over the North Pole, it is able to transmit its stored message obtained from Gateway A to Polar Relay Station GB located in Alaska. FIG. 4 supplies a more detailed schematic view of the downlink from satellite S1/OR1 to GB.

Figure 5:
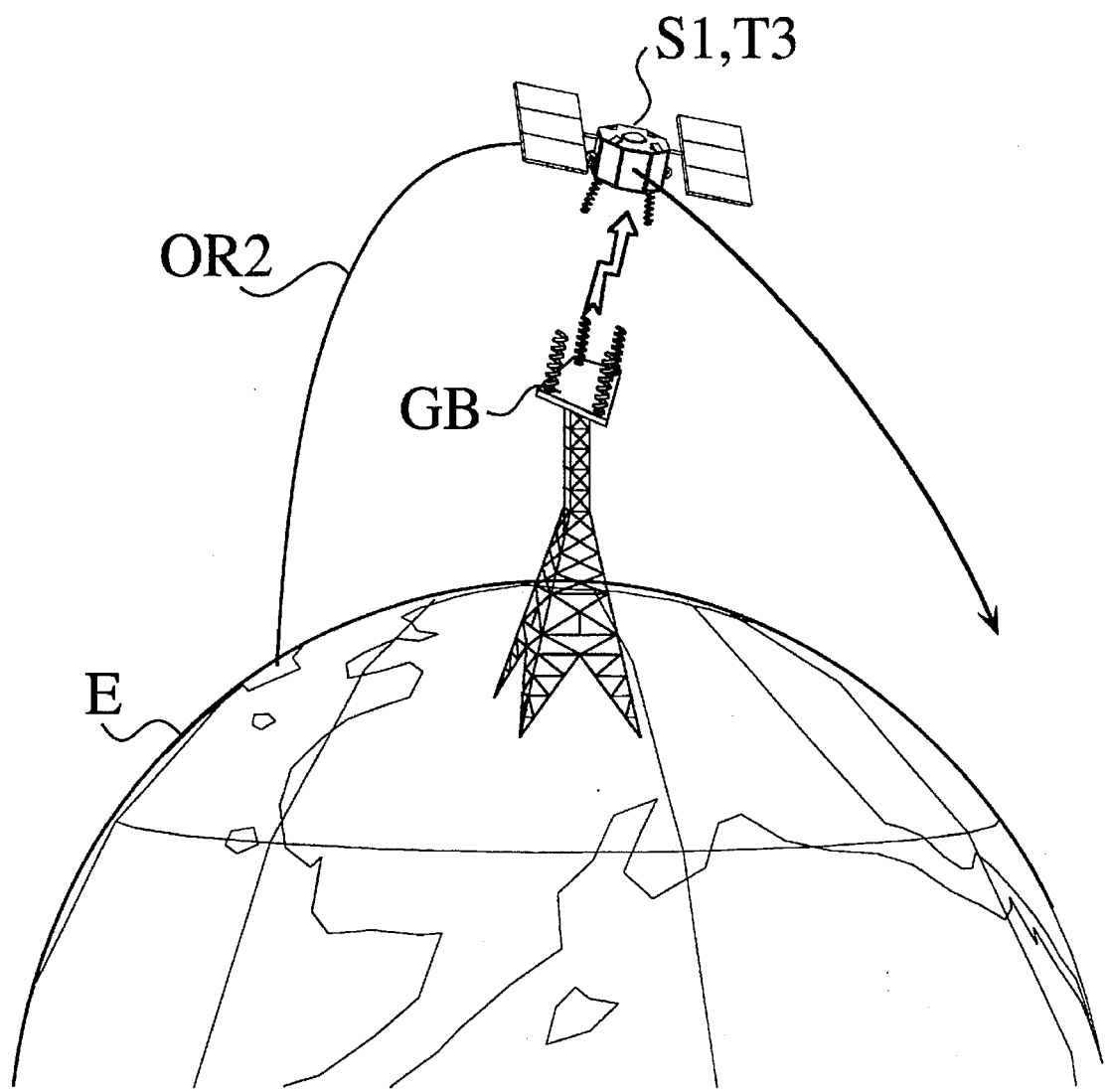
FIG. 5 is a detailed schematic view in which the message which was received and stored by the gateway shown in FIG. 4 is transmitted to another passing satellite which is traveling towards the terminal that is the destination for the message.
Figure 6:
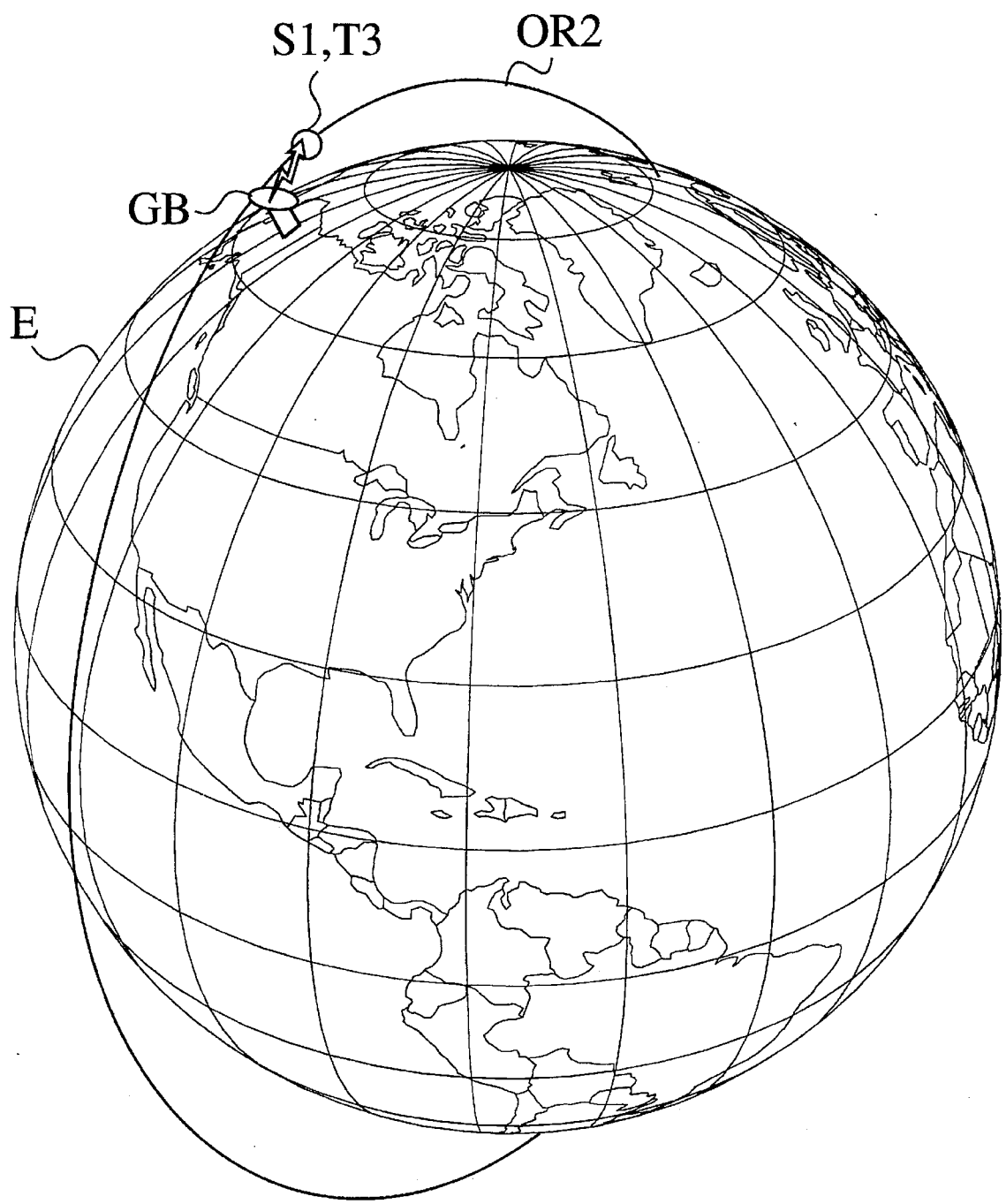
FIG. 6 is a broader schematic view of FIG. 5, in which the message which is transmitted by the land based gateway in Alaska is received and stored by the satellite. The spacecraft then continues on its orbit towards the intended destination of the message.
Figure 7:
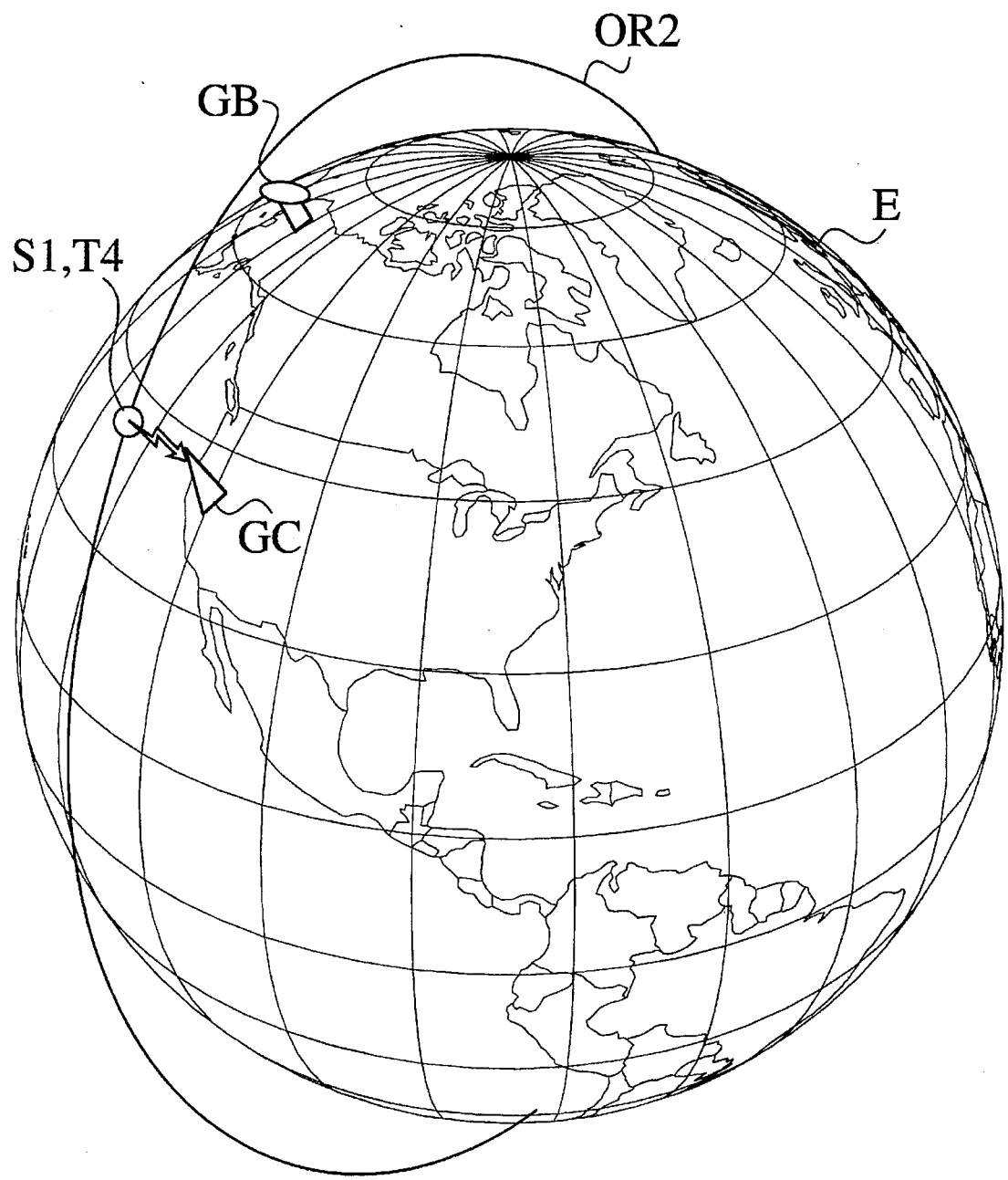
FIG. 7 is a schematic view in which the satellite shown in FIG. 6 has traveled farther around the Earth on its orbit, and then transmits the message to a destination gateway or terminal as soon as it comes into range.

The Polar Relay Station GB holds the message until another satellite in the constellation passes overhead. FIG. 5 depicts the approach of the next satellite S1/OR2, at time T3. As shown in FIG. 6, the Polar Relay Station GB sends the message up to S1/OR2, and, at time T4, S1/OR2 flies within range of Gateway GC in San Francisco. FIG. 7 portrays the final transmission along the pathway from Gateway GA to Gateway GC. The message is transmitted down to Gateway GC at time T4, and is then forwarded from Gateway GC to the addressee.

Although the preferred embodiment described above utilizes a polar relay station, a satellite in the constellation may send its stored message directly to a terminal without passing it through a polar relay station. In general, the longest time required to convey a message from one terminal to another is about two hours.

Figure 8:
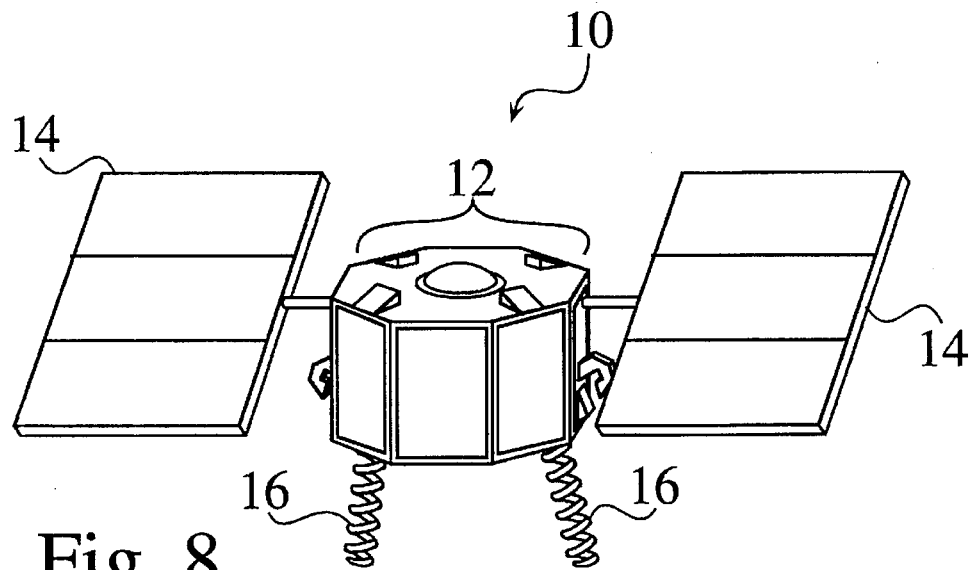
FIG. 8 is a schematic view of one of the embodiments of the satellites used to implement the present invention.

FIG. 8 reveals a preferred embodiment of a satellite that will be employed by the system. The satellite 10 includes a central body 12 which houses communications and control equipment. Two solar panels 14 extend from either side of the body 12. Two helical antennas 16 protrude from the body 12 and are maintained in a position which keeps them pointed at the Earth E.

Figure 9:
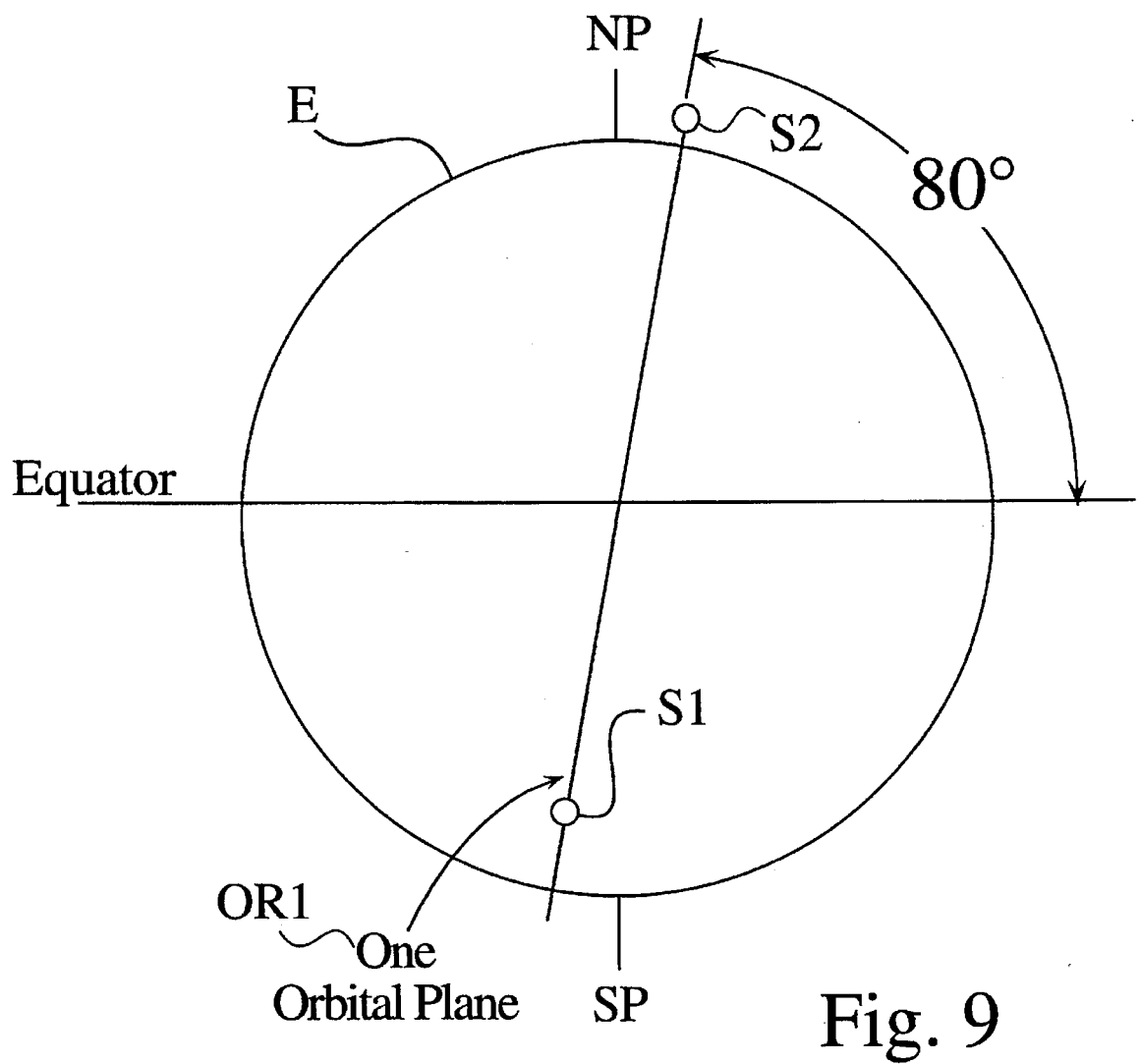
FIG. 9 shows one of the sun-synchronous orbits which are employed by one of the preferred embodiments.
Figure 10:
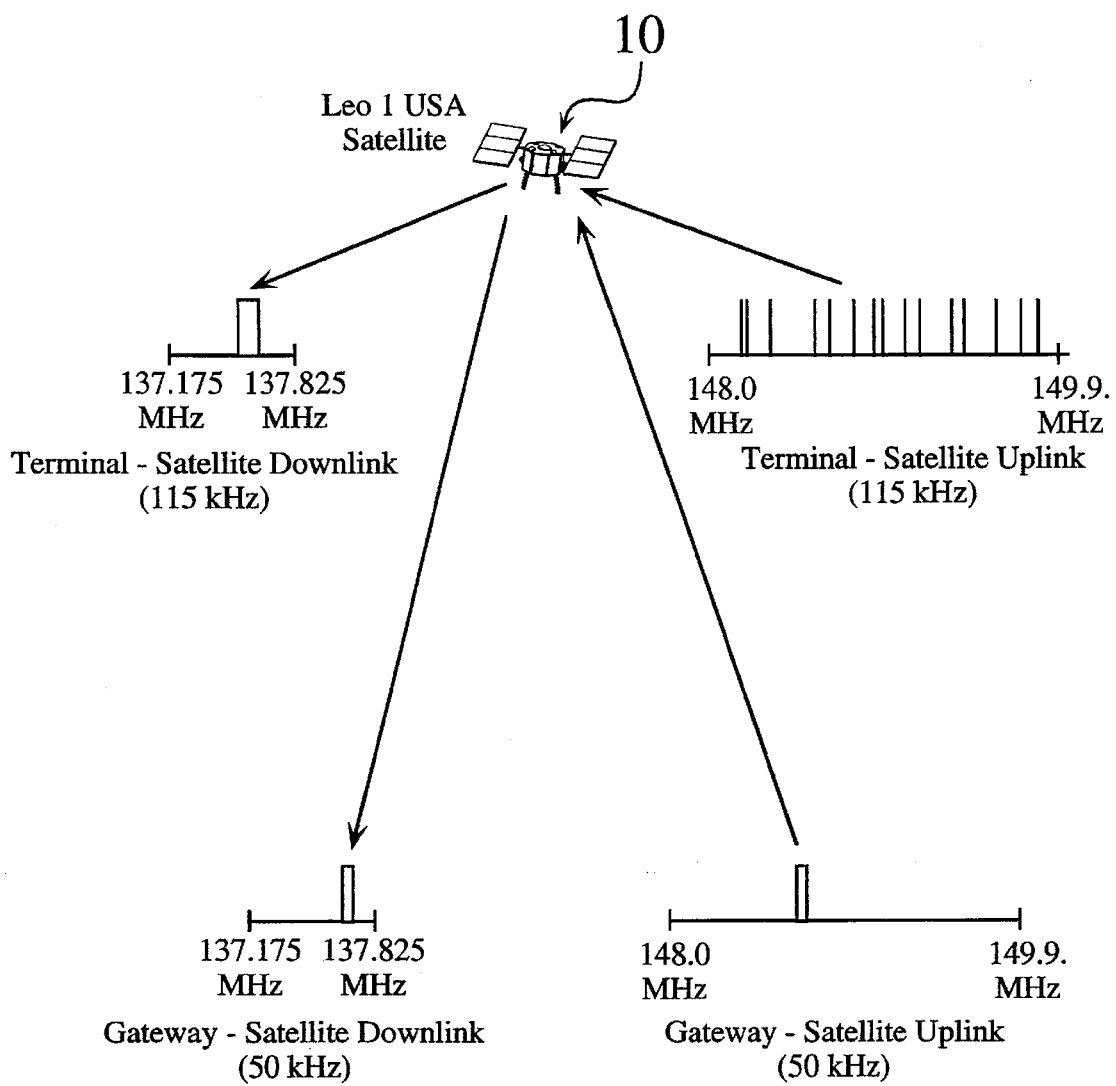
FIG. 10 illustrates the frequency plan of the present invention.

FIG. 9 shows one of the sun-synchronous orbits that are employed by one of the preferred embodiments. This orbit is inclined eighty degrees from the Equator.

FIGS. 36 and 37 illustrate a Polar Relay Station located near the South Pole that may be utilized by an alternative embodiment of the invention.

II. Space Segment Description

The present invention comprises a satellite system that will provide store-and-forward coverage of virtually all locations on the Earth's surface. The first generation of the constellation will include twelve satellites in four orbital planes, equally spaced around the equator and inclined at 80°. Each plane will contain three equally spaced satellites at a circular orbit altitude of 1,100 km. At this altitude, the footprint of the satellite will be approximately 4,326 km diameter for a transceiver on the Earth's surface with an elevation angle of at least 15° above the horizon. The orbital period of these satellites will be approximately 107 minutes, and the typical period of visibility of a satellite to a stationary transceiver during each pass will be 8.5 minutes average and 12 minutes maximum.

The twelve satellites will be identical in construction and functionality. Each satellite will weigh approximately 154 kilograms (340 lbs.) and will include the following subsystems:

RF Communications Subsystem;

Tracking, Telemetry and Control (TT&C);

Flight Computer;

Attitude Determination and Control Subsystem (ADCS);

Power Subsystem (generating, storage, conditioning, distribution);

Satellite Structure;

Propulsion Subsystem; and

Thermal Control Subsystem.

The design lifetime for the satellites is five years with sufficient consumables for seven years of operations.

The satellites will be designed so that groups of satellites on their own carriage dispenser can be deployed using any of several candidate operational launch vehicles, such as Delta™, Pegasus™, Long March, Tsyklon and Kosmos rockets, or using other launchers currently in development, such as Lockheed's LLV-1. Also, each satellite will be designed to permit single satellite launches using one of the potential smaller vehicles, such as the operational START launcher and planned vehicles such as the Minuteman II SLV and Pac Astro launchers.

The spacecraft are designed as processing satellites. They will not use conventional bent pipe transponders; instead, they will demodulate and decode all received data packets. The decoded packets will be stored in digital memory. At the appropriate time, the packets will be encoded, modulated, and retransmitted.

The space station communications payload will consist of two transmitters and three receivers. The first transmitter will provide one 96 KPBS channel with 100 watts of transmit power for the satellite-to-transceiver downlink and will be designed to operate in the 137.175–137.825 MHz band. The second transmitter will provide one 50 KPBS channel with 2.5 watts of transmit power for the satellite-to-gateway downlink and will be designed to operate in the 137.175–137.825 MHz band. Both transmitters will operate in a saturated, single carrier mode.

The first of the three on-board receivers will be able to process fifteen 9.6 KPBS channels for the transceiver-to-satellite uplink. The second receiver will have capacity to process one 50 KPBS channel for the gateway-to-satellite uplink. A third band scanning receiver will be used to select transceiver-to-satellite uplink channels that are not being actively used by terrestrial services. All three receivers will operate in the 148–149.9 MHz band.

III. Earth Segment Description

The Earth segment of the system will consist of transceivers and gateway Earth stations. The gateways will provide access to and from the terrestrial telecommunications network, and will act as packet relay and regional control stations. One gateway will be designated as the primary tracking, telemetry and control (TT&C) Earth station. This gateway will be collocated with the network operation control center (NOCC). Additional gateway terminals will be equipped to provide back-up TT&C and NOCC functions in the event of a catastrophic failure of the primary TT&C and NOCC site.

Two primary gateways are currently planned in the continental United States (CONUS): one in the southwest and one in the southeast. A third gateway will be located in Alaska. Additional gateways, for service outside the United States, will be located in the territories of various other administrations working with or purchasing service from the network.

As a result of the store-and-forward nature of the satellites, continuous contact with a gateway will not be required. The gateways will poll the satellites to initiate data transfer. They will have the ability to predict when each satellite will appear above a 15° elevation mask angle and will use open loop pointing of the gateway antenna to acquire and follow the satellite. The gateways will estimate the satellite signal Doppler shift to minimize acquisition time and will use Doppler shift measurements of the satellite signals to refine their orbital estimates.

The present invention will provide a family of low-cost transceivers to support a variety of applications. The heart of these transceivers will be the Leo One™ modem module. The modem module will be constructed in accordance with application specific transceiver configurations by combining this module with other customized modules. Typical applications will include: status monitoring, vehicle tracking, paging, e-mail, security monitoring and control, and emergency alerting. Prices for a basic transceiver are expected to be under $500.

The transceiver will be small, less than ten cubic inches, and capable of battery operation. It will be available in pocket-sized, desktop, and vehicle mounted configurations. The system has been designed to require a maximum transceiver transmit power of seven watts. In conjunction with the low duty cycle of the transceivers, this ensures that the transceivers will comply with all relevant radiation exposure safety standards.

IV. Communication Links

The system will consist of four types of simplex communications links. They will be used for transceiver-satellite interconnection and for gateway-satellite interconnection. The links are:

Transceiver-Satellite Uplink (TSU);

Transceiver-Satellite Downlink (TSD);

Gateway-Satellite Uplink (GSU); and

Gateway-Satellite Downlink (GSD).

There will be no cross links between the satellites. Each satellite will support fifteen 9.6 KPBS TSUs, one 96 KPBS TSD, one 50 KPBS GSU, and one 50 KPBS GSD. Thus, the transceivers will transmit at 9.6 KPBS and receive at 96 KPBS. The gateways will transmit at 50 KPBS and receive at 50 KPBS. The satellites will transmit to the transceivers at 96 KPBS, receive from the transceivers at 9.6 KPBS, and transmit to and receive from the gateways at 50 KPBS.

The TSUs and the GSU will operate in the 148–149.9 MHz band and the TSD and GSD will operate in the 137.175–137.825 MHz band. All of the links will carry packetized digital data The network packets will be used for resource request and assignment, and other network control functions. The monitoring packets will be used for monitoring applications.

The present invention will use a combination of random access and frequency division multiplexing (FDM) for the TSUs and time division multiplexing (TDM) for the other links. FDM is preferred for the TSUs because it does not require high burst power transmissions from the transceivers that would be required for a single wideband TDM channel. TDM is preferred for the other links because it allows for the use of efficient saturated power amplifiers in the satellites and gateways. Back-off is not required to control intermodulation levels since there will be only a single RF carrier in these links.

The satellite system will be distinguished by the range of services offered, the low cost of its service options relative to those offered by similar proposed service providers and its high spectral efficiency. The types of services provided by the present invention include tracking and monitoring for the transportation industry, monitoring of remote assets or site locations, such as vehicles, boats and vacation homes or remote utility equipment, e-mail, paging and emergency services.

V. Services and Markets

The present invention will offer a range of services to the public in the United States. These services are tailored to meet the specific requirements of certain market segments. Analysis indicates that the demand for these services in the U.S. alone is more than adequate to make the system economically viable. The following is an overview of the service offerings and the demand in the U.S. for such services.

TracSat

The principle purpose of this service will be to provide tracking and monitoring for the transportation industry. For instance, a fleet of trucks can be tracked by a central dispatcher enabling more efficient routing schedules and loads. This service will be especially useful in tracking hazardous cargo and perishable goods. The potential market in the U.S. for this service includes 2.5 million trucks, 470,000 maritime vessels and over five million boxcars and containers.

SecurSat

This service is designed to provide monitoring of remote assets or site locations such as vehicles, boats and vacation homes or remote utility plant equipment. SecurSat will emit an alarm notification should security be breached and will relay temperature, humidity and other monitoring type information. Examples of U.S. demand for this service include 900,000 oil and gas wells 220,000 pipeline monitoring sites, 100,000 government data gathering stations and 150 million utility meters.

MailSat

This service includes the transmission of electronic mail (e-mail) via satellite. Under this service, the Leo One™ modem provides the communication link between the system and the transceiver. The modem is designed to both receive and send messages and will be equipped with an antenna to facilitate communication with the satellite. The primary market for this service includes frequent business travelers and portable PC users. Research indicates that there are about 1 million frequent business travelers in the U.S. who could benefit from this service.

PageSat

This service will provide two-way alphanumeric paging service for both personal and business users. Unlike today's nationwide paging service, PageSat will offer ubiquitous coverage of all areas of the United States. A minimum of 240,000 subscribers are expected to be interested in this service. The transceiver will be larger than a traditional pager and will have an antenna to facilitate communications with the satellite. PageSat will be provided on a premium basis, providing a single paging device that will work anywhere in the world.

EmerSat

This service is designed for users who need help. This may include car accident notification, vehicle malfunction assistance, calls for help from the elderly and handicapped and search and rescue assistance. The market for this service could include 50 million potential users.

As the services described above illustrate, there are numerous users and significant potential demand for the services to be provided by the system. These services will enable business to operate in a more efficient and economic manner and will provide tremendous health and safety benefits to the public.

VI. Frequency Plan

The present invention has been designed from the outset to make efficient use of the scarce spectrum available. Table Three below summarizes the total spectrum available in the U.S. for this type of service, resulting from the allocations made at WARC-92 and in the Commission's Order allocating spectrum for the NVNG MSS.

TABLE Three

| MSS Frequency Allocations Below 1 GHz | |
|---|---|
| Earth-to-Space | Space-to-Earth |
| 148.000 to 150.050 MHz | 137.000 to 138.000 MHz |
| 399.900 to 400.050 MHz | 400.150 to 401.000 MHz |

This amounts to a total of 2.2 MHz for the Earth-to-space links (uplink) and 1.85 MHz for the space-to-Earth links (downlink). However, parts of this available spectrum are only allocated on a secondary basis to the MSS service, and even the primary MSS allocations are allocated on a co-primary basis to other services, such as fixed, mobile, meteorological-satellite, space operation, space research and meteorological aids. The ability of the system to effectively and efficiently share the spectrum in this type of environment is therefore of paramount importance.

The system requires use of the following frequencies:
Transceiver-Satellite Uplink (TSU):

These links will operate in the 148.0–149.9 MHz band, using an adaptive channel assignment scheme. No more than fifteen individual channels, each of 15 KHz bandwidth, will be active simultaneously. As is depicted below, in order to operate in the interference environment of the 148–149.9 MHz band, Leo One USA™ estimates that it will require 675 KHz in order to obtain fifteen clear 15 KHz channels.
Gateway-Satellite Uplink (GSU):

This link will also operate in the 148.0–149.9 MHz band and will require one dedicated 50 KHz bandwidth channel.
Transceiver-Satellite Downlink (TSD):

This link will operate in the 137.175–137.825 MHz band and will require a dedicated 115 KHz bandwidth channel.
Gateway-Satellite Downlink (GSD):

This link will also operate in the 137.175–137.825 MHz band and will require one dedicated 50 KHz bandwidth channel.

VII. Satellites

Introduction

The present invention comprises a space segment of twelve satellites (four planes of three satellites each); a master telemetry, tracking, and command (TT&C) Earth station collocated with a main network operational control center (NOCC); a network of regional gateway Earth stations, which will also serve as back-up TT&C and NOCC facilities; and several hundred thousand transceivers.

A summary of the initial space segment parameters is presented in Table Four.

TABLE Four

Summary of Space Segment Parameters

| | |
|---|---|
| Mass: | 154 kilograms (on-orbit) |
| Satellite Footprint Diameter | 4,326 km |
| Minimum Elevation Angle: | 15° |
| Orbital Constellation | Satellites per Plane: 3 |
| | Number of Planes: 4 |
| | Orbit Altitude: 1,100 km Circular |
| | Inclination: 80° |
| Right Ascension of the Ascending Node: | 0°, 45°, 90°, 135° |
| Argument of Perigee: | N/A - Satellite in Circular-orbit |
| Active Service Arcs: | All Satellites may be active at all times |
| Satellite Lifetime: | 5 years (7 years of consumables) |
| Launch Vehicle Candidates for Leo One USA ™: | |
| For Groups of Satellites on Carriage: | Delta, Lockheed LLV-1, Pegasus, Long March, Tsyklon, and Kosmos |
| For Individual Satellites: | Minuteman II SLV, Pac Astro, and START |
| Deployment Schedule: | |
| Experimental Satellites: | Late 1994 |
| First Launch of Constellation: | Early 1995 |
| Full Constellation Deployed | Mid/Late 1995 |

Satellites System Description

The twelve satellites in the preferred embodiment will be substantially identical in construction and functionality and will be composed of the following subsystems:

RF Communications Subsystem;

Tracking, Telemetry and Control;

Attitude Determination and Control Subsystem (ADCS);

Power Subsystem (generating, storage, conditioning, distribution);

Propulsion Subsystem;

Satellite Structure; and

Thermal Control Structure.

FIG. 8 depicts the basic configuration of the satellite.

The satellite bus will have the following general characteristics:

RF communications payload in the 137.175–137.825 MHz and 148–149.9 MHz bands;

Fully redundant TT&C subsystem, with encryption;

On-board memory for message storage;

Three axis attitude control subsystem;

Power subsystem with power conditioning, batteries and deployable solar arrays;

Prismatic structure with aluminum plate and stringer construction;

Stackable Carriage/Dispenser for multiple launches on a single vehicle;

Propulsion subsystem for orbit maintenance;

Thermal Control subsystem with active and passive temperature control; and

Redundant elements for a five year mission design life and seven years of consumables.

Figure 11:
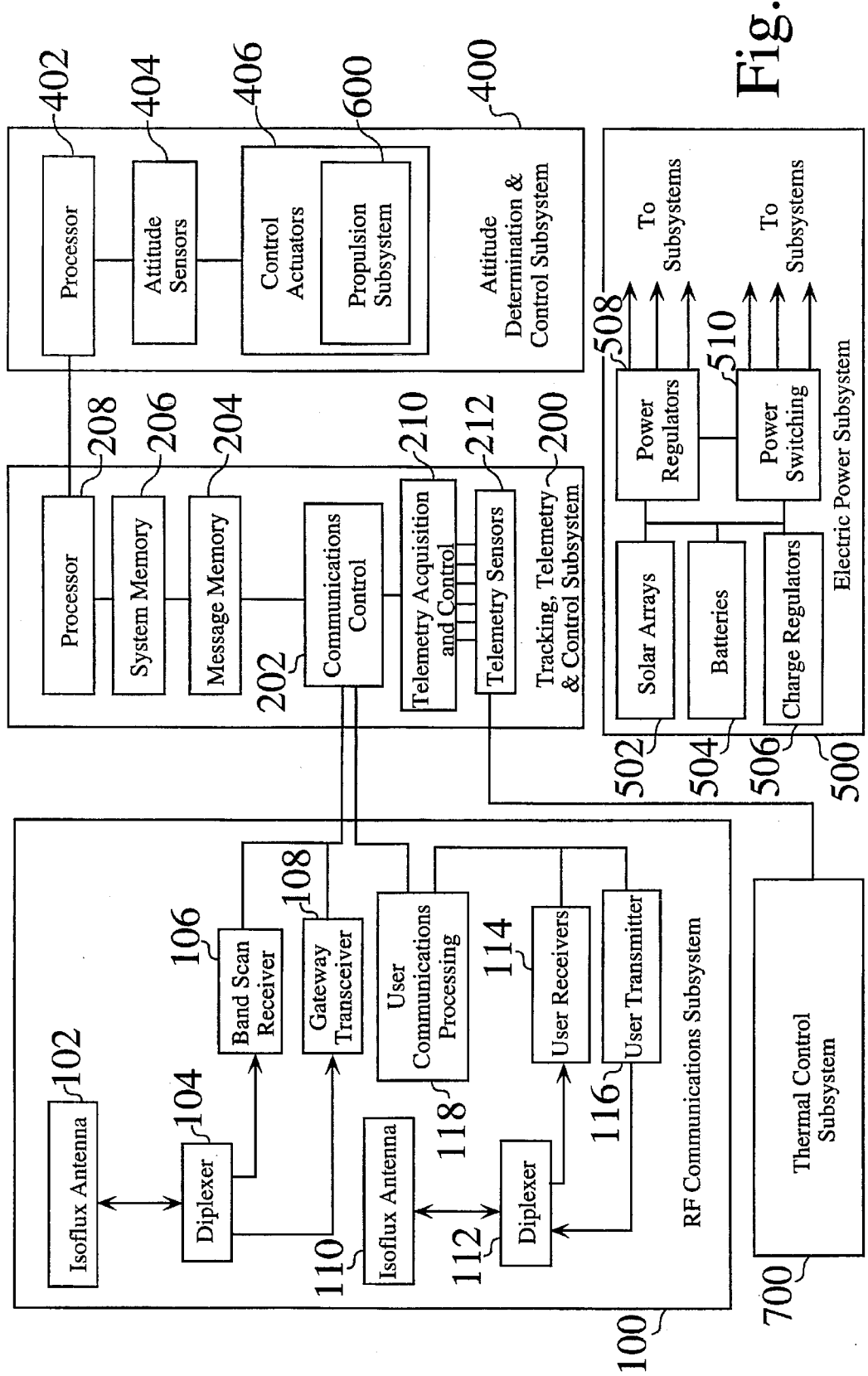
FIG. 11 is a functional block diagram of the satellite configurations.

A functional block diagram of the satellite is presented in FIG. 11 which depicts the primary interrelationship between the major subsystems:

RF Communications Subsystem 100;

Telemetry, Tracking & Control Subsystem (TT&C) 200;

Flight Computer Subsystem 300;

Attitude Determination and Control Subsystem (ADCS) 400;

Electric Power Subsystem (EPS) 500;

Propulsion Subsystem 600; and

Thermal Control Subsystem 700.

The RF Communications Subsystem 100 comprises a first isoflux antenna 102 which coupled to a first diplexer 104. This diplexer 104 is connected to a band scan receiver 106 and a gateway transceiver 108. A second isoflux antenna feeds signals to a second diplexer 112 which, in turn, is linked to user receivers 114 and user transmitters 116. Both receivers 114 and transmitters 116 convey signals to user communications processing circuitry 118.

The gateway transceiver 108 and the user communications processing circuitry 118 are coupled to the Tracking, Telemetry and Control (TT&C) Subsystem 200 via communications control circuitry 202. The communications control circuitry 202 is linked to a message memory 204, a system memory 206 and a TT&C Processor 208. The TT&C Subsystem also includes telemetry acquisition and control circuitry 210 and telemetry sensors 212. The communications control circuitry 202 is also connected to a Thermal Control Subsystem 700.

The TT&C Subsystem 200 is coupled to an Attitude Determination & Control Subsystem (ADCS) 400 which comprises an ADCS processor 402, attitude sensors 404 and control actuators 406. These actuators 406 are linked to a Propulsion Subsystem 600.

An Electric Power Subsystem (EPS) 500 is connected to all other subsystems. The EPS 500 includes solar arrays 502, batteries 504, charge regulators 506, power regulators 508 and power switching circuitry 510.

Table Five presents a preliminary design mass budget for the satellite.

TABLE Five

GENERIC SATELLITE MASS BREAKDOWN

| Subsystem | Design Mass Objective (KG) |
|---|---|
| RF Communications Subsystem | 26 KG |
| Tracking, Telemetry and Control | 15 KG |
| Attitude Determination and Control Subsystem (ADCS) | 20 KG |
| Power Subsystem | 31 KG |
| Propulsion Subsystem | 19 KG |
| Satellite Structure | 36 KG |
| Thermal Control Subsystem | 7 KG |

Structure

The satellite is designed to be compatible with a variety of available launch vehicles capable of launching multiple satellites or individual satellites one at a time. The satellite structure will be a prismatic cylinder formed with stringers, side panels, equipment bays and decks and top cover. It will provide radiation shielding for the subsystems contained within it and is designed to accommodate the anticipated acceleration and vibration loads during launch and ascent.

Electric Power Subsystem (PS) 500

The Power Subsystem 500 will be composed of solar cells for power generation, batteries and their associated chargers for energy storage, regulators for power conditioning, and power switching modules for satellite control. The power subsystem is sized for maximum utilization capacity of the constellation.

TABLE Six

GENERIC POWER PARAMETERS

|  | Power Design Objectives |
|---|---|
| Solar Cell Power | 180 Watts |
| Battery Capacity | 500 Watt Hours |
| Orbital Average Power Availability | |
| Housekeeping and Power Conversion | 28 Watts |
| Communications Payload | 125 Watts |

Tracking, Telemetry & Control Subsystem 200

The fully redundant TT&C flight computer 200 will control all functions of the satellite based upon stored operational software, control station commands, and demand assigned service requests from users. The computer will provide for over 16 Mbytes storage of user messages, collection and storage of telemetry, sensor data processing, and attitude control subsystem actuator commanding for stabilization.

Attitude Determination and Control Subsystem (ACDS) 400

The chief function of the Attitude Determination and Control Subsystem (ADCS) 400 will be to maintain within 2° the orientation of the satellite antennas toward Earth and the solar cells toward the sun. Algorithms stored in the flight computer and operating upon ADCS sensor data will control this subsystem. The combination of sensors and actuators will provide a robust, fault tolerant, momentum-biased, three-axis stabilized control subsystem.

Propulsion Subsystem 600

Maintenance of the constellation configuration, and if required the initial trim of insertion errors of the launch vehicle, will require the use of propulsion on the satellites. A pressurized cold gas subsystem employing standard thrusters will be used to adjust the position of the satellites within the orbit plane to maintain the desired spacing. Stationkeeping adjustments will be performed every 30 to 45 days, or whenever the inter-satellite spacing exceeds established guidelines.

Thermal Control Subsystem (TCS) 700

The Thermal Control Subsystem 700 will maintain the on-board systems in their design temperature range by balancing the heat absorbed and generated by the satellite in on-orbit operations with the heat rejected to space. The TCS 700 will maintain all satellite components within their allowable temperature limits for all orbital operational conditions. The subsystem is designed to conserve the heat generated within the satellite, control the radiation of excess heat to space, and minimize temperature excursions of temperature sensitive components. The TCS 700 will consist of the following elements: multilayer insulation on the satellite exterior, thermal radiators, electric heaters and their control thermostats, high conductance material doublers and thermal interface joint compounds, passive thermal control coatings and tapes, flight temperature instrumentation installed at critical locations, and test connectors for ground electrical functional testing of the heater circuit.

RF Communications Subsystem 100

The RF Communications Subsystem 100 encompasses all aspects of satellite-ground communications including both the satellite TT&C and communications traffic links. This subsystem is described below.

Radio Frequency Plan and Communications Payload

The system will be operated as a store-and-forward NVNG MSS system. The transceivers will transmit digital data packets to the satellites which will demodulate, decode and store in digital memory all received packets. At the appropriate time, the packets will be encoded, modulated, and retransmitted to other transceivers or to a gateway. The gateways will provide access to and from the terrestrial telecommunications network, and act as regional control stations. One designated station will act as the satellite TT&C station and NOCC facility.

Radio Frequency Plan

The system will consist of four types of simplex communications links. They will be used for transceiver-satellite interconnection and for gateway-satellite interconnection. The links are:

Transceiver-Satellite Uplink (TSU);
Transceiver-Satellite Downlink (TSD);
Gateway-Satellite Uplink (GSU); and
Gateway-Satellite Downlink (GSD).

Unlike expensive real-time system like Iridium™, there will be no intersatellite or cross links between the satellites. Each satellite will support fifteen 9.6 KPBS TSUs, one 96 KPBS TSD, one 50 KPBS GSU, and one 50 KPBS GSD. Thus, the transceivers will transmit at 9.6 KPBS and receive at 96 KPBS. The gateways will transmit at 50 KPBS and receive at 50 KPBS. The satellites will transmit to the transceivers at 96 KPBS, receive from the transceivers at 9.6 KPBS, and transmit to and receive from the gateways at 50 KPBS.

The TSUs and the GSU will operate in the 148–149.9 MHz band and the TSD and GSD will operate in the 137.175–137.825 MHz band. All of the links will carry packetized digital data. The three basic packet structures are shown in Table Seven. The network packets will be used for resource request and assignment, and other network control functions. The monitoring packets will be used for monitoring applications. The text packets will be used for message applications. The text packet length will be selected to comply with footnote US323 to the Frequency Allocation Table, 47 C.F.R. § 2.106. Footnote US323 requires that, in the 148–149.9 MHz band, single transmissions from individual Earth stations may not exceed 450 msec in duration (4160 bits/9.6 KPBS=433.3 msec).

TABLE Seven

Packet Structures

|  | Network | Monitoring | Text |
|---|---|---|---|
| Data | 12 bytes | 80 bytes | 500 bytes |
| Overhead | 20 bytes | 20 bytes | 20 bytes |
| Total | 32 bytes | 100 bytes | 520 bytes |

The transceiver-satellite link bit error rate objective is $10^{-6}$ and the gateway-satellite link bit error rate objective is $10^{-8}$. The packet overhead bits allow for synchronization, parity check, sequencing, status, and addressing and routing.

The system will use a combination of random access and frequency division multiplexing (FDM) for the TSUs and time division multiplexing (TDM) for the other links. FDM is preferred for the TSUs because it does not require high burst power transmissions from the transceivers that would be required for a single wideband TDM channel. TDM is preferred for the other links because it allows for the use of efficient saturated power amplifiers in the satellites and gateways. Back-off is not required to control intermodulation levels since there will be only a single RF carrier in these links.

All of the links will use differentially encoded offset-QPSK (OQPSK) modulation filtered for 50% excess bandwidth in combination with rate ⅞, constraint length 7, convolutional coding. This format has been selected because of its high combined modulation/coding efficiency of 1.17 bits/sec/Hz.

The required channel bandwidths are a function of the data rate, the spectral efficiency of the modulation and coding, the transceiver (or gateway) and satellite frequency stability, the uncompensated Doppler shift and the channel filtering. The required channel bandwidths are shown in Table Eight.

TABLE Eight

Channel Bandwidth Requirements

|  | Transceiver Uplink | Transceiver Downlink | Gateway Uplift | Gateway Downlink |
|---|---|---|---|---|
| Signal Bandwidth | 8.2 KHz | 82.1 KHz | 42.8 KHz | 42.8 KHz |
| +/− Frequency | 0.6 | 0.3 | 0.3 | 0.3 |
| +/− Doppler | 4.4 | 4.0 | 4.4 | 4.0 |
| Total | 13.2 | 86.4 | 47.5 | 47.1 |
| Channel Bandwidth | 15 KHz | 115 KHz | 50 KHz | 50 KHz |

The RF plan for the transceiver-satellite links is summarized in Table Nine and the RF plan for the gateway-satellite links is summarized in Table Ten. For each link, the operating frequency bands are specified. The system is flexible as to the specific channel frequency assignments within the bands, does not require that the TSU channel assignments all be contiguous. All of the satellites will use the same frequencies providing full frequency reuse.

TABLE Nine

RF Plan - Transceiver Satellite Links

|  | TSU | TSD |
|---|---|---|
| Frequency Band | 148–149.9 MHz | 137.175–137.825 MHz |
| Requested Bandwidth | 675 KHz | 115 KHz |
| Channel Bandwidth | 15 KHz | 115 KHz |
| Number of Channels | 15* | 1 |
| Modulation Format | OQPSK | OQPSK |
| Emission Designator | 15K0G1D | 115KG7D |
| Transmit Power | 7 W | 100 W |
| Maximum EIRP | 8.5 dBW | 25.4 dBW |
| Transmit Polarization | Linear | LHC |
| Peak Flux Density in 4 KHz | −124.8 dBW/m$^2$ | −125.2 dBW/m$^2$ |
| Receiving System Polarization | LHC | Linear |
| Receiving System Noise Temp | 732K | 1197K |
| G/T | −30.6 dB | −30.8 dB |
| Source Data Rate | 9.6 KPBS | 96 KPBS |
| Modulation/Coding Rate | 1.75 bit/symbol | 1.75 bit/symbol |
| Symbol Rate | 5.5 KSPS | 54.7 KSPS |
| Bandlimiting | 1.5 Hz/symbol | 1.5 Hz/symbol |

*- Number of channels active at any given time.

TABLE Ten

RF Plan - Gateway-Satellite Links

|  | GSU | GSD |
|---|---|---|
| Frequency Band | 148–149.9 MHz | 137.175–137.825 |
| Channel Bandwidth | 50 KHz | 50 KHz |
| Number of Channels | 1 | 1 |
| Modulation Format | OQPSK | OQPSK |
| Emission Designator | 50K0G7D | 50K0G7D |
| Transmit Power | 1.8 W | 2.5 W |
| Maximum EIRP | 18.6 dBW | 9.4 dBW |
| Transmit Polarization | LHC | LHC |
| Peak Flux Density in 4 KHz | −121.8 dBW/m$^2$ | −138.4 dBW/m$^2$ |
| Receiving System Polarization | LHC | LHC |
| Receiving System Noise Temp | 732K | 1197K |
| G/T | −30.6 dB | −17.8 dB |
| Source Data Rate | 50 KPBS | 50 KPBS |
| Modulation/Coding Rate | 1.75 bit/symbol | 1.75 bit/symbol |
| Symbol Rate | 28.5 ksps | 28.5 ksps |
| Bandlimiting | 1.5 Hz/symbol | 1.5 Hz/symbol |

The peak power flux density produced at the Earth's surface by the satellites in the 137–138 MHz band will be −125.2 dB(W/m$^2$/4 KHz) in any 4 KHz bandwidth. This will be below the −125 dB(W/m$^2$/4 KHz) limit of international footnote 599A. (See 47 C.F.R. § 2106). Thus, coordination with terrestrial services is not required.

The gateway-satellite links will be used for all TT&C functions; special frequencies will not be required for these functions. The satellites will send telemetry packets addressed to the NOCC through the network. Similarly the NOCC will send telecommand packets addressed to the individual satellites thorough the network.

Communications Payload Description 800

Figure 12:
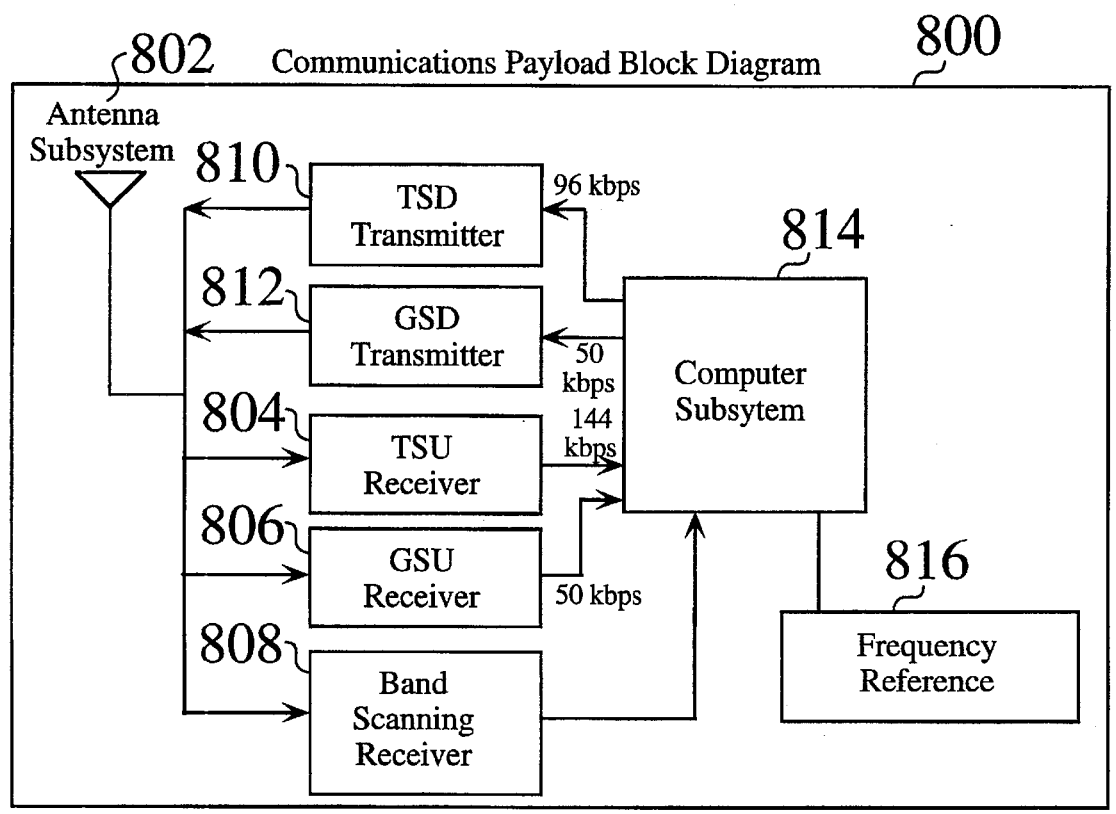
FIG. 12 is a functional block diagram of the message or "communications payload".

A functional block diagram 800 of the communications payload is shown in FIG. 12. The antenna subsystem 802 converts the free space propagated waveforms into RF signals for processing by the transceiver-satellite uplink (TSU) receiver 804, the gateway-satellite uplink (GSU) receiver 806, and the band scanning receiver 808. It also converts the RF signals from the transceiver-satellite downlink (TSD) transmitter 810 and the gateway-satellite downlink (GSD) transmitter 812 into free space propagated waveforms. Each of these receivers and transmitters are coupled to a computer subsystem 814 which is also coupled to a frequency reference 816. Two antennas are used, one for the transceiver-satellite links and the other for the gateway-satellite links. This will eliminate the combining loss that would occur if the TSD and GSD signals were radiated from the same antenna.

Figure 13:
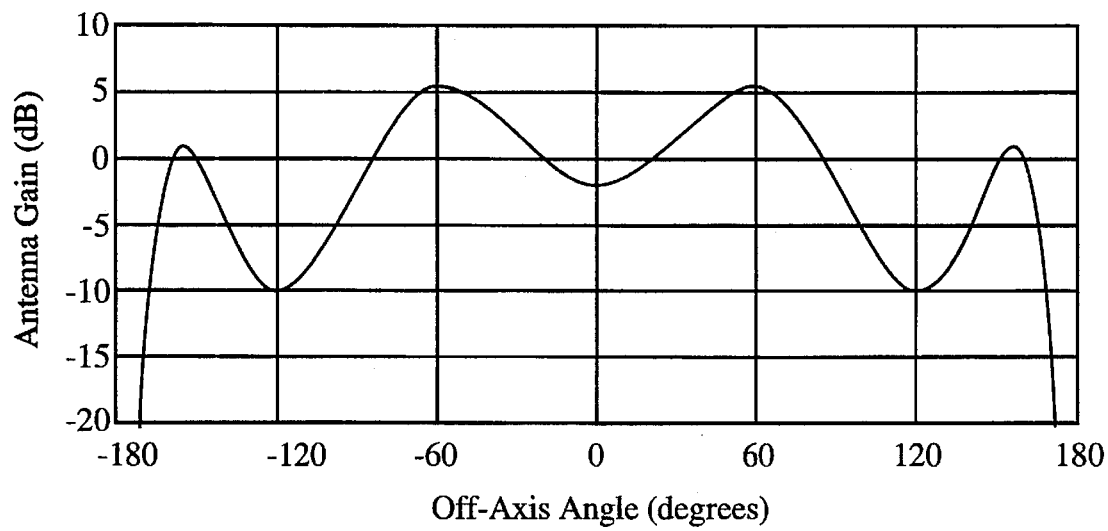
FIG. 13 shows the satellite antenna gain pattern.

The spacecraft antennas will be shaped to partially compensate for the changing free space propagation loss due to the range variation that occurs between the time the satellite appears at the lowest elevation angle (15° above the horizon) and the time it is directly overhead. This maximum variation in path loss corresponds to about 7.5 dB in propagation loss. As a result, the preliminary spacecraft antenna design has a gain of −2 dBi in the nadir direction and +5.5 dBi at a 15 grazing angle. The satellite antenna gain pattern is shown in FIG. 13. The satellite antennas will be left-hand circular polarized.

The TSU receiver will downconvert, demodulate, and decode the uplink signals received from the transceivers. The TSU receiver then will provide the demodulated packets to the computer subsystem at 144 KPBS for subsequent processing. The GSU receiver will perform the same functions for the GSU channel.

The TSD transmitter will accept packetized data from the computer subsystem at 96 KPBS, encode and modulate the data, upconvert it to the transmit channel frequency and provide 100 watts of transmit power using a solid-state power amplifier (SSPA). The GSD transmitter will perform the same functions for the 50 KPBS GSD data using a 2.5 W SSPA.

The band scanning receiver will scan the potential transceiver-satellite uplink channels in the 148–149.9 MHz band in 15 KHz increments to determine channel activity and signal levels. The fifteen least active channels will be identified twice per second and this information will be broadcast to the transceivers.

The frequency reference subsystem will provide stable frequency and time signals to the other functions. The computer subsystem will process all of the received packets, store them in memory and retransmit them as required. It also will use the data from the band scanning receiver to make TSU channel assignments.

The key satellite communications payload parameters are summarized in Table Eleven. The TSD and GSD transmitter filters are shown in FIGS. 14 and 15, respectively. These filters protect the radio astronomy service in the 150.05–153 MHz and 406.1–410 MHz bands from harmful interference by limiting spurious emissions in those bands.

Because the spacecraft will be processing satellites, it will be impossible for signals received from sources outside of the network to cause output signals different from intended output signals.

TABLE Eleven

Key Satellite Communications Payload Parameters

| | |
|---|---|
| Antenna | |
| Nadir Gain | −2 dBi |
| Edge of Coverage Gain | 5.5 dBi |
| Edge of Coverage Beamwidth | 111 degrees |
| Polarization | LHC |
| TSD Transmitter | |
| Frequency Band | 137.175–137.825 MHz |
| Number of Channels | 1 |
| Transmit Power | 100 W |
| 99% Power Channel Bandwidth | 82.1 KHz |
| Data Rate | 96 KPBS |
| GSD Transmitter | |
| Frequency Band | 137.175–137.825 MHz |
| Number of Channels | 1 |
| Transmit Power | 2.5 W |
| 99% Power Channel Bandwidth | 42.8 KHz |
| Data Rate | 50 KPBS |
| TSU Receiver | |
| Frequency Band | 148–149.9 MHz |
| Number of Channels | 15 |
| Channel Bandwidth | 15 KHz |
| Per Channel Data Rate | 9.6 KPBS |
| Noise Figure | 4 dB |
| GSU Receiver | |
| Frequency Band | 148–149.9 MHz |
| Number of Channels | 1 |
| Channel Bandwidth | 50 KHz |
| Per Channel Data Rate | 50 KPBS |
| Noise Figure | 4 dB |
| Band Scanning Receiver | |
| Frequency Band | 148–149.9 MHz |
| Number of Channels | 1 |
| Channel Bandwidth | 15 KHz |
| Noise Figure | 4 dB |
| Frequency Reference | |
| Frequency Stability | 0.1 PPM over environment and time |
| Computer | |
| Memory | 16 Mbytes |

Operational Lifetime and Satellite Reliability

The satellites are designed for a five year design lifetime with consumables sized for seven years of operations. Redundant subsystems and stationkeeping fuel will be provided to achieve a probability of 90% that the satellite will meet all of its design objectives five years after launch.

The operational lifetime of each satellite is determined by a number of factors, including solar array degradation, battery life, stationkeeping fuel consumption and parts and/or subsystem failure. The following lifetime design objectives apply to the satellites:

Solar array degradation—5 years
Fuel consumption—7 years
Random parts failure—5 years Redundancy will be provided on critical hardware as required by reliability analyses, flight heritage on other satellites, and parts failure predictions based upon the latest vendor and publicly available information.

Orbital Configuration

The constellation will consist of a total of 12 satellites in four orbital planes equally spaced around the equator and inclined at 80°. Each plane will contain three equally spaced satellites in 1,100 km altitude circular orbits. The constellation is designed to maximize coverage time over potential service areas while minimizing delay time in delivering messages.

Orbit Selection Considerations

Several factors were considered in selecting the constellation parameters. The objectives were to maximize coverage, minimize delay time, minimize the number of satellites and the satellite cost and provide for an affordable transceiver.

The first parameter is the orbital altitude. Lower altitudes reduce the required transmit power but also reduce the satellite footprint, resulting in reduced coverage. The practical lower limit is 500 km. Below this altitude atmospheric drag would significantly shorten the satellites lifetime in orbit. Higher altitudes increase the satellite footprint, resulting in increased coverage at the expense of increased satellite and transceiver transmit power requirements. The practical upper limit is 1,400 km. Above this value, the Van Allen radiation belt makes radiation hardening of the satellite necessary.

A second parameter is orbital eccentricity. An eccentric orbit provides longer satellite visibility over a region around its apogee when the required satellite and transceiver transmit powers are highest and provides shorter visibility over a region around its perigee when the required transmit powers are at a minimum. Satellites in elliptic orbits that pass through the Van Allen belts must be designed to withstand the resulting radiation levels.

A third parameter is inclination angle. High inclination angles, polar orbits, minimize footprint overlap but result in reduced coverage time over potential service areas. Lower inclination angles increase coverage time over potential service areas but result in increased footprint overlap. Footprint overlap results in reduced effective capacity for a system, such as the system, where all of the satellites reuse the same frequencies.

The fourth parameter is the number of planes and the number of satellites per plane. One of the most important performance measures of a store-and-forward satellite system is delay time, the time it takes for a message sent from point A to be delivered to point B. Increasing the number of satellites reduces the delay time at the expense of increased system cost. For a given number of satellites, the more uniform the distribution of satellites, the shorter the delay time.

Preferred Configuration

The constellation parameters are summarized in Table Twelve. The 1,100 km orbital altitude is the highest value consistent with low cost satellite and terminal transmit power requirements. Circular orbits provide consistent transmit power requirements regardless of location on the Earth's surface. The 80° inclination angle provides a good compromise between time over service areas and footprint overlap, ensuring that overlap never occurs between North 35° and South 35° latitude. The four plane, three satellites per plane constellation provides the best delay time performance of any twelve satellite constellation.

TABLE Twelve

| Constellation Parameters | |
| --- | --- |
| Total Number of Satellites | 12 |
| Number of Planes | 4 |
| Satellites Per Plane | 3 |
| Satellite Altitude | 1,100 km |
| Eccentricity | 0 (circular orbits) |
| Inclination Angle | 80 degrees |
| Inter-Plane Spacing | 45 degrees |
| Intra-Plane Satellite Spacing | 120 degrees |
| Inter-Plane Satellite Phasing | 60 degrees |
| Terminal Elevation Mask Angle | 15 degrees |

FIG. 16 shows the ground traces of the constellation over approximately two orbital periods. During this interval the satellites have virtually covered the entire Earth's surface. FIGS. 17 and 18 show the constellation coverage at two different snapshots in time. The 15° terminal elevation mask angle results in a 4,326 km diameter footprint. The coverage footprints appear to be distorted away from the equator due to the Mercator projection. The coverage snapshots typically show eight satellites over service areas, two satellites over the North Pole, and a final two satellites over the South Pole.

Launch Arrangements

The launch segment of the system will include the launch vehicle and all associated equipment used to support the launch, satellite carriage for multiple launch, integration of the satellites with the launch vehicle and control of launch operations. The satellites will be launched in groups or on a one-by-one basis. Several candidate launch vehicle companies have the capability to launch all or a portion of the constellation on their operational launchers, such as the Delta™, Pegasus™, Long March, Tsyklon, Kosmos and START rockets, and on several other planned launchers in development, such as Lockheed LLV-1, the Minuteman II SLV and the Pac Astro launchers.

Use of a single launch vehicle to initially establish a plane of satellites will minimize the amount of on-board fuel needed on each satellites to arrange the satellite properly in the plane. Since all of the satellites will be initially orbited in the same plane, they will not require the large changes in inertia needed to change the plane of an individual satellite. Replenishment satellites, either in the case of early failure or at the end of life, will be launched on the smaller launchers. Such satellites, which are expected to be launched one at a time, or in small groups, will carry the additional fuel needed to correct for orbital plane insertion errors. Candidate launchers are shown in Table Thirteen.

TABLE Thirteen

| Candidate Launchers | | |
| --- | --- | --- |
| Candidate Launchers | Status | Launch Capability |
| Delta | Operational | Group |
| Lockheed LLV-1 | In Development | Group |

TABLE Thirteen-continued

| Candidate Launchers | | |
| --- | --- | --- |
| Candidate Launchers | Status | Launch Capability |
| Pegasus XL | Operational | Group |
| Minuteman II SLV | In Development | Individual |
| PacAstro | In Development | Individual |
| Long March | Operational | Group |
| Tsyklon | Operational | Group |
| Kosmos | Operational | Group |

Pre-launch and launch operations are currently conducted at ranges in the United States and overseas. The satellite control segment will determine the overall launch plans and schedules, and provide the parking orbit parameters to the launch vehicle contractor. The vehicles will be assembled and tested by the launch vehicle vendor before mating with the satellites. The satellite, or satellite carriage in the case where an entire plane of satellites is launched by a single vehicle, will then be mated with the launch vehicle and undergo integration testing and checkout. The launch vehicle contractor will perform all planning and targeting required for the launch vehicle to achieve the desired parking orbit.

The actual launch operations will be controlled by the launch control center (LCC) and associated network of TT&C Earth stations. Satellite status telemetry and housekeeping commands will be passed between the satellite and the launch vehicle, and relayed via the LCC as part of the telemetry system. The LCC will monitor the launch vehicle status, and make a recommendation to launch based upon vehicle and satellite readiness, as well as environmental factors, e.g., weather conditions. The range safety officer can command launch vehicle destruction after ignition if predetermined range safety guidelines are violated.

The satellite launch control segment located at the system TT&C Earth station will acquire the satellites using the estimated parking orbit vectors received from the LCC. The parking orbit will be confirmed by the actual ephemeris data provided by the satellites and the LCC. The satellite(s) will be ejected from the launch vehicle carriage at predetermined points in the orbit plane. The satellite launch control segment will determine the command sequence to insert each of the satellites into its proper position in the mission orbit. Small propellant burns will position each satellite in the correct slot relative to the other satellites in the same orbit. The satellite will then be commanded to deploy the solar panels and take other actions necessary to commence in orbit checkout and mission operations. After all of the satellites are positioned in their proper orbital positions, control will be passed to the system TT&C Earth station used for regular operational control.

VIII. Transceivers and Services

The present invention will provide a family of low-cost transceivers to support a variety of different applications. The heart of these transceivers is the modem module. The modem will be small, less than ten cubic inches, and capable of battery operation. It will be available in pocket-sized, desktop, and vehicle mounted transceiver configurations. Application specific transceiver configurations will be constructed by combining the modem module with other modules, as shown in FIG. 19. A schematic illustration of the module is provided in FIG. 20. Table Fourteen provides examples of how these modules might be combined for different applications, although other combinations are possible. Prices for a basic transceiver are expected to be under $500.

TABLE FOURTEEN

Possible Module Combinations for Different Applications

| Applications | Leo One Modem | Battery Pack | Whip Antenna | AC Adapter | Expanded Memory | GPS | Parallel Interface | Palmtop PC |
|---|---|---|---|---|---|---|---|---|
| Status Monitoring | X | X | X | | | | X | |
| Vehicle Tracking | X | | | | | X | | |
| Paging | X | X | X | | | | | |
| E-Mail | X | X | X | | X | | | X |
| Security Monitoring and Control | X | X | X | | | | X | |
| Emergency Alerting | X | | X | X | | | | |

Technical Parameters

A functional block diagram of the modem is shown in FIG. 20. The modem module will interface directly with an antenna. In most applications, the standard antenna will be a normal-mode helix similar to those used with conventional hand-held VHF transceivers. In vehicle mounted applications, the standard vehicle FM radio antenna or an enhanced replacement will be used. A typical antenna pattern is shown in FIG. 21.

The TSD receiver will downconvert, demodulate, and decode the 96 KPBS satellite downlink channel. The TSU transmitter will accept packetized data from the computer subsystem at 9.6 KPBS, encode and modulate the data, upconvert it to the transmit channel frequency, and provide seven watts of transmit power. The frequency reference subsystem will provide stable frequency and time signals to the other functions. The computer subsystem will process the received packets and make the data available to the other modules or directly to the subscriber via a RS-232 port. The computer will receive data to be packetized and uplinked from other modules or directly from the subscriber via a RS-232 port.

The key transceiver technical parameters are summarized in Table Fifteen. Transceivers are designed to be incapable of radiating in the 108-137 MHz bands.

The satellites have high velocities relative to a fixed terminal on the Earth's surface resulting in large Doppler shifts on the transmitted and received RF carriers. In the 148-149.9 MHz uplink band, the worst case Doppler shifts will be 2.2 KHz and in the 137-138 MHz downlink band they will be 2.0 KHz. The transceivers will track the transceiver-satellite downlink Doppler, scale the measured value by the uplink/downlink frequency ratio, and precompensate the transceiver-satellite uplink transmissions such that the signals are received at the satellite with no apparent Doppler shift. This will virtually eliminate frequency acquisition time at the satellite. Even an inexpensive transceiver frequency reference will reduce the apparent Doppler to less then 300 Hz. The maximum transceiver transmit power of seven watts in conjunction with the low, 1% maximum, duty cycle will ensure that the transceivers will comply with all relevant radiation exposure safety standards.

TABLE Fifteen

Key Transceiver Parameters

| | |
|---|---|
| Antenna | |
| Pattern | Non-Directional |
| Polarization | Vertical |
| Transmitter | |
| Frequency Band | 148-149.9 MHz |
| Channel Bandwidth | 15 KHz |
| Number of Active Channels | 1 |
| Doppler Pre-Compensation | ±2.2 KHz |
| Transmit Power | 7 W |
| Burst Duration | 450 msec |
| Burst Spacing | 15 seconds |
| Duty Cycle | 9 seconds every 15 minutes |
| 99% Power Bandwidth | 8.2 KHz |
| Modulation | OQPSK |
| Coder | Convolutional r = 7/8, K = 7 |
| Data Rate | 9.6 KPBS |
| Receiver | |
| Frequency Band | 137.175-137.825 MHz |
| Channel Bandwidth | 115 KHz |
| Number of Active Channels | 1 |
| Doppler Pull-In Range | ±2.0 KHz |
| Demodulation | OQPSK |
| Decoder | Soft Decision Viterbi r = 7/8, K = 7 |
| Data Rate | 96 KPBS |
| Noise Figure | 4 dB |
| Implementation Loss | 2 dB |
| Frequency Reference | |
| Frequency Stability | 1.0 PPM over environment and time |

Operation

The transceiver-satellite downlink (TSD) signal is partitioned into 500 msec frames. Each frame is further divided into two time slots. The first time slot is 50 msec in duration and is reserved for network control (network packets). During this time slot, the satellite will broadcast the following information:

- ID of uplink frequency channel to be used for network control (network packets);
- IDs of uplink frequency channels assigned to specific transceivers for uplink of text packets and the ID of the assigned transceiver;
- IDs of uplink frequency channels available for uplink of monitoring packets using slotted ALOHA; and
- Confirmations of network, monitoring, and text packets received during the previous frame.

During the remaining 450 msec time slot the satellite will transmit packets addressed to transceivers in its footprint.

The 450 msec time slot allows for the transfer of 10 text packets (433 msec), or 54 monitoring packets (450 msec), or some combination of both.

The protocol for transceiver-satellite uplink (TSU) transfer of monitoring packets is slotted ALOHA and the protocol for TSU transfer of text packets is reservation ALOHA. Each satellite will receive fifteen 9.6 KPBS uplink frequency channels. One of these channels will be used for network control. Transceivers will uplink network packets using slotted ALOHA. Up to six channels can be assigned by the satellite to specific transceivers for the uplink of text packets. The remaining eight channels plus any of the six channels not assigned to specific transceivers are available for transceiver uplink of monitoring packets using slotted ALOHA.

The transceivers will use the time that they receive the first bit of the 500 msec downlink frame for time synchronization. The propagation time from the satellite to a user at the sub-satellite point will be 3.7 msec, and the time to a user at the edge of the satellite footprint will be 8.6 msec—a variation of 4.9 msec. Thus, if all of the transceivers transmit at the time that they receive a time mark from the satellite, their signals will be received within a 9.8 msec interval at the satellite. Hence, a guard time of 9.8 msec will be required for the uplink signal timing.

The transceivers will divide the 500 msec interval starting coincident with the receipt of the first bit of the downlink frame into twelve 41.67 msec slots. A transceiver that wants to send a network packet to the satellite will randomly select one of these slots and transmit its packet during the selected slot on the uplink frequency channel assigned by the satellite for network control. The 41.67 msec slot will allow 26.7 msec for packet transmission and 14 msec for guard time. If the transceiver does not receive a network packet from the satellite acknowledging receipt of its packet within 1 second, the transceiver will wait for a randomly selected number of time slots and then retransmit its packet. Transceivers will send network packets for the following:

To request assignment of an uplink frequency channel for uplink of a text packet;

To acknowledge receipt of a monitoring or text packet; and

To register the location of a transceiver.

The transceivers will divide the 500 msec interval starting coincident with the receipt of the first bit of the downlink frame into five 100 msec slots. A transceiver that wants to send a monitoring packet to the satellite will randomly select one of these slots and transmit its packet during the selected slot on a randomly selected uplink frequency channel assigned by the satellite for monitoring packets. The 100 msec slot will allow 83.33 msec for packet transmission and 16.67 msec for guard time. If the transceiver does not receive a network packet from the satellite acknowledging receipt of its packet from within 1 second, then the transceiver will wait for a randomly selected number of time slots and retransmit its packet.

A transceiver that wants to send text packets to the satellite will use the network control channel to request a frequency channel assignment. When a channel assignment is received, the transceiver will transmit its packets on that channel. Footnote US323 to the Frequency Allocation Table, 47 C.F.R. § 2.106, requires 15 second spacing between the transmission of individual Text packets from a single terminal on any single frequency in the 148–149.9 MHz band. If the transceiver does not receive a network packet from the satellite acknowledging receipt of its packet within one second, it will repeat its request for a frequency channel.

IX. System Architecture and Gateways

The optimum communications system architecture which will provide cost effective service to the intended market is a store-and-forward packet satellite system operating in the Non-Voice, Non-Geostationary Mobile Satellite Service (NVNG MSS). This system will provide remote and mobile messaging, paging, electronic mail, monitoring, tracking, security, emergency and positioning services throughout the world.

The system will offer two basic types of services:

Monitoring: This service will provide for the transmission or reception of single short data packets, 80 characters, on an infrequent basis. Typical applications will include status monitoring, location tracking, paging, security monitoring, and emergency alerting; and Messaging: This service will provide for the transmission or reception of long messages comprised of multiple long data packets, 500 characters each. E-mail is a typical messaging application.

Network Architecture

The initial constellation will consist of twelve satellites in four orbital planes. The orbital altitude will be 1,100 km and the orbital planes will be inclined at 80 degrees. The transceiver and gateway antenna elevation mask angle will be 15 degrees resulting in a satellite footprint diameter of 4,326 km. The system will operate in the 137.175–138.825 and 148–149.9 MHz frequency bands.

The transceivers will transmit digital data packets to the satellites. The satellites will demodulate and store the data packets for subsequent retransmission to other transceivers or to a gateway. The gateways will provide access to and from terrestrial telecommunications networks, and act as network control stations. Note that the satellites do not require full time gateway-satellite interconnection to support transceiver-satellite links. Thus, the satellites will be able to provide service even when not in view of a gateway.

One gateway is designated as the primary TT&C Earth station. This gateway will also serve as the network operation control center (NOCC). Additional gateways will be equipped to provide back-up TT&C and NOCC functions in the event of a catastrophic failure of the primary TT&C and NOCC site.

Two gateways are currently planned in the continental United States (CONUS): one in the southwest and one in the southeast. A third gateway will be located in Alaska. Additional gateways for non-U.S. traffic will be located in other territories and countries.

Gateway Technical Parameters and Operation

A gateway functional block diagram is shown in FIG. 22. The gateway antenna transmit and receive pattern is shown in FIG. 23. The GSD receiver will downconvert, demodulate, and decode the 50 KPBS satellite downlink channel and provide the demodulated packets to the computer subsystem for subsequent processing. The GSU transmitter will accept packetized data from the computer subsystem at 50 KPBS, encode and modulate the data, upconvert it to the transmit channel frequency, and provide 1.8 watts of transmit power.

The frequency reference subsystem will provide stable frequency and time signals for the other functions. The computer subsystem will perform the packet and network overhead functions including packet routing and billing. It will control the open loop pointing of the gateway antenna to acquire and follow the satellites. In addition, it will process Doppler frequency measurements of the satellite signals to refine their orbital estimates.

The TT&C subsystem will decode and process the telemetry data packets from the satellites and generate and encode command packets for transmission to the satellites. All of the TT&C data will be encrypted to prevent unauthorized control of the satellites.

The NOCC subsystem will allow for control of the constellation. The NOCC functions will include resolving overlap conflicts by commanding one of the overlapping satellites to cease operation during the overlap and monitoring constellation traffic levels.

The key gateway technical parameters are summarized in Table Sixteen.

TABLE Sixteen

| Key Gateway Technical Parameters | |
| --- | --- |
| Antenna | |
| Operating Frequency | 137–138 MHz & 148–149.9 MHz |
| Polarization | LHC |
| Gain | 16 dBi |
| Half Power Beamwidth | 22.5 degrees |
| Receiver | |
| Frequency Band | 137.175–137.825 MHz |
| Channel Bandwidth | 50 KHz |
| Number of Channels | 1 |
| Doppler Shift | 2.1 KHz |
| Demodulation | Differential OQPSK |
| Decoding | Soft Decision Viterbi, r = 7/8, K = 7 |
| Data Rate | 50 KPBS |
| Noise Figure | 4 dB |
| Implementation Loss | 2 dB |
| Transmitter | |
| Frequency Band | 148–149.9 MHz |
| Channel Bandwidth | 50 KHz |
| Signal Bandwidth (99% power) | 71.3 KHz |
| Number of Channels | 1 |
| Transmit Power | 1.8 Watts |
| Modulation | Differential OQPSK |
| Coding | rate-7/8, constraint length 7 convolutional |
| Data Rate | 50 KPBS |
| Frequency Reference | |
| Frequency Accuracy | 0.1 PPM over environment and time |

The gateways will poll the satellites to initiate data transfer. This will prevent interference between two satellites appearing within the main beam of a single gateway antenna. The gateways will predict when each satellite will appear above a 15° elevation mask angle and use open loop pointing of the gateway antenna to acquire and follow the satellite. The gateways will estimate the satellite signal Doppler shift to minimize acquisition time. The gateways will use Doppler frequency measurements of the satellite signals to refine their orbital estimates.

The gateway-satellite uplink (GSU) and gateway-satellite downlink (GSD) signals will be partitioned into 500 msec frames. Each frame will be divided into two time slots. The first time slot will be 50 msec in duration and will be reserved for network control (network packets). The remaining 450 msec time slot will allow for the transfer of five text packets (416 msec), or 28 monitoring packets (448 msec), or some combination. All packet exchanges will be acknowledged by the recipient using network packets. The gateway and the satellite will send at least one network packet in the network control time slot until the gateway signs off.

The satellites will store all received monitoring packets and transmit them to the first available gateway. The gateway will verify that the sender's ID is valid and route the packet to its destination via the most efficient route. This may be via the terrestrial network or the satellite network. If the sender's ID is not valid, the packet will be discarded. The gateway will make the appropriate billing entry.

When a satellite receives a request for assignment of an uplink frequency channel for text packets there are two possibilities:

1. If the satellite is in communication with a gateway, then the satellite will use the network control channel to send the transceiver ID and the destination ID to the gateway. The gateway will verify that the transceiver ID is valid and advise the satellite to assign the channel. The gateway will also provide routing information for the packets. If the transceiver ID is not valid, the gateway will not authorize a channel assignment.

2. If the satellite is not in communication with a gateway, the satellite will assign a channel and store the received packets. At its first opportunity, the satellite will send the transceiver ID and the destination ID to a gateway. The gateway will verify that the transceiver ID is valid and provide routing information to the satellite. If the transceiver ID is not valid, the gateway will advise the satellite to discard the packets.

Text packet routing instructions will instruct the satellite to send the packets to the gateway upon receipt, to store the packets and send them to another gateway later in the orbit, to downlink the packets to the destination transceiver, or to store the packets and downlink them to the destination transceiver later in the orbit.

The network will not encrypt its links. Users will have the option of encrypting their data prior to input to the network, and special transceivers will be available which will include this encryption function.

System Performance Objectives

Link budgets for the transceiver-satellite links for 90° and 15° elevation angles are shown in FIGS. 24 and 38. The downlink transmit power of 100 watts in conjunction with the isoflux satellite antenna pattern results in a peak flux density of $-125.2$ $dB(W/m^2/4$ $KHz)$ which is below the maximum allowable power flux density at the Earth's surface of $-125$ $dB(W/m^2/4$ $KHz)$. The polarization loss is modeled as 3 dB to account for the circular polarized transmit antenna and a vertically polarized receive antenna.

The transceiver antenna gain is assumed to be 0 dBi. The baseline transceiver receiver noise figure is 4 dB and 2 dB of antenna loss is assumed. The baseline downlink data rate is 96 KPBS. The required $E_b/N_0$ for a $10^{-6}$ BER with the OQPSK modulation and rate $-7/8$ convolutional coding is 7 dB. An additional implementation loss of 2 dB is assumed. The uplink transmit power is set to seven watts to make the uplink margin equal to the downlink margin.

The resulting link margin is approximately 17.5 dB for both the uplink and downlink. This significant margin is required to combat fading, building penetration loss, shadowing and interference.

Link budgets for the gateway-satellite links for 90° and 15° elevation angles are shown in FIGS. 25 and 39. The main difference from the transceiver-satellite link budgets are that the gateways will have 16 dBi peak gain antennas. Pointing loss of 3 dB is assumed. The polarization loss is reduced to 1 dB since the antennas on both sides of the link are circular polarized. A 2 dB higher $E_b/N_0$ is required to support the required $10^{-8}$ BER. The transmit powers are set to provide the same link margin as the transceiver-satellite links. The gateway-satellite links will not be as susceptible to building penetration loss, shadowing and interference effects because of the high gain antennas and fixed sites.

X. Interference and Frequency Sharing Considerations

In designing the system, consideration of the interference and frequency sharing issues has strongly influenced many of the key system design decisions. The allocated frequency bands for the NVNG MSS are already in use for a variety of services, and Leo One USA™ has developed a proposal whereby it will be able to share these bands effectively and efficiently with the existing and other proposed users. In particular the choice of ⅞ rate coding and filtered QPSK modulation on all the communications links has been made to conserve bandwidth. The coding scheme and modulation scheme will permit the system to limit its bandwidth requirement, which will facilitate the system's ability to share these frequencies with the other proposed users of the band.

The specific sharing situation for each of the proposed frequency bands is as follows:

137.175 to 137.825 MHz Band

The 137.175 to 137.825 MHz band is the only VHF spectrum allocated on a primary basis to the NVNG MSS which has sufficient bandwidth to support the downlink signals. These signals consist of the single 115 KHz bandwidth Transceiver-Satellite Downlink (TSD) TDM carrier and the single 50 KHz bandwidth Gateway-Satellite Downlink (GSD) carrier. FIG. 31 shows the existing TIROS/METEOR utilization of this band. Upon the receipt of FCC approval, the system will operate its GSD link cross-polar to any CDMA NVNG MSS user and co-polar with other narrow band users (TIROS/METEOR and FDMA NVNG MSS systems). The precise carrier frequencies within the 137.175 to 137.825 MHz band proposed are as follows. These frequencies may be subject to change as a result of coordination with other users in the frequency band:

TSD carrier center frequency=137.694 MHz

GSD carrier center frequency=137.575 MHz

Any coordination with other narrow band users would attempt to ensure non co-frequency, co-coverage operation for the TSD. Additional considerations will be given to the extra isolation achieved with the gateway Earth station antenna gain for the GSD. Any occasional interference into the downlinks may be able to be tolerated because of the non-real-time store-and-forward nature of the service, and the ability to re-transmit messages that are not correctly received.

Coordination with broad-band spread-spectrum CDMA systems would be based on similar assumptions to that considered during the NRM. However, the system would be easier to coordinate as it radiates significantly less total RF power than other proposed narrow band systems, and therefore causes approximately 3 dB less interference into CDMA systems. In terms of interference from CDMA systems into the network, the maximum interfering PFD from the proposed CDMA systems would be less than −150 dBW/m²/4 KHz, which is approximately 22 dB lower than the wanted PFD under unobstructed line-of-sight, thus providing adequate interference margin.

148.0 to 149.9 MHz Band

The 148.0 to 149.9 MHz band is the only uplink spectrum currently allocated on a primary basis to the NVNG MSS. This band must be shared with existing terrestrial users, many of whom are transmitting high power narrow-band signals over relatively large geographic areas. Because the NVNG MSS transceivers will operate in a mobile environment, it is not possible to establish a rigid, yet viable, frequency coordination scheme to overcome potential interference problems.

For this reason, the system will use an adaptive channel assignment scheme for the transceiver transmissions in this band. The choice of channel on which a transceiver transmission may occur will be based on data collected by the on-board band-scanning receiver. The satellite will communicate the correct channel directly to the transceiver before the transceiver transmits. In this way, the system will be able to adapt its instantaneous frequency plan to suit the prevailing use of the spectrum in the geographic areas of interest.

The TSU adaptive channel assignment scheme will require 675 KHz of the 148.0 to 149.9 MHz band, to ensure that sufficient usable channels are available. It will not operate in the portion of the band that is dedicated to feeder links. Within the non-feeder link portion, the system will simultaneously use only fifteen 15 KHz bandwidth channels for the TSU links, resulting in a total of 225 KHz of instantaneously occupied bandwidth. The algorithms used to determine the selected channels for transmission will be derived taking into account the coordination with other existing and planned users in the band. With regard to potential coordination with other NVNG MSS systems that might employ a similar channel assignment scheme, it will be necessary to coordinate algorithm methodologies, in order to minimize the chance of different systems deciding to simultaneously use the same channel frequency.

In the case of coordination with CDMA systems, a single Leo One USA™ transceiver transmission with an actual EIRP of 8.5 dBW, will be reduced by the spreading gain of the CDMA system (typically 25 dB), to be equivalent to an EIRP of no more than about −17 dBW. This compares with the typical CDMA mobile terminal EIRP approximately +3 dBW to give an effective C/I of greater than +20 dB. Considering that a typical NVNG MSS system's required $E_b/N_o$ is around 4 dB or less, this level of interfering signal is considered to be negligible. A more detailed analysis during coordination between the present invention and any CDMA systems would determine how many system channels of this type could be used simultaneously.

Concerning possible interference from CDMA systems into the present system, the maximum aggregate EIRP of a typical CDMA system's mobile terminals within a single beam is +10 dBW. If the CDMA signals spread over 850 KHz and the Leo One USA™ receive bandwidth is only 10 KHz, the amount of the aggregate CDMA uplink EIRP that falls within the system bandwidth is around −9 dBW. This is further reduced by 3 dB if the system channel is located at the edge of the CDMA system's spread bandwidth. As the wanted mobile terminal EIRP for the system is +8.5 dBW, the resulting C/I is around 20 dB, under clear sky conditions.

For the GSU links, it is possible to coordinate a rigid channel allocation plan, because of the fixed nature of the gateway Earth stations. It will also be desirable to have a fixed channel allocation for all feeder links because of their continuous mode of operation during periods of visibility of the satellites. Therefore, the present invention will require a dedicated 50 KHz GSU channel allocation within the 1.9 MHz available spectrum. This would conveniently be located adjacent to the feeder link channels proposed during the NRM, as indicated in FIG. 32. However, coordination of this dedicated channel would also need to be made with the other non-MSS users in the frequency band, which in turn would depend on the location selected for the gateway Earth stations.

Choice of Multiple Access Technique for the Service Links

A TDMA/FDMA access technique has been selected for the service links of its proposed NVNG MSS system for a variety of reasons associated with the interference environment and the particular characteristics of the NVNG service, which are outlined as follows:

1. While a CDMA access technique has the advantages of averaging the effects of interference across the spread bandwidth, this is of dubious advantage in a situation where there are very high density interfering carriers, as is the case with some of the terrestrial mobile services operating in the 148 to 149.9 MHz band. When the aggregate level of these interferers exceeds a threshold level it would be necessary to implement an adaptive notch filter technique to reduce the effect of the individual carriers. This is considered to be a more complex technique than the adaptive channel assignment scheme proposed for the system which permits the interferers to be avoided by assigning narrow band channels to terrestrially unused portions of the band.

2. CDMA systems can only be made spectrally efficient when active, closed loop power control is used on the links. This is an undesirable complexity in an NVNG system, taking into account the short duration of the message bursts relative to the link delay time.

3. CDMA systems compare favorably with FDMA systems, in terms of spectral efficiency, when the satellite coverages are composed of multiple beams with a high level of frequency re-use. The currently proposed NVNG systems are all relatively low-cost "lightsat" designs, which are not compatible with such a multi-beam coverage concept.

4. For the NVNG service, US footnote 323 allows four times as many packets to be transmitted every 15 seconds from a narrow band mobile terminal than from a spread spectrum mobile terminal.

5. The filters required to protect the radio astronomy service in the 150.05 to 153.000 MHz band would be more complex for a wide band CDMA system than for a narrow band FDMA system. Such a complexity is highly undesirable in the NVNG service where minimizing the mobile terminal and satellite costs is of such significance.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various orbital parameters, altitudes and populations and locations of the terminals, gateways and relays that have been disclosed above are intended to educate the reader about preferred embodiments, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

LIST OF REFERENCE CHARACTERS

G Terminals
OR Orbits
S Satellites
T Times
10 Satellite
12 Central body
14 Solar panels
16 Helical antennas
100 RF Communications Subsystem
102 First isoflux antenna
104 First diplexer
106 Band scan receiver
108 Gateway transceiver
110 Second isoflux antenna
112 Second diplexer
114 User receivers
116 User transmitters
118 User communications processing circuitry
200 Tracking, Telemetry and Control Subsystem
202 Communications control circuitry
204 Message memory
206 System memory
208 TT&C Processor
210 Telemetry acquisition and control circuitry
212 Telemetry sensors
300 Flight Computer Subsystem
400 Attitude Determination & Control Subsystem (ADCS)
402 ADCS processor
404 Attitude sensors
406 Control actuators
500 Electric Power Subsystem
502 Solar arrays
504 Batteries
506 Charge regulators
508 Power regulators
510 Power switching circuitry

What is claimed is:

1. A satellite communications apparatus comprising:

a plurality of terminals (G);

a first satellite (S1) operating in a low Earth orbit (OR1);

said first satellite (S1) for communicating with at least one of said plurality of terminals (G);

a second satellite (S2) operating in said low Earth orbit (OR1);

said second satellite (S2) for communicating with at least one of said plurality of terminals (G);

said plurality of terminals (G) including a relay station;

said relay station being located at a latitude on Earth which enables said relay station to communicate with said first and said second satellites (S1, S2) as said first and second satellites independently pass over a pole of the Earth.

2. A satellite communications apparatus comprising:

a plurality of terminals (G);

a first satellite (S1) operating in a first low Earth orbit (OR1);

said first satellite (S1) for communicating with at least one of said plurality of terminals (G);

a second satellite (S2) operating in a second low Earth orbit (OR2);

said second satellite (S2) for communicating with at least one of said plurality of terminals (G);

said plurality of terminals (G) including a relay station;

said relay station being located at a latitude on Earth which enables said relay station to communicate with said first and said second satellites (S1, S2) as said first and second satellites independently pass over a Pole of the Earth.

3. A satellite communications system comprising:

a plurality of satellites (S) operating in a plurality of low Earth orbits (OR);

a plurality of relay stations (GB);

a plurality of user terminals (G);

said plurality of user terminals (G) being distributed, primarily in portions of the earth (E) which are inhabited;

each of said plurality of satellites (S) operated for communicating with at least one of said plurality of relay stations (GB) and one of said user terminals (G);

each one of said plurality of relay stations (GB) being located at a latitude on Earth (E) which enables each one of said relay stations (GB) to communicate with said plurality of satellites (S) as each one of said plurality of satellites (S) independently passes over a pole of the Earth (E);

each one of said plurality of satellites (S) receiving and storing on board a message from one of said plurality of terminals (G);

each one of said plurality of satellites (S) transmitting said stored message to one of said plurality of relay stations (GB) where it is stored;

said relay station (GB) re-transmitting said stored message to another one of said satellites (S); said satellite (S) forwarding said stored message to another one of said plurality of terminals (G); and at least one of said plurality of relay stations (GB) being operated for primary tracking, telemetry and control of said plurality of satellites (S), and for operating and controlling said plurality of satellites (S), said plurality of user terminals (G) and said plurality of relay stations (GB).

4. The satellite communication apparatus as claimed in claim 3 in which said plurality of low Earth orbits (OR) includes four orbital planes, each of said orbital planes inclined at eighty degrees inclination.

5. The satellite communication apparatus as claimed in claim 3 in which said plurality of user terminals (G) includes at least one portable transceiver terminal.

6. The satellite communication apparatus as claimed in claim 3 in which said plurality of user terminals (G) includes at least one mobile transceiver terminal.

7. The satellite communication apparatus as claimed in claim 3 in which:

said plurality of satellites (S), said plurality of user terminals (G) and said plurality of relay stations (GB) are operated for transmitting and receiving a plurality of packets of digital data and system overhead information;

said plurality of satellites (S) are operated for transmitting a user terminal-satellite downlink signal (TSD) and a relay station-satellite downlink signal (GSD);

said user terminal-satellite downlink signal (TSD) and said relay station-satellite downlink signal (GSD) having a plurality of frames of approximately 500 millisecond duration;

said downlink signal (GSD, TSD) having a quadraphase shift keying (QPSK) modulation for transmitting said plurality of packets in each of said plurality of frames;

said plurality of satellites (S) are also operated for receiving a user terminal-satellite uplink signal (TSU) and a relay station-satellite uplink signal (GSU) in which said quadraphase shift keying (QPSK) modulation is used for transmitting said plurality of packets;

said user terminal-satellite uplink signal (TSU) having a combination of random access and frequency division multiplexing (FDM); and said downlink signal (GSD, TSD) and said relay station-satellite uplink signal (GSU) having a time division multiplexing (TDM).

8. The satellite communication apparatus claimed in claim 3 in which said plurality of satellites (S) includes twelve satellites (S), three of said satellites (S) orbiting in each of said four orbital planes.

9. The satellite communication apparatus claimed in claim 3 which further includes:

each of said plurality of satellites (S) having adaptive channel assignment electronics (808, 814) for monitoring a pool of radio frequency channels in a 148 to 149 MHz band and assigning said channels to said plurality of user terminals (G) as available; said adaptive channel assignment electronics (808, 814) operated to scan said pool of radio frequency channels in a half-second interval for signal indicating channel usage, projecting channel usage for an ensuing half-second and thereafter instructing one of said plurality of user terminals (G) which channel to use when calling.

10. The satellite communication apparatus claimed in claim 5 in which said portable transceiver terminal is located at a site of remote assets and periodically communicates data relating to said remote assets.

11. The satellite communication apparatus claimed in claim 5 in which said portable transceiver terminal is located at a site of mineral exploration and periodically communicates data relating to the status of said site.

12. The satellite communication apparatus claimed in claim 5 in which said portable transceiver terminal is carried by a user and communicates data relating to said user.

13. The satellite communication apparatus claimed in claim 5 in which said portable transceiver terminal is located at a site of a user and periodically communicates e-mail and paging signals for said user.

14. The satellite communication apparatus claimed in claim 6 in which said mobile transceiver terminal is located on a moving vehicle and periodically communicates data relating to said vehicle.

15. The satellite communication apparatus claimed in claim 7 in which each one of said plurality of user terminals (G) includes a modem for interconnecting a computer system RS232 port to a satellite (S).

16. The satellite communication apparatus claimed in claim 9 in which said adaptive channel assignment electronics (808, 814) includes a band scanning receiver (808) and a computer subsystem (814) having an algorithm for said projecting channel usage, said algorithm based on a sample history of scanning for said half-second intervals.

17. The satellite communication apparatus claimed in claim 15 in which said modem is a module capable of interconnection, by itself or in combination, with an antenna, a personal computer (Palmtop PC), a parallel interface, an expanded memory and a global positioning system (GPS).

18. The satellite communication apparatus claimed in claim 15 in which said modem includes an uplink transmitter (TSU Transmitter) and a downlink receiver (TSD Receiver) for communicating with said plurality of satellites (S) said plurality of packets of digital data and system overhead information.

19. The satellite communication apparatus claimed in claim 15 in which said modem operates to pre-compensate one of said plurality of user terminals (G) for a Doppler shift of said user terminal-satellite uplink signal (TSU) frequency, minimizing frequency acquisition time by each of said plurality of satellites (S);

said modem operated to track said Doppler shift, scale the measured value of said Doppler shift by a ratio of said user terminal-satellite uplink signal (TSLD frequency to said user terminal-satellite downlink signal (TSD)

frequency, and adjust the user terminal-satellite uplink signal (TSU) frequency such that it is received at said satellite (12) corrected for said Doppler shift.

20. A method of satellite communications comprising the steps of:
providing a plurality of terminals (G) including a relay station (GB);
operating a first satellite (S1) in a low Earth orbit (OR1);
operating a second satellite (S2) in said low Earth orbit (OR1);
locating said relay station (GB) at an Earth latitude which enables said relay station (GB) to communicate with said first and said second satellites (S1, S2) as said first and second satellites (S1, S2) independently pass over a pole of the Earth;
communicating a message from at least one of said plurality of terminals (G) to said first satellite (S1);
receiving and storing on board said first satellite (S1), said message from one of said plurality of terminals (G);
transmitting said stored message from said first satellite (S1) to said relay station (GB) where it is stored;
re-transmitting said stored message from said relay station (GB) to said second satellite (S2) for forwarding to one of said plurality of terminals (G); and
communicating said message from said second satellite (S2) to at least one of said plurality of terminals (G).

21. A method of satellite communications comprising the steps of:
operating a plurality of satellites (S) in a plurality of low Earth orbits (OR); providing a plurality of relay stations (GB);
providing a plurality of user terminals (G) and distributing said user terminals (G) primarily in portions of the Earth (E) which are inhabited;
locating each one of said plurality of relay stations (GB) at a latitude on Earth (E) to enable communicating between each one of said relay stations (GB) and each one of said plurality of satellites (S) as each one of said plurality of satellites (S) independently passes over a pole of the Earth (E);
communicating between each one of said plurality of satellites (S) and at least one of said plurality of relay stations (GB);
receiving and storing on board one of said plurality of satellites (S), a message from at least one of said plurality of terminals (G);
transmitting said stored message from one of said plurality of satellites (S) to one of said plurality of relay stations (GB) where it is stored;
re-transmitting said stored message from said relay station (GB) to a second one of said satellites (S2) for forwarding said stored message to a second one of said plurality of terminals (G);
transmitting said message from said second satellite (S2) to a second one of said plurality of terminals (G); and
tracking, telemetering, operating and controlling a system including said plurality of satellites (S); said plurality of user terminals (G) and said plurality of relay stations (GB) with at least one of said plurality of relay stations (GB).

22. The method of satellite communication as claimed in claim 21 in which operating a plurality of satellites (S) in a plurality of low Earth orbits (OR) includes the step of operating twelve satellites (S), three of said satellites in each of four orbital planes inclined at eighty degrees inclination.

23. The method of satellite communication as claimed in claim 21 in which communicating between each one of said plurality of satellites (S) and at least one of said plurality of relay stations (GB) further includes the steps of:
transmitting and receiving a plurality of packets of digital data and system overhead information between said plurality of satellites (S) and said plurality of relay stations (GB);
transmitting a relay station-satellite downlink signal (GSD) from said plurality of satellites (S); said relay station-satellite downlink signal (GSD) including a plurality of frames of approximately 500 millisecond duration;
modulating said downlink signal (GSD) using quadraphase shift keying (QPSK) modulation for transmitting said plurality of packets in each of said plurality of frames;
receiving with said plurality of satellites (S) a relay station-satellite uplink signal (GSU) in which said quadraphase shift keying (QPSK) modulation is used for transmitting said plurality of packets;
multiplexing said downlink signal (GSD) and said relay station-satellite uplink signal (GSU) using a time division multiplexing (TDM).

24. The method of satellite communication as claimed in claim 21 in which communicating between each of said plurality of satellites (S) and at least one of said plurality of user terminals (G) further includes the steps of:
transmitting and receiving a plurality of packets of digital data and system overhead information between said plurality of satellites (S) and said plurality of user terminals (G);
transmitting a user terminal-satellite downlink signal (TSD) between said plurality of satellites (S) and said plurality of user terminals (G), said user terminal-satellite downlink signal (TSD) including a plurality of frames of approximately 500 millisecond duration;
modulating said user terminal-satellite downlink signal (TSD) using quadraphase shift keying (QPSK) modulation for transmitting said plurality of packets in each of said plurality of frames;
receiving with said plurality of satellites (S) a user terminal-satellite uplink signal (TSU) in which said quadraphase shift keying (QPSK) modulation is used for transmitting said plurality of packets;
multiplexing said user terminal-satellite downlink signal (TSD) and said relay station satellite uplink signal (GSU) using a time division multiplexing (TDM); and
multiplexing said user terminal-satellite uplink signal (TSU) using a combination of random access and frequency division multiplexing (FDM).

25. The method of satellite communication claimed in claim 21 further including the step of:
monitoring a pool of radio frequency channels in a 148 to 149 MHz band and assigning said channels to said plurality of user terminals (G) as available with said plurality of satellites (S); and
scanning said pool of radio frequency channels in a half-second interval for signal indicating channel usage, projecting channel usage for an ensuing half-second and thereafter instructing a calling one of said plurality of user terminals (G) which channel to use.

26. The method of satellite communication claimed in claim 21 further including the step of locating a portable transceiver terminal at the site of remote assets and periodically communicating data from said site.

27. The method of satellite communication claimed in claim 21 further including the step of locating a portable transceiver terminal at the site of mineral exploration and periodically communicating data from said site relating to the status of said site.

28. The method of satellite communication claimed in claim 21 further including the step of carrying a portable transceiver terminal by a user and communicating data relating to said user.

29. The method of satellite communication claimed in claim 21 further including the step of locating a portable transceiver terminal at the site of a user and periodically communicating e-mail and paging signals for said user.

30. The method of satellite communication claimed in claim 21 further including the step of placing a mobile transceiver terminal on a moving vehicle and periodically communicating data relating to said vehicle.

31. A satellite communications apparatus comprising:

a plurality of terminals (G);

a first satellite (S1) operating in a low Earth orbit (OR1);

said first satellite (S1) for communicating with at least one of said plurality of terminals (G);

a second satellite (S2) operating in said low Earth orbit (OR1);

said second satellite (S2) for communicating with at least one of said plurality of terminals (G);

said plurality of terminals (G) including a relay station (GB);

said relay station (GB) being located at an Earth latitude which enables said relay station to communicate with said first and said second satellites (S1 & S2) as said first and second satellites independently pass over a pole of the Earth;

said first satellite (S1) operated for receiving and storing on board, a message from one of said plurality of terminals (G);

said first satellite (S1) operated for transmitting said stored message to said relay station (GB) where it is stored;

said relay station (GB) operated for transmitting said stored message to said second satellite (S2), said second satellite (S2) forwarding said stored message to one of said plurality of terminals (G).

32. A satellite communications apparatus comprising:

a plurality of terminals (G);

a first satellite (S1) operating in a first low Earth orbit (OR1);

said first satellite (S1) for communicating with at least one of said plurality of terminals (G);

a second satellite (S2) operating in a second low Earth orbit (OR2);

said second satellite (S2) for communicating with at least one of said plurality of terminals (G);

said plurality of terminals (G) including a relay station (GB);

said relay station (GB) being located at an Earth latitude which enables said relay station to communicate with said first and said second satellites (S1 & S2) as said first and second satellites independently pass over a pole of the Earth;

said first satellite (S1) operated for receiving and storing on board a message from one of said plurality of terminals (G);

said first satellite (S1) operated for transmitting said stored message to said relay station (GB) where it is stored;

said relay station (GB) operated for transmitting said stored message to said second satellite (S2); said second satellite (S2) forwarding said stored message to one of said plurality of terminals (G).

* * * * *